(12) United States Patent
Spindler et al.

(10) Patent No.: US 12,325,478 B2
(45) Date of Patent: Jun. 10, 2025

(54) ENGINE ACCESS PANELS FOR OFF-HIGHWAY VEHICLE

(71) Applicant: Arctic Cat Inc., Thief River Falls, MN (US)

(72) Inventors: Jared Spindler, Newfolden, MN (US); Derek Sorenson, Erskine, MN (US); Peter Schoenecker, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/752,674

(22) Filed: Jun. 24, 2024

(65) Prior Publication Data

US 2024/0351650 A1 Oct. 24, 2024

Related U.S. Application Data

(60) Continuation of application No. 18/385,037, filed on Oct. 30, 2023, now Pat. No. 12,054,211, which is a
(Continued)

(51) Int. Cl.
*B62D 25/20* (2006.01)
*B60G 3/00* (2006.01)
(Continued)

(52) U.S. Cl.
CPC ............. *B62D 63/02* (2013.01); *B60G 3/00* (2013.01); *B60G 13/00* (2013.01); *B60J 5/0487* (2013.01);
(Continued)

(58) Field of Classification Search
CPC ...... B62D 63/02; B62D 23/005; B62D 25/00; B62D 25/20; B62D 33/0625; B62D 65/10;
(Continued)

(56) References Cited

U.S. PATENT DOCUMENTS 1,976,071 A 10/1934 Hoffman
1,989,837 A 2/1935 Walters
(Continued)

FOREIGN PATENT DOCUMENTS

JP S6285705 A 4/1987

OTHER PUBLICATIONS

Final Written Decision, U.S. Pat. No. 8,827,028, Case IPR2015-01783, Dated Jan. 30, 2017, 48 pages.
(Continued)

*Primary Examiner* — John D Walters
(74) *Attorney, Agent, or Firm* — Lowe Graham Jones PLLC

(57) ABSTRACT

A recreational off-highway vehicle includes side-by-side passenger and driver seats held within a chassis. The seats sit low in the chassis and are covered by a roll cage. Grab handles are positioned on the sides of the passenger seat. Select large round tubing protects the vehicle, while rectangular tubing frames the portions of the vehicle beneath body panels. The vehicle is powered by an engine rearward of the seats that is connected to a transaxle. A radiator is positioned above the engine. A cover with an access panel is situated between the engine and the passenger seats. The vehicle is suited for rough terrain travel.

20 Claims, 41 Drawing Sheets

Related U.S. Application Data continuation of application No. 18/090,891, filed on Dec. 29, 2022, now Pat. No. 11,932,333, which is a continuation of application No. 17/700,352, filed on Mar. 21, 2022, now Pat. No. 11,648,998, which is a continuation of application No. 17/174,262, filed on Feb. 11, 2021, now Pat. No. 11,279,423, which is a continuation of application No. 16/664,597, filed on Oct. 25, 2019, now Pat. No. 10,933,932, which is a continuation of application No. 16/223,743, filed on Dec. 18, 2018, now Pat. No. 10,723,397, and a continuation of application No. 16/224,308, filed on Dec. 18, 2018, now Pat. No. 10,723,398, which is a continuation of application No. 15/905,321, filed on Feb. 26, 2018, now Pat. No. 10,239,571, which is a continuation of application No. 15/684,863, filed on Aug. 23, 2017, now abandoned, which is a continuation of application No. 15/143,353, filed on Apr. 29, 2016, now Pat. No. 9,771,112, which is a division of application No. 13/775,133, filed on Feb. 23, 2013, now Pat. No. 9,327,587, which is a continuation-in-part of application No. 13/485,696, filed on May 31, 2012, now Pat. No. 9,180,801.

(51) Int. Cl.
| | |
|---|---|
| *B60G 13/00* | (2006.01) |
| *B60J 5/04* | (2006.01) |
| *B60K 5/00* | (2006.01) |
| *B60K 5/04* | (2006.01) |
| *B60K 5/12* | (2006.01) |
| *B60K 13/02* | (2006.01) |
| *B60K 15/03* | (2006.01) |
| *B60K 15/063* | (2006.01) |
| *B60K 17/08* | (2006.01) |
| *B60K 17/34* | (2006.01) |
| *B60N 2/01* | (2006.01) |
| *B60N 2/24* | (2006.01) |
| *B60R 21/13* | (2006.01) |
| *B62D 23/00* | (2006.01) |
| *B62D 25/00* | (2006.01) |
| *B62D 33/06* | (2006.01) |
| *B62D 63/02* | (2006.01) |
| *B62D 65/10* | (2006.01) |
| *B60K 11/06* | (2006.01) |
| *B60R 21/00* | (2006.01) |
| *B62D 21/18* | (2006.01) |

(52) U.S. Cl.
CPC ............ *B60K 5/00* (2013.01); *B60K 5/04* (2013.01); *B60K 5/1208* (2013.01); *B60K 13/02* (2013.01); *B60K 15/03* (2013.01); *B60K 15/063* (2013.01); *B60K 17/08* (2013.01); *B60K 17/34* (2013.01); *B60N 2/01* (2013.01); *B60N 2/24* (2013.01); *B60R 21/13* (2013.01); *B62D 23/005* (2013.01); *B62D 25/00* (2013.01); *B62D 25/20* (2013.01); *B62D 33/0625* (2013.01); *B62D 65/10* (2013.01); *B60G 2200/144* (2013.01); *B60G 2300/124* (2013.01); *B60G 2300/13* (2013.01); *B60K 2005/003* (2013.01); *B60K 11/06* (2013.01); *B60K 2015/0632* (2013.01); *B60K 2015/0633* (2013.01); *B60K 2015/0638* (2013.01); *B60R 2021/0018* (2013.01); *B60R 2021/0032* (2013.01); *B60R 2021/0097* (2013.01); *B60Y 2200/124* (2013.01); *B60Y 2200/20* (2013.01); *B60Y 2400/72* (2013.01); *B62D 21/183* (2013.01); *Y10T 29/49622* (2015.01)

(58) Field of Classification Search
CPC .......... B60G 3/00; B62G 13/00; B60J 5/0487; B60K 5/00; B60K 5/04; B60K 5/1208; B60K 13/02; B60K 15/03; B60K 15/063; B60K 17/08; B60K 17/34; B60N 2/01; B60N 2/24; B60R 21/13
See application file for complete search history.

(56) References Cited

U.S. PATENT DOCUMENTS

| | | | |
|---|---|---|---|
| 2,033,731 | A | 3/1936 | Nallinger |
| 2,145,545 | A | 1/1939 | Johnson et al. |
| 2,746,766 | A | 5/1956 | Nallinger |
| 3,193,302 | A | 7/1965 | Hill |
| 3,292,944 | A | 12/1966 | Dangauthier |
| 3,292,945 | A | 12/1966 | Dangauthier |
| 3,294,191 | A | 12/1966 | Cauvin |
| 3,366,411 | A | 1/1968 | Vittone |
| 3,407,893 | A | 10/1968 | Hill et al. |
| 3,448,994 | A | 6/1969 | King et al. |
| 3,709,314 | A | 1/1973 | Hickey |
| 4,029,338 | A | 6/1977 | Headley |
| 4,641,854 | A | 2/1987 | Masuda et al. |
| 4,681,178 | A | 7/1987 | Brown |
| 4,693,134 | A | 9/1987 | Kraus |
| 4,697,665 | A | 10/1987 | Eastman et al. |
| 4,712,629 | A | 12/1987 | Takahashi et al. |
| 4,798,400 | A | 1/1989 | Kosuge |
| 4,805,720 | A | 2/1989 | Clenet |
| 4,815,755 | A | 3/1989 | Takata et al. |
| 4,817,985 | A | 4/1989 | Enokimoto et al. |
| 5,251,713 | A | 10/1993 | Enokimoto |
| 5,327,989 | A | 7/1994 | Furuhashi et al. |
| 5,579,858 | A | 12/1996 | Petersen et al. |
| 5,954,364 | A | 9/1999 | Nechushtan |
| 6,149,540 | A | 11/2000 | Johnson et al. |
| 6,182,784 | B1 | 2/2001 | Pestotnik |
| 7,270,336 | B2 | 9/2007 | Fujimori |
| 7,287,619 | B2 | 10/2007 | Tanaka et al. |
| D555,036 | S | 11/2007 | Eck |
| 7,377,342 | B2 | 5/2008 | Miyazaki et al. |
| 7,427,248 | B2 | 9/2008 | Chonan |
| 7,438,147 | B2 | 10/2008 | Kato et al. |
| 7,461,864 | B2 | 12/2008 | Ervin |
| 7,506,712 | B2 | 3/2009 | Kato et al. |
| 7,658,258 | B2 | 2/2010 | Denney |
| 7,690,472 | B2 | 4/2010 | Kato et al. |
| 7,708,103 | B2 | 5/2010 | Okuyama et al. |
| 7,753,427 | B2 | 7/2010 | Yamamura et al. |
| 7,753,980 | B2 | 7/2010 | Kobayashi et al. |
| 7,819,220 | B2 | 10/2010 | Sunsdahl et al. |
| 7,845,452 | B2 | 12/2010 | Bennett et al. |
| 7,896,421 | B2 | 3/2011 | Kosuge et al. |
| 7,938,481 | B2 | 5/2011 | Kobayashi et al. |
| 7,988,210 | B2 | 8/2011 | Shibata et al. |
| 8,002,331 | B2 | 8/2011 | Bowers |
| 8,037,959 | B2 | 10/2011 | Yamamura et al. |
| 8,075,007 | B2 | 12/2011 | Brady et al. |
| 8,132,827 | B2 | 3/2012 | Bergman et al. |
| 8,157,039 | B2 | 4/2012 | Melvin et al. |
| D665,305 | S | 8/2012 | Eck |
| 8,292,352 | B2 | 10/2012 | Furman et al. |
| 8,382,125 | B2 | 2/2013 | Sunsdahl et al. |
| 8,452,775 | B2 | 6/2013 | Belzile et al. |
| 8,453,775 | B2 | 6/2013 | Belzile et al. |
| 8,459,397 | B2 | 6/2013 | Bessho et al. |
| 8,465,050 | B1 | 6/2013 | Spindler et al. |
| 8,522,911 | B2 | 9/2013 | Hurd et al. |
| 8,596,405 | B2 | 12/2013 | Sunsdahl et al. |
| 8,613,335 | B2 | 12/2013 | Deckard et al. |
| 8,613,336 | B2 * | 12/2013 | Deckard ................ B60K 17/08 180/68.3 |
| 8,640,814 | B2 | 2/2014 | Deckard et al. |

(56) References Cited

U.S. PATENT DOCUMENTS

| | | | |
|---|---|---|---|
| 8,746,394 | B2 | 6/2014 | Kuramoto et al. |
| 8,746,719 | B2* | 6/2014 | Safranski ............... B60G 7/008 |
| | | | 280/124.152 |
| 8,827,028 | B2 | 9/2014 | Sunsdahl et al. |
| 8,944,449 | B2 | 2/2015 | Hurd et al. |
| 8,944,465 | B2 | 2/2015 | Shinbori |
| 8,997,908 | B2 | 4/2015 | Kinsman et al. |
| 8,998,253 | B2 | 4/2015 | Novotny et al. |
| 9,061,569 | B2 | 6/2015 | Spindler et al. |
| 9,180,801 | B2 | 11/2015 | Kennedy et al. |
| 9,266,417 | B2 | 2/2016 | Nadeau et al. |
| 9,327,587 | B2 | 5/2016 | Spindler et al. |
| 9,878,650 | B2 | 1/2018 | Reed et al. |
| 2004/0195034 | A1 | 10/2004 | Kato et al. |
| 2004/0195797 | A1 | 10/2004 | Nash et al. |
| 2004/0206568 | A1 | 10/2004 | Davis et al. |
| 2004/0217568 | A1 | 11/2004 | Gradu |
| 2005/0247506 | A1* | 11/2005 | Rondeau ................ B62K 5/027 |
| | | | 180/312 |
| 2006/0144631 | A1 | 7/2006 | Kim |
| 2006/0270503 | A1 | 11/2006 | Suzuki et al. |
| 2007/0000715 | A1 | 1/2007 | Denney |
| 2007/0069494 | A1 | 3/2007 | Kinjyo et al. |
| 2008/0023240 | A1 | 1/2008 | Sunsdahl et al. |
| 2008/0023249 | A1 | 1/2008 | Sunsdahl et al. |
| 2008/0283326 | A1 | 11/2008 | Bennett et al. |
| 2009/0302590 | A1 | 5/2009 | Van Bronkhorst et al. |
| 2010/0012412 | A1 | 1/2010 | Deckard et al. |
| 2010/0019539 | A1* | 1/2010 | Nakamura ............. B62D 33/08 |
| | | | 296/190.04 |
| 2011/0103627 | A1 | 1/2011 | Deckard et al. |
| 2011/0240393 | A1 | 10/2011 | Hurd et al. |
| 2011/0298189 | A1 | 12/2011 | Schneider et al. |
| 2012/0031688 | A1 | 2/2012 | Safranski et al. |
| 2012/0085588 | A1 | 4/2012 | Kinsman et al. |
| 2012/0152637 | A1 | 6/2012 | Hapka |
| 2012/0217078 | A1 | 8/2012 | Kinsman et al. |
| 2012/0223500 | A1 | 9/2012 | Kinsman et al. |
| 2013/0157793 | A1 | 6/2013 | Dec |
| 2013/0161109 | A1 | 6/2013 | Sunsdahl et al. |
| 2014/0090918 | A1 | 4/2014 | Sunsdahl et al. |
| 2014/0103627 | A1 | 4/2014 | Deckard et al. |
| 2014/0124279 | A1 | 5/2014 | Schlangen et al. |
| 2014/0187366 | A1 | 7/2014 | Kouma et al. |
| 2014/0187372 | A1 | 7/2014 | Kouma et al. |
| 2014/0225358 | A1 | 8/2014 | Shinbori et al. |
| 2015/0259011 | A1 | 9/2015 | Deckard et al. |
| 2018/0178677 | A1 | 6/2018 | Swain et al. |

OTHER PUBLICATIONS

Final Written Decision, U.S. Pat. No. 8,746,719, Case IPR2015-01788, Dated Feb. 1, 2017, 75 pages; 3 parts.

Final Written Decision, U.S. Pat. No. 8,746,719, Case IPR2015-01789, Dated Feb. 1, 2017, 65 pages.

Gator Utility Vehicles, John Deere, Jan. 2012, 34 pages.

Glamisdunes.com [online]. "My New Revenge Silencer," Feb. 22, 2007, [retrieved on Jan. 29, 2015]. Retrieved from the Internet: URL<http://www.glamisdunes.com/invision/index. php?showtopic= 101 . . . > . 66 pages.

Groen, Eric; Re: U.S. Appl. No. 13/485,696; Correspondence to Arctic Cat, Inc. dated Dec. 17, 2014.

Groen, Eric; Re: U.S. Appl. No. 13/775,133; Correspondence to Arctic Cat, Inc. dated Aug. 24, 2015.

"Hart's Hunter," Dirt Wheels Magazine, Dec. 1998; pp. cover, 69-71 and 74; 5 pages.

Heydinger, Gary; Vehicle Characteristics Measurements of Recreational Off-Highway Vehicles; Report; Apr. 2011; 498 Pages; Columbus, Ohio. 2 parts.

Hogg & Weeks, The Illustrated Encyclopedia of Military Vehicles, New Burlington Books, 1980, p. 63, 207, 307-08; 6 total pages submitted.

Honda Owner's Manual: 89 FL400R Pilot, Honda Motor Co., Ltd, 1988, 98 pages.

Honda Service Manual: 86-87 TRX350 Fourtrax, 87-89 TRX35OD Foreman, Honda Motor Co., Ltd, 309 pages; 11 parts.

Honda Service Manual: 89 FL400R Pilot, Honda Motor Co., Ltd, 1988, 154,265 pages.

Honda Service Manual 1995-2003: TRX400FW FOURTRAX Foreman 400, Honda Motor Co., Ltd. Service Publication Office, 370 pages; 12 parts.

Honda Shop Manual FL350R Odyssey 350, Honda Motor Co., Ltd., 1985, 209 pages; 2 parts.

Kirsten, "Sand Styling," Dune Buggies and Hot VWs, Oct. 2004, 7 pages.

KNfilters; 2011, 2012, 2013 Polaris Ranger RZR XP900 Air Intake Installation; Youtube; May 7, 2014 (https://www.youtube.com/watch?v=KkpFAA8nO8U); Screenshot dated: Nov. 2, 2015; pp. 2.

Kymco UXV500 Owner's Manual, Kymco, May 2008, 88 pages.

Lancia Delta S4 Parts Catalogue, Fiat Auto Soc P. AZ., 1985-1986, 237 pages.

"Lancia's Supercar: Delta Force," Motor, Nov. 15, 1986, 171(4382):10-17, 20 total pages submitted.

Legg & Mead, Peugeot 205 Service and Repair Manual, Haynes Publishing, 1996, 248 pages; 10 parts.

Lelong, Peugeot 205 Turbo 16: Les Lauriers de Sochaux, ETAI Eds Techniques Pour L'automobile Et L'industrie, 2011, 162 pages; 2 parts.

Letter from Michael J. McKeen to Eric Serverson regarding U.S. Appl. No. 14/565,193, Dated Apr. 6, 2016, 16 pages.

Mavrigian, "'Tuning' up the chassis: suspension enhancements have moved beyond the 'street rodders.' Today, pickups, SUVs, and even luxury cars are getting into the act," Motor Age, Dec. 1, 2002, vol. 121, issue 12, 7 pages.

Mike Burton, Svsm.org [online], "XR311 Experimental Attack Vehicle," [retrieved on Feb. 26, 2014]. Retrieved from the Internet: URL <svsm.org/gallery/xr311>. 16 pages.

Off-Road.com [online], "First Ridge Runner Rally Dubbed a Pinnacle Success," Jul. 1, 2005. Retrieved from the Internet: URL<http://www.atvsource.com/articles/press-releases/2005/071405_1st_ridge_runner_rally_a_success.htm>. 1 page.

Off-road.com [online]. "Revenge Racing 2-Seat Silencer!" Dec. 1, 2006, [retrieved on Jan. 29, 2015]. Retrieved from the Internet: URL<http://www.off-road.com/atv/project1521.html>. 3 pages.

Off-Road.com [online], "Ridge Runner Rugged Terrain Vehicle Introduces 2005 Model with New Options," Dec. 31, 2004. Retrieved from the Internet: URL<http://www.off-road.com/atv/feature/ridge-runner-rugged-terrain-vehicle-introduces-2005-model-with-new-options-30643.html>. 2 pages.

Petition for Inter Partes Review of U.S. Pat. No. 8,596,405, Dated Aug. 29, 2014, 58 pages.

Petition for Inter Partes Review of U.S. Pat. No. 8,596,405, Dated Aug. 29, 2014, 55 pages.

Petition for Inter Partes Review of U.S. Pat. No. 8,827,028, Dated Aug. 20, 2015, 68 pages.

Petition for Inter Partes Review of U.S. Pat. No. 8,827,028, Dated Aug. 20, 2015, 56 pages.

Petition for Inter Partes Review of U.S. Pat. No. 8,746,719, Dated Aug. 21, 2015, 65 pages.

Petition for Inter Partes Review of U.S. Pat. No. 8,944,449, Dated Nov. 7, 2016, 91 pages; 3 parts.

Petition for Inter Partes Review of U.S. Pat. No. 9,217,501, Dated Dec. 8, 2016, 117 pages; 5 parts.

Petition for Inter Partes Review of U.S. Pat. No. 9,217,501, Dated Dec. 9, 2016, 132 pages; 3 parts.

Polaris; Parts and Manufacturers Catalog; Dec. 2012 (p. 93).

Polaris; RZR 570 OEM Parts; Retrieved from the Internet: URL<https://rzr.polaris.com/en-us/parts/#/Polaris/R12VH57AD_RZR_570_EFI_(2012)/BODY%2c_REAR_RACK_and_FENDERS_-_R12VH57AD_(49RGRRACKMTG12RZR570)/88295/88315>; 1 page; all pages pertinent.

Polaris; RZR 800 OEM Parts; Retrieved from the Internet: URL<https://rzr.polaris.com/en-us/parts/#/Polaris/R12VH76AB%2f%2fAD%2f%2fAF%2f%2fAH%2f%2fAI%2f%2fAJ%2f%2fAM%2f%2fEAB%2f%2fEAS_RZR_800_EFI%2f%2fEPS_(2012)/BODY%2c_REAR_

(56) References Cited

OTHER PUBLICATIONS

RACK_and_FENDERS_-_R12VH76AB%2f%2fAD%2f%2fAF%2f%2fAH%2f%2fAI%2f%2fAJ%2f%2fAM%2f%2fEAB%2f%2fEAS_(49RGRRACKMTG11RZR)/83855/83868>; 1 page.
Polaris; Screenshots of Online Parts Catalog; Oct. 2011; pp. 10.
Prowler XT: 2006 Service Manual, Arctic Cat Inc., Dec. 2005, 202 pages; 4 parts.
Rc-trucks.org [online], "Honda Odyssey: Is it a Family Van or a Screaming off Road Vehicle?" Publicly available on Mar. 26, 2006, Retrieved from Internet: URL <http://www.rc-trucks.org/honda-odyssey.htm>. 5 pages.
RedlinePerforms.com [online], "Redline Redefine, Specs: Revolt, Revolt XL, Riot Side x Side" Publicly available before Jun. 28, 2010, [retrieved on Jun. 28, 2010]. Retrieved from the Internet: URL <http://www.buggyworkssandrails.com/images/102_0657.JPG>. 9 pages.
Redline Revolt Service Manual, Redline Performance Products, LLC, 2008, 259 pages; 4 parts.
"Redline's Rockin' Riot: 2009 Redline Riot 750 Test drive" UTV Off-Road Magazine, Feb./Mar. 2009, 4(1):21-24.
Reimpell et al., Engineering Principles: The Automotive Chassis, 2nd Ed., Butterworth-Heinemann on behalf of Society of Automotive Engineers, Inc, 2001, p. 346-347; 5 pages submitted.
Request for Ex Parte reexamination; Dated Jul. 18, 2017; pp. 151.
RidgeRunner. biz [online], "A New Way to Have Fun Smoothing out the trial," Retrieved from Internet Archive Wayback machine, from Apr. 9, 2004: URL <http://ridgerunner.biz>. 1 page.
RidgeRunner. biz/home [online], "Let's start with a basic premise," Retrieved from Internet Archive Wayback machine, from Jun. 5, 2004: URL <http://ridgerunner.biz/home.htm>. 1 page.
RidgeRunner.biz/home [online], "Why Even Consider Buying a Two-Seat Ridge Runner?" Retrieved from Internet Archive Wayback machine, from Sep. 2, 2004: URL <http://ridgerunner.biz/home.htm.>. 1 page.
"Ridge Runner of Idaho Ltd., Co., Introductory Offer $13,950," Brochure, Ridge Runner of Idaho Ltd., Co., 2 pages.
Robson, Rally Giants: Peugeot 205 T16, Veloce Publishing, 2007, 129 pages; 11 parts.
Rolland, "Dueling Duners," Sand Sports, Jan./Feb. 2008, 8 pages.
Shepherd et al., The Development of a High-Performance Snowmobile Variable Speed Belt, SAE Technical Paper Series, Society of Automotive Engineers, 1996, 6 pages.
Shiells, Technical Report ARBRL-TR-02054: A Combinatorial Geometry Computer Description of the XR311 Vehicle, U.S. Army Armament Research and Development Command, Apr. 1978, 60 pages; 2 parts.
ShopYamaha.com [online], "Yamaha Parts Catalog," [retrieved May 19, 2017]. Retrieved from Internet: URL <https://www.shopyamaha.com/parts-catalog/parts/side-x-sides>. 5 pages.
Thornton, Sporting Peugeot 205s, Motor Racing Publications Ltd., 1997, 128 pages; 2 parts.
Wagstaff, Owner's Workshop Manual: McLaren M23 1973 onwards (all marks), Haynes Publishing, Jun. 2013, 168 pages; 4 parts.
War Department Technical Manual TM E9-803, German Volkswagen, U.S. War Department, Jun. 6, 1944, 144 pages.
Weber, "Anti-sway bars turn for the better," Chicago Tribune, Jan. 7, 2002, 6 pages, retrieved from chicagotribune.com on Jun. 8, 2015.
Yamaha Grizzly YFM600FWAM(C) Owner's Manual, Yamaha Motor Co., U.S.A., Apr. 1999, 164 pages.
Yamaha Rhino 660 YXR660FAS Owner's Manual, Yamaha Motor Co., Ltd., 2003, 154 pages.
First Examination Report dated Jul. 26, 2019 for co-pending European Patent Application No. 14709061.7, 6 pages.
Notice of Allowance dated Mar. 30, 2021 for co-pending Mexican Patent Application No. MX/a/2015/010772; 3 pages.
2008 Yamaha Rhino 700 Mud Door, https://www.atvriders.com/images/yamaha/2008yamaharhino700efiutvreview/yamaha2008rhino700muddoor.jpg.

08 UTV Service Manual: Prowler, Prowler XT, Prowler, Arctic Cat Inc., XTX, Mar. 2008, 178 pages; 2 parts.
1400HP Buckshot Racing Sand Car Build—Member Rides and Builds; Dated: May 4, 2016; pp. 74.
1985 Odyssey 350 Service Manual, American Honda Motor Co., Inc., 1984, 6 pages.
1995 Acura NSX Service Manual; Dated: 1995; pp. 29.
"2006 Arctic Cat Accessories," Brochure, Arctic Cat, 69 pages; 12 parts.
2007 Ranger 500 2×4/4×4/4×4 EFI: Service Manual PN 9920851, Polaris Sales Inc., 2006, 362 pages; 6 parts.
2008 Ranger 700 4×4 XP/4×4 CREW/6×6 Service Manual, PN 9921277, Polaris Sales Inc., 2007, 332 pages; 10 parts.
2008 Ranger RZR Owner's Manual, Polaris Sales Inc., 2007, 146 pages.
2008 Ranger RZR: Service Manual, PN 9921278, Polaris Sales Inc., 2007, 328 pages; 3 parts.
"2008 Work/Play: Only Ranger," Brochure, Polaris Sales, Inc., 28 pages.
2011 Operator's Guide, Commander 800R/1000, Can-am, 2011, 149 pages.
AmericanSandAssociation.org [online]. "2007 Revenge Racing Silencer Mid Engine 600HP LS2, 54," Mar. 17, 2008, [retrieved on Jan. 29, 2015]. Retrieved from the Internet: URL <https://americansandassociation.org/phpBB3/viewtopic.php?f=34&t=24139&hilit=2007+Revenge+Racing+Silencer+Mid+Engine+600HP+LS2%2C+54>. 4 pages.
Arctic Cat; "2012 Arctic Cat Wildcat with 95-hp & 16 in. Travel"; ArcticInsider.com; Mar. 26, 2011; Retrieved Oct. 7, 2019; URL < http://www.arcticinsider.com/Article/2012-Arctic-Cat-Wildcat-with-95-hp--16-in-Travel>; pp. 4.
Arctic Cat; "A New Arctic Cat Side-X-Side?"; ArcticInsider.com; Mar. 10, 2011; Retrieved Oct. 7, 2019; URL <http://arcticinsider.com/Article/A-New-Arctic-Cat-Side-X-Side#Comments>; pp. 3.
Arctic Cat; Operator's Manual; Wildcat; 2013; 60 pages, all pages pertinent.
Arcticcatpartshouse.com [online], "2006 Arctic Cat Prowler XT 650 H1 Automatic 4×4 Cat Green (U2006P2S4BUSZ) Decals," [Retrieved on May 19, 2017]: URL <http://www.arcticcatpartshouse.com/oemparts/a/arc/54f47e6687a865190000e26f/decals>. 2 pages.
Arcticcatpartshouse.com [online], "2006 Arctic Cat Prowler XT 650 H1 Automatic 4×4 Cat Green (U2006P2S4BUSZ) Rear Suspension Assembly," [Retrieved on May 19, 22, 2017]: URL <http://www.arcticcatpartshouse.com/oemparts/a/arc/54f47e2787a865190000e251/rear-suspension-assembly>. 3 pages.
Arcticcatpartshouse.com [online], "2006 Arctic Cat Prowler XT 650 H1 Automatic 4×4 Cat Green (U2006P2S4BUSZ) Sway Bar Assembly," [Retrieved on May 19, 22, 2017]: URL <http://www.arcticcatpartshouse.com/oemparts/a/arc/54f47e6687a865190000e26f/sway-bar-assembly>. 2 pages.
Arctic Cat; Wildcat Part Diagram; 2012; 1 page, all pages pertinent.
Arens, "Oh what fun it is to ride a Ridge Runner," ATV Illustrated, Apr. 2005, 16-20, 92 pages provided; 3 parts.
Atvconnection.com [online] Sedorchuk, "New for 2004, Yamaha Rhino 660 4×4!," ATV Connection Magazine, Available from Internet via Internet Archive Wayback machine: URL http://atvconnection.com>. 4 pages.
ATVSource.com [online], "Ridge Runner of Idaho Introduces New Two Seat Rough Terrain Vehicle (RTV)," May 17, 2004. Retrieved from the Internet: URL <http://www.atvsource.com/articles/press_releases/2004/051904_ridge_runner_new_two_seat_rtv.htm>. 1 page.
Automotive Handbook, 1st English Ed., Robert Bosch GmbH, 1976, pp. 256-257, and 300-301; 4 pages submitted.
Automotive Handbook, 3rd Ed., Robert Bosch GmbH, 1993, p. 4; 4 pages submitted.
Berkyboy; "New Arctic Cat Side by Side"; Youtube video; Dated Mar. 9, 2011; Retrieved Oct. 7, 2019; URL <https://www.youtube.com/watch?v=gQGAYSz1bME&feature=youtu.be>.
Caranddriver.com [online], "1965 Porsche 911," Oct. 2013, Retrieved from Internet Archive Wayback machine, from Nov. 28, 2013: URL < http://www.caranddriver.com/reviews/1965-porsche-911-archived-road-test-review>. 8 pages.

(56) References Cited

OTHER PUBLICATIONS

Casucci, "Lancia 037—Delta S4—Delta 4WD," Editorial, Libreria dell'Automobile, Giovanna Mazzocchi Bordone, 1987, 121 pages; 4 parts.
Classics.honestjohn.co.uk [online], "Porsche 911 (1974-1989)," Last updated Apr. 3, 2013, [retrieved on May 22, 2017]. Retrieved from the Internet: URL <https://classics.honestjohn.co.uk/reviews/porsche/911-1974-1989/>. 3 pages.
Databikes. com [online], "2006 Arctic Cat Prowler XT 650 H1 4×4 ATV Quad," Apr. 23, 2011, [retrieved on May 22, 2017]: URL <http://databikes.com/infophoto/arctic_cat/prowler_xt_650_h1_4x4-2006.html>.
Decision Declining to Institute Inter Partes Review of U.S. Pat. No. 8,944,449, Case IPR2017-00199, Dated Apr. 17, 2017, 12 pages.
Decision Denying Institution of Inter Partes Review of U.S. Pat. No. 9,217,501, Case IPR2017-00455, Dated Jul. 5, 2017, 20 pages.
Decision Institution of Inter Partes Review of U.S. Pat. No. 8,596,405, Case IPR2014-01427, Dated Feb. 13, 2015, 16 pages.
Decision Institution of Inter Partes Review of U.S. Pat. No. 8,596,405, Case IPR2014-01428, Dated Feb. 13, 2015, 29 pages.
Decision Institution of Inter Partes Review of U.S. Pat. No. 8,746,719, Case IPR2015-01788, Dated Feb. 4, 2015, 18 pages.
Decision Institution of Inter Partes Review of U.S. Pat. No. 8,746,719, Case IPR2015-01789, Dated Feb. 4, 2016, 22 pages.
Decision Institution of Inter Partes Review of U.S. Pat. No. 8,827,028, Case IPR2015-01781, Dated Feb. 3, 2016, 34 pages.
Decision Institution of Inter Partes Review of U.S. Pat. No. 8,827,028, Case IPR2015-01783, Dated Feb. 3, 2016, 22 pages.
Decision Institution of Inter Partes Review of U.S. Pat. No. 9,217,501, Case IPR2017-00433, Dated Jul. 5, 2017, 32 pages.
Decision of Appeal Opinion and Judgment of U.S. Pat. No. 8,596,405, IPR2014-01427, IPR2014-01428., Dated Feb. 9, 2018, 35 pages.
Drakart. com [online], "Drakart Extreme," Retrieved from Internet Archive Wayback machine, from Dec. 27, 2002 [retrieved on May 12, 2015]: URL < http://drakart.com/english/extreme.html>. 3 pages.
Drakart.com [online], "Drakart Formula Cross," Retrieved from Internet Archive Wayback machine, from Feb. 9, 2003 [retrieved on May 12, 2015]: URL <http://drakart.com/english/FormulaCross.html>. 4 pages.
Drakart. com [online], "Drakart: Manufacturer of off road vehicles for racing, sport, and leisure," Retrieved from Internet Archive Wayback machine, from Dec. 4, 2002 [retrieved on May 12, 2015]: URL <http://drakart.com/english/english.htm>. 2 pages.
Drakart. com [online], "Drakart Two Seater," Retrieved from Internet Archive Wayback machine, from Dec. 4, 2002 [retrieved on May 12, 2015]: URL <http://drakart.com/english/twoseat.htm>. 1 page.
Drakart.com [online], "Extreme Off-Road Vehicle," Retrieved from Internet Archive Wayback machine, from Feb. 21, 2003 [retrieved on May 12, 2015]: URL <http:/drakart.com/English/drakartdirt.html>. 4 pages.
Drakart. com [online], "Tornado by Drakart" Retrieved from Internet Archive Wayback machine, from Sep. 22, 2006 [retrieved on May 12, 2015]: URL < http://drakart.com/tornado.html>. 3 pages.
Duffy et al., Auto Drive Trains Technology: Principles, Diagnosis, and Service for all major types of Drive Trains, Chapter 1, The Goodheart-Willcox Company, Inc., Tinley Park, Illinois, Dec. 18, 1995, 25 pages.
Dumontduneriders.com [online]. "Sold: 07 Revenge Racing Silencer," Dec. 26, 2010, [retrieved on Jan. 29, 2015]. Retrieved from the Internet: URL<http://www.dumontduneriders.com/invision/?showtopic=15655>. 5 pages.
Final Written Decision, U.S. Pat. No. 8,596,405, Case IPR2014-01427, Dated Feb. 4, 2016, 40 pages.
Final Written Decision, U.S. Pat. No. 8,596,405, Case IPR2014-01428, Dated Feb. 4, 2016, 18 pages.
Final Written Decision, U.S. Pat. No. 8,827,028, Case IPR2015-01781, Dated Jan. 30, 2017, 64 pages.

\* cited by examiner

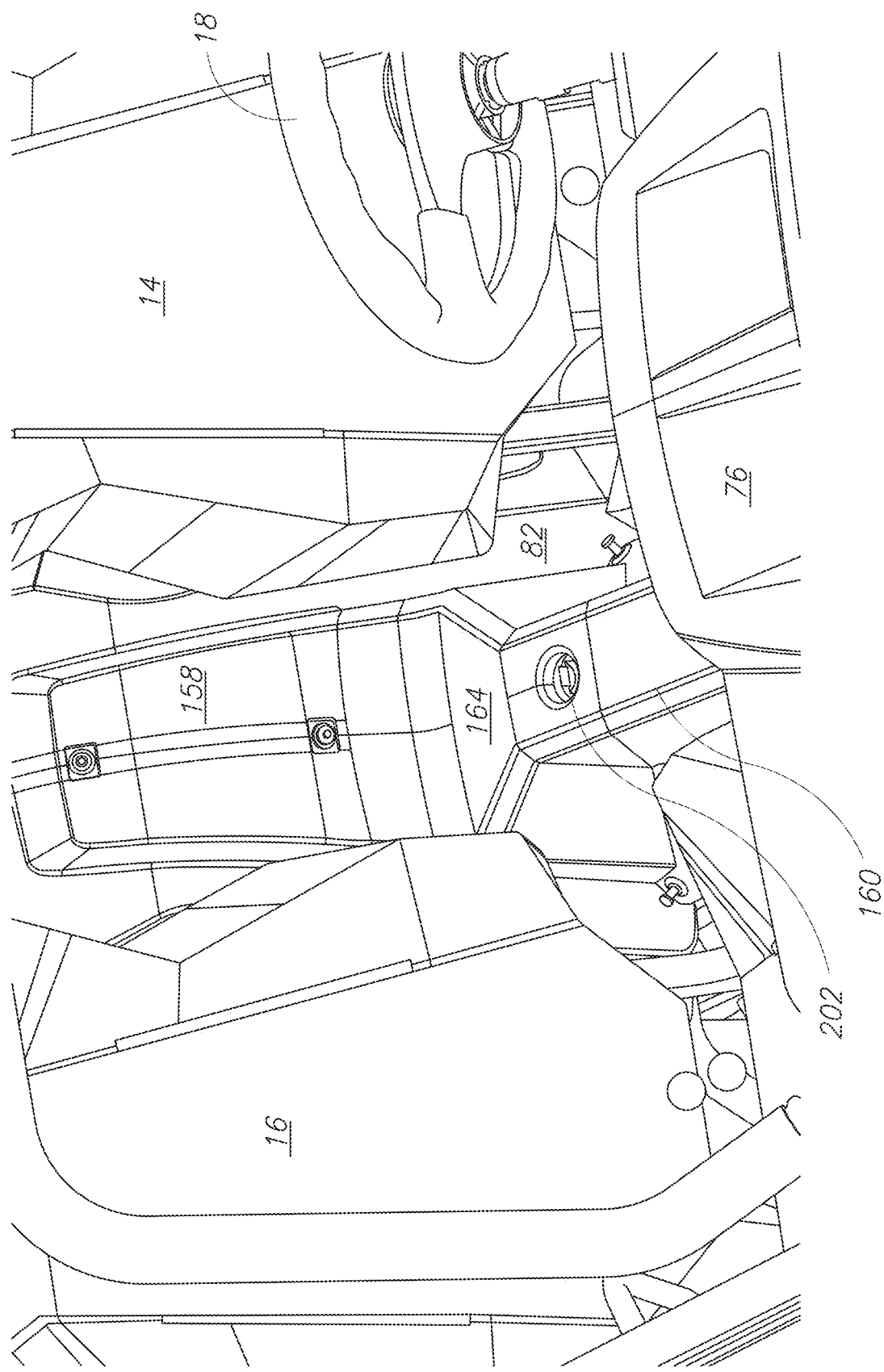

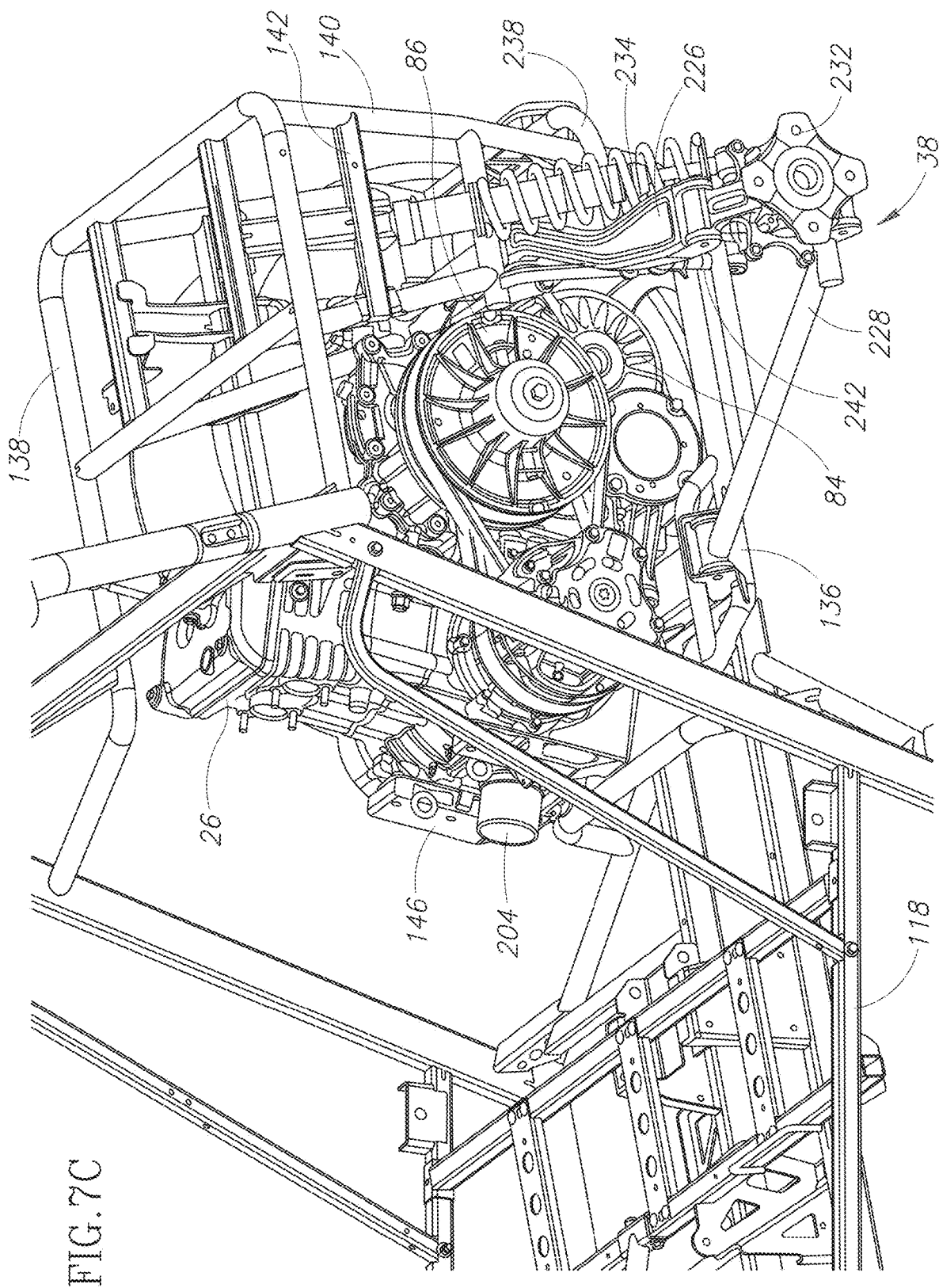

ENGINE ACCESS PANELS FOR OFF-HIGHWAY VEHICLE

PRIORITY CLAIM

This present application is a continuation of U.S. application Ser. No. 18/385,037 entitled OFF-ROAD VEHICLE filed Oct. 30, 2023; which is a continuation of U.S. application Ser. No. 18/090,891 entitled OFF-ROAD VEHICLE RADIATOR filed Dec. 29, 2022 and issued as U.S. Pat. No. 11,932,333; which is a continuation of U.S. application Ser. No. 17/700,352 entitled OFF-HIGHWAY RECREATIONAL VEHICLE filed Mar. 21, 2022 and issued as U.S. Pat. No. 11,648,998; which is a continuation of U.S. application Ser. No. 17/174,262 entitled VEHICLE ENGINE MOUNTING filed Feb. 11, 2021 and issued as U.S. Pat. No. 11,279,423; which is a continuation of U.S. application Ser. No. 16/664,597 entitled OFF-HIGHWAY RECREATIONAL VEHICLE filed Oct. 25, 2019 and issued as U.S. Pat. No. 10,933,932; which is a continuation of U.S. application Ser. No. 16/223,743 entitled OFF-HIGHWAY RECREATIONAL VEHICLE, filed Dec. 18, 2018 and issued as U.S. Pat. No. 10,723,397, and Ser. No. 16/224,308 entitled OFF-HIGHWAY RECREATIONAL VEHICLE, filed Dec. 18, 2018 and issued as U.S. Pat. No. 10,723,398—which both are continuations of U.S. application Ser. No. 15/905,321 entitled OFF-HIGHWAY RECREATIONAL VEHICLE filed Feb. 26, 2018, and issued as U.S. Pat. No. 10,239,571; which is a continuation of U.S. application Ser. No. 15/684,863 entitled OFF-HIGHWAY RECREATIONAL VEHICLE filed Aug. 23, 2017 and now abandoned; which is a continuation of U.S. application Ser. No. 15/143,353 entitled OFF-HIGHWAY RECREATIONAL VEHICLE filed Apr. 29, 2016 and issued as U.S. Pat. No. 9,771,112; which is a divisional of U.S. application Ser. No. 13/775,133 entitled OFF-HIGHWAY RECREATIONAL VEHICLE filed Feb. 23, 2013 and issued as U.S. Pat. No. 9,327,587; which is a continuation-in-part of U.S. application Ser. No. 13/485,696 entitled VEHICLE CONFIGURATION filed May 31, 2012 and issued as U.S. Pat. No. 9,180,801, the contents of which are incorporated herein by reference in their entirety.

FIELD OF THE DISCLOSURE

The present invention relates to side-by-side, recreational off-highway vehicles, their configurations, chassis, suspension, and ergonomics.

BACKGROUND

Side-by-side recreational off-highway vehicles ("ROVs") are quite capable in a wide variety of riding environments and situations, whether for sport or utility purposes. The ability of the vehicles to carry multiple occupants in a side-by-side seating arrangement makes them socially enjoyable to ride as well. The vehicles can be easy to enter and exit and easy to operate with controls and ergonomics somewhat similar to automobiles. However, unlike most automobiles, ROVs can be driven on harsh off-road terrain. The extent to which such terrain can be accessed depends on multiple factors, including the vehicle width, suspension, turning radius, under-carriage clearance, wheelbase, center of gravity, and power. The arrangement of these aspects and their interrelations can be important in determining the occupant ride characteristics, reliability, ease of maintenance, and terrain and cargo capabilities of the ROV.

SUMMARY

The present invention provides a side-by-side recreational off-highway vehicle having two front wheels and at least two rear wheels. The vehicle includes a chassis, an engine, a transmission, a drive unit, and body panels. The chassis includes a front portion, a middle portion, and a rear portion. The front portion is coupled to the front wheels. The middle portion is coupled to the rear wheels and surrounds an occupant compartment having at least two side-by-side seats for a driver and at least one passenger. The chassis includes frame members of rectangular cross section and frame members of generally circular or oval cross section.

The engine is secured to the rear portion of the chassis. The transmission is secured to the engine. The drive unit is operably coupled to the driven clutch, and drivingly coupled to the rear wheels.

The body panels are secured to the chassis and cover most of the frame members of rectangular cross section while leaving exposed many of the frame members of generally circular or oval cross section. A frame member of generally circular cross section extends along right and left lower edges of the middle portion of the chassis. Frame members of generally circular cross section form a roll cage above at least the middle portion of the chassis. The vehicle further includes right and left doors in the middle portion of the chassis. The frame members along the right and left lower edges are positioned below the doors. The frame members of generally circular cross section are also exposed below the roll cage at a forward portion of the middle portion of the chassis.

The vehicle also includes a rear cargo box positioned above the drive unit. The rear cargo box has an opening covered with a movable door generally above the engine to access engine components. A separate body panel extends forward of the cargo box and forward of left rear wheel, between the left rear wheel and the driver door. The separate body panel includes an opening allowing air passage to an air intake conduit and an airbox for providing combustion air to the engine.

The transmission includes a continuously variable transmission (CVT) with a cooling air intake having a conduit also extending from the opening in the body panel.

The body panels include at least one bridging body panel extending from the cargo box to between the engine and the seats. A rear separation panel extends downwardly from the bridging body panel to proximate a floor of the vehicle between the occupant compartment and the engine. The rear separation panel is formed of at least one separate panel secured to the bridging body panel. It further includes a removable portion adjacent an engine component, such as an oil filter and dipstick.

The drive unit includes a transaxle fastened to the engine, the drive clutch being driven by the engine and the driven clutch driving the transaxle. The engine and transaxle are mounted to the chassis with vibration isolation members. The airbox, throttle body, and CVT are secured to the engine and transaxle so as to move with the engine and transaxle relative to the chassis. The engine and transaxle form an assembly that bridges from the member mounting the engine to the member mounting the transaxle. The engine is forward of the transaxle, with a front driveline extending forward from the transaxle and extending under the engine.

The middle portion of the chassis has a distance from its underside to the ground defining a ground clearance, the driver seat and the passenger seat each having an upwardly facing lower seating surface upon which an occupant rests and a seat back for the back of the occupant to lean against; wherein the vertical distance between a lowest portion of the lower seating surface and the underside of the middle portion of the chassis is less than the ground clearance of the middle portion of the chassis when not vehicle is not loaded.

The wheelbase of the vehicle is at least 80 inches and preferably approximately 83 inches. The driver seat includes a seat index point, the seat index point being within 16 inches of the underside of the middle portion of the chassis. The seat index point is preferably positioned longitudinally between a center of the wheelbase and a center of gravity of the vehicle.

The vehicle further includes a driver door and a passenger door. The driver door and the passenger door each have a rear pivot and a front latch. The rear pivots also have a downward angle, such that the doors swing rearwardly and downwardly when opening.

The passenger door includes an interior grab member forward of the passenger seat back. It is secured to an interior facing side of the passenger door with the grab member being positioned longitudinally near a forward-most portion of the passenger lower seating surface. A medial passenger grab member is secured to the chassis on the medial side of the passenger seat longitudinally near the forward-most portion of the passenger lower seating surface. The vehicle includes a transmission shift lever to the left of the passenger grab bar such that the grab bar is situated laterally between the passenger seat and the shift lever.

The vehicle includes a floorboard with an integrally molded upwardly angled footrest forward of the passenger seat. The driver floorboard includes a heel step between the driver seat and the throttle pedal. A cup holder is also integrally molded with the floorboard.

The rear suspension is coupled between the chassis rearward portion and the rear wheels and includes right and left suspension arms and right and left shock absorbers. A rear sway bar is coupled between the right and left suspension arms. The sway bar extends rearwardly from the arms and mounts to the rearward-most end of the chassis rearward portion. The mounts are rearward of the shock absorbers.

The distance between the driver seat and the passenger seat is greater than the distance between the driver seat and the driver door and the distance between the passenger seat and the passenger door. Preferably, the distance between the seats is at least twice the distance between the passenger door and the passenger seat.

Further with regard to the engine and transmission arrangement, a forward end of the engine is mounted to the chassis and a rearward portion of the transmission is coupled to the chassis, the engine and transmission bridging from a forward engine mounting location to a rearward transmission mounting location. The engine is mounted to the chassis with at least one vibration isolation member and the transmission is mounted to the chassis with at least one vibration isolation member. A first mounting plate is fastened to the engine and to the transmission to secure the engine and transmission together. A second mounting plate is fastened directly to the transmission and fastened to the first mounting plate. The CVT has a drive clutch engaged with the engine and a driven clutch engaged with the transmission. The CVT is not rigidly mounted directly to the chassis. The engine, transmission, CVT, throttle body, and airbox are vibration isolated together relative to the chassis.

The airbox includes an air outlet and the engine includes an air inlet. The airbox air outlet is substantially in line with the throttle body and the engine air inlet. Furthermore, the distance from the airbox air outlet and the engine air inlet is less than a distance from a front end of the engine to a rear end of the transmission. A forward-extending driveshaft extends from a bottom end of the transmission beneath the engine toward the front wheels.

A method for assembling a vehicle is also provided. An engine is secured rigidly to a transmission to form an engine and transmission assembly. The assembly is moved through the mid chassis portion and through a front end of the rear chassis portion to within the rear chassis portion. The engine and transmission assembly are then secured within the rear chassis portion. The CVT is secured to the engine and transmission after securing the engine to the transmission and before moving the assembly to within the rear chassis portion.

At the front of the vehicle, right and left headlights are secured to a front end of the chassis forward portion. A radiator is secured within a front end of the chassis forward portion directly between the headlights. The chassis forward portion also includes front frame members and right and left bumper bars removably fastened to the front of the front frame members. The radiator is positioned between the front frame members and the bumper bars. The right and left headlights are positioned outwardly of the right and left bumper bars respectively. A winch is mounted below the radiator.

A fuel tank is secured by the chassis middle portion at least partially beneath the passenger seat. The fuel tank extends beneath and behind the lower seating portion, the tank having a height that increases behind the lower seating portion relative to the portion of the tank directly beneath the lower seating portion. A fuel pump is secured to the portion of the fuel tank behind the lower seating portion. The chassis includes a frame member beneath the passenger seat and on top of the fuel tank. The fuel tank includes a lower edge having a recess, the recess nesting with a lower chassis frame member. The fuel tank includes a corner recess into which a battery is positioned. The chassis further includes a battery tray adjacent the corner recess in the fuel tank.

BRIEF DESCRIPTION OF THE DRAWINGS

Preferred and alternative examples of the present invention are described in detail below with reference to the following drawings:

FIG. 5A is an isometric view of an access panel in position with the vehicle;

FIGS. 7A-C are isometric views of the rear suspension of the vehicle;

DETAILED DESCRIPTION

Figure 1A:
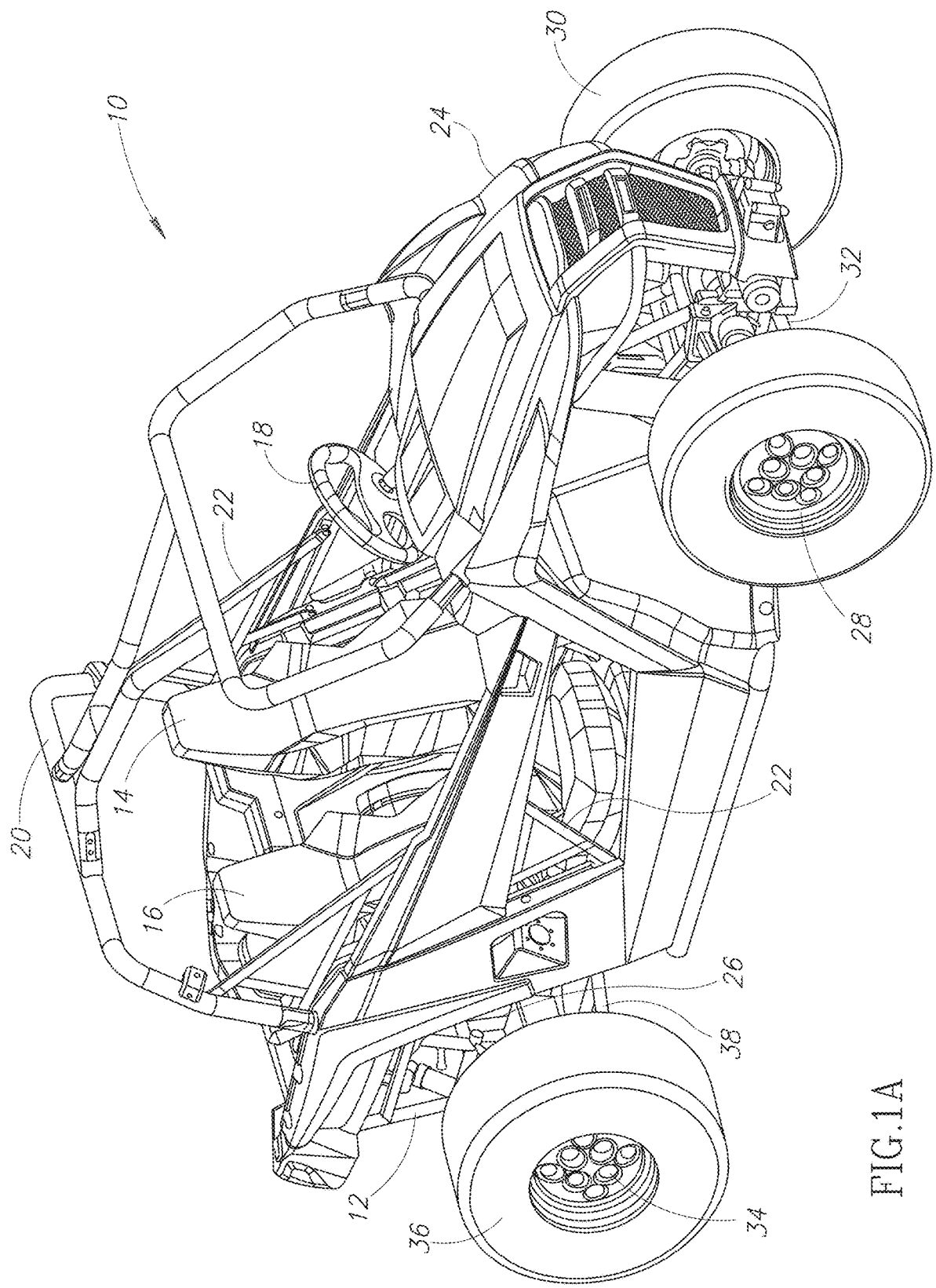
FIGS. 1A-D are isometric views of the vehicle of the present invention.

As shown in the drawings listed above, the invention is a vehicle that includes side-by-side seating for a driver and a passenger ("occupants"). The vehicle is preferably less than about 50 inches wide such that it can access trails developed and designated for all-terrain vehicles (ATVs). Thus, as shown in FIG. 1A, a vehicle 10 includes a chassis 12, a driver seat 14, a passenger seat 16, and a steering wheel 18 forward of the driver seat 14. The chassis 12 supports the vehicle components including the seats 14, 16. In alternate embodiments, additional seating may be provided rearward of the driver and passenger seats 14, 16.

The chassis also supports a roll cage 20, safety nets 22, and body panels 24. The chassis is constructed with rectangular metal tubing as well as round (or somewhat round) tubing, referring to the cross-sectional shape of the tubing. Generally, the rectangular tubing is hidden by the body panels 24, whereas most of the outwardly visible tubing is the round tubing. The round tubing is strong for perimeter support and has a desirable appearance that may signify off-road ability to some users. The round tubing is able to provide impact protection in strategic locations as well, such as along the bottom edge of the vehicle, the front and rear of the vehicle, and for the roll cage. The square tubing is advantageous for inner chassis support as it can be used to secure vehicle components without the need for as many tabs fixed to the chassis. Items can be secured to the rectangular tubing sides, such as by a simple weld or a fastener.

The vehicle 10 also includes a prime mover, preferably a gas-powered engine 26. The engine is held by the chassis 12. The engine is drivingly coupled to a pair of front wheels 28, having front tires 30 mounted thereon, the front wheels 28 being held to the chassis 12 with a front suspension 32. The engine is also drivingly coupled to a pair of rear wheels 34, having rear tires 36 mounted thereon, the rear wheels 34 being held to the chassis 12 with a rear suspension 38. Front and rear suspensions 32, 38 will be described in more detail below in connection with FIGS. 6 and 7.

Figure 1B:
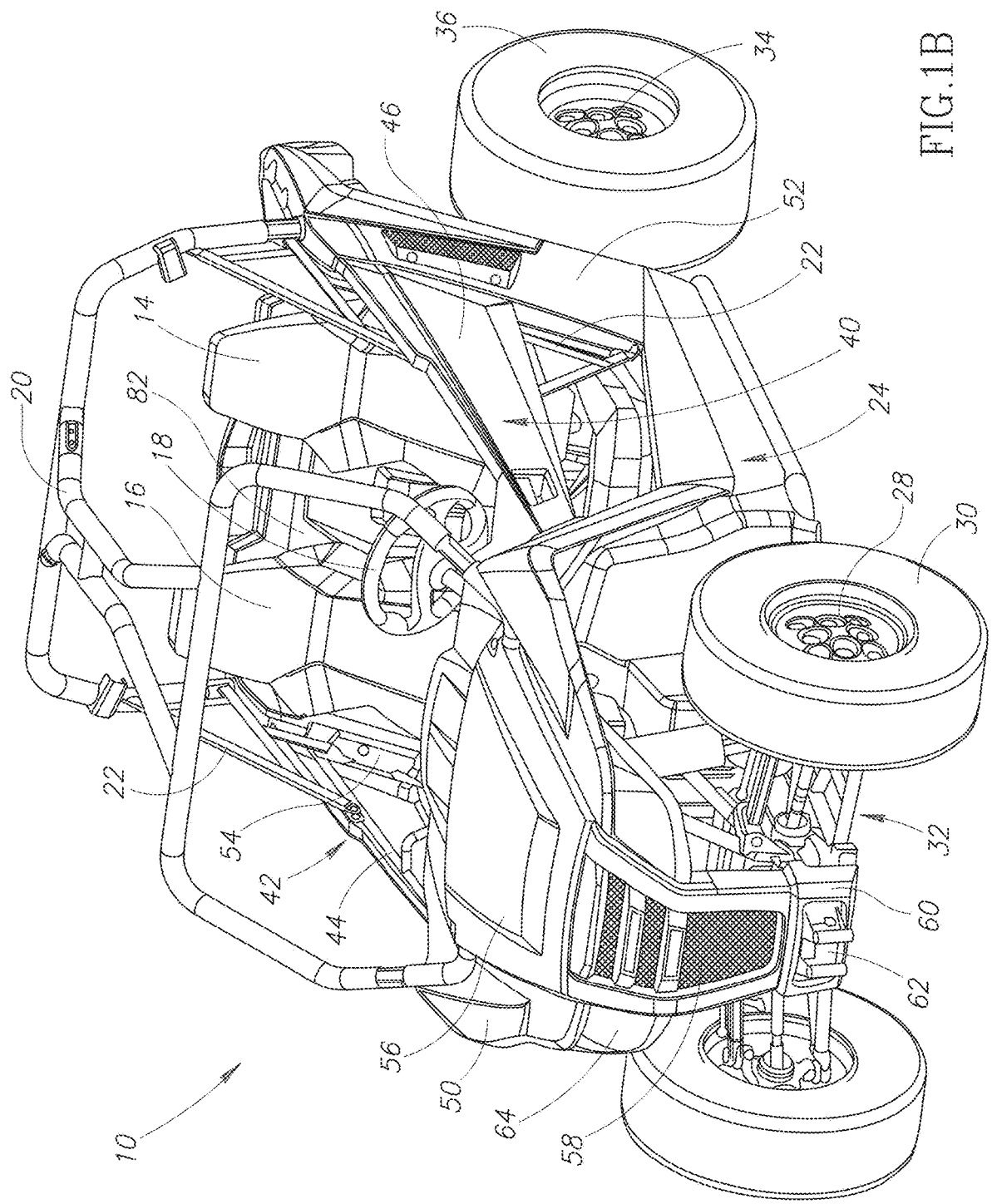

FIG. 1B also illustrates a general outer view of the vehicle 10. Front-opening driver and passenger doors 40, 42 are provided for ingress and egress to the occupant cabin having the seats 14, 16. The doors 40, 42 are constructed with door frames 44 that are hinged at the rear to the chassis and latched at the front to the chassis. Door panels 46 are preferably secured to the door frames 44. Door panels 46 cover the outside of the door frames 44, provide a pleasing external appearance and help to safely secure the occupants in the vehicle 10. Note that door frames 44 and door panels 46 do not extend vertically over the entire access opening on the side of the vehicle. The nets 22 help to cover some of the space, while allowing the vehicle to feel open and provide good visibility for the occupants in the generally off-highway terrain to which the vehicle is suited. Alternatively, nets 22 may be replaced with other structure or support to protect the driver and passenger while still allowing good visibility.

Spaced below the door panels 46 are foot panels 48. Foot panels 48 cover a lower portion of the chassis 12 and aid in keeping the occupants' feet and legs within the vehicle 10. Panels extending forward of the foot panels provide front fenders 50, arching over the front tires 30. Left and right-side panels 52, 54, extend above and behind foot panels 48. Side panels 52, 54 are secured to the chassis 12 rearward of the door panels 46. The space between side panels 52, 54, foot panels 48 and front fenders 50 is the access opening in the side of the vehicle 10. This opening is selectively closed by the doors 40, 42.

The front of the vehicle 10 is also shown in FIG. 1B. A hood panel 56 extends between the upper portions of front fenders 50 to cover a top front portion of the chassis 12. A grill panel 58 extends downwardly from the front of the hood panel 56. A bumper panel 60 is situated at the lower end of the grill panel 58 and may be an integral extension thereof. An opening may be formed in the bumper panel 60 to accommodate a winch 62 at the front of the vehicle 10. A pair of headlights 64 are preferably secured to the chassis 12 on either side of the grill panel 58, beneath the forward-most portion of front fenders 50.

Figure 1C:
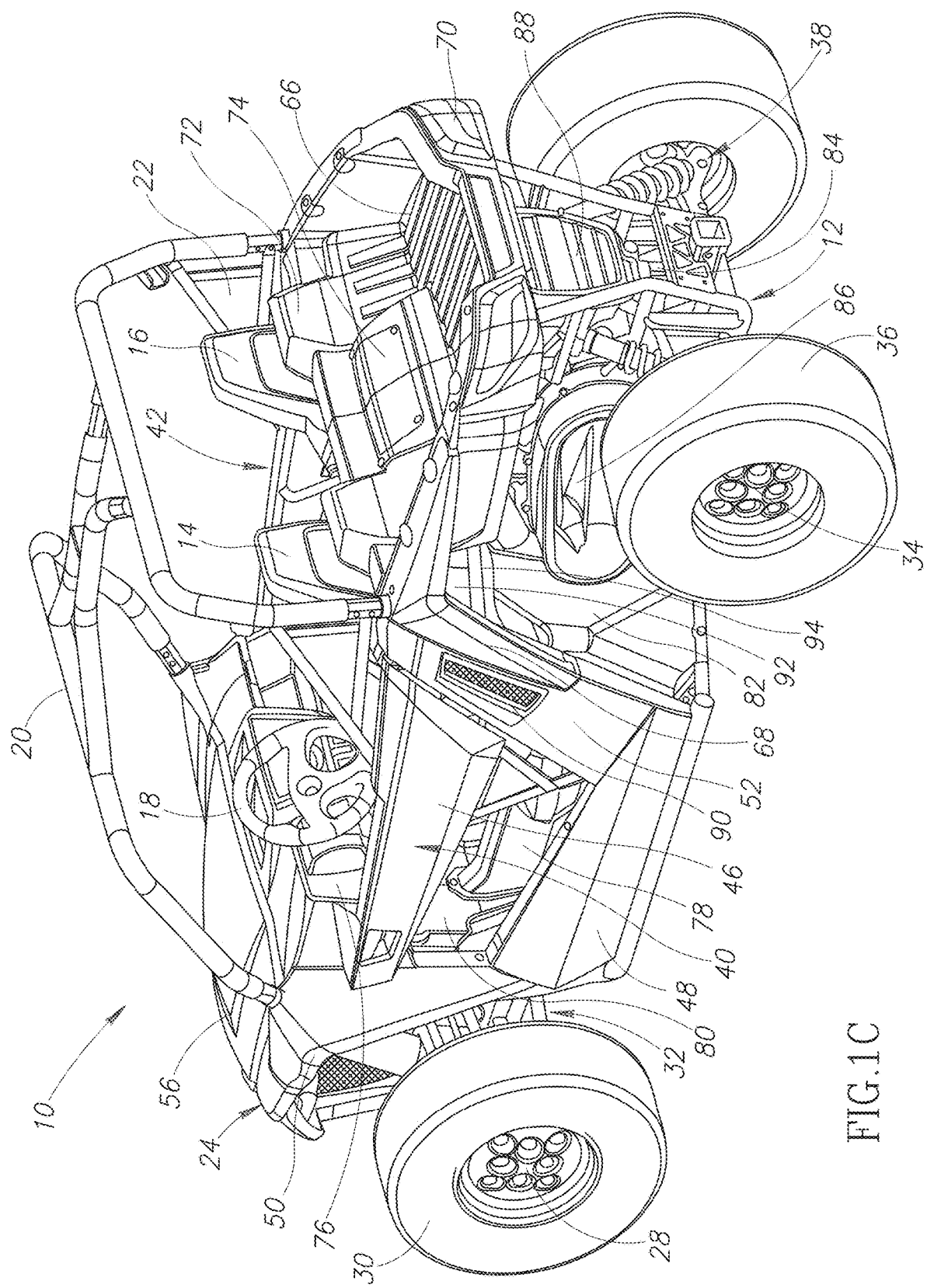

The rear outer aspects of the vehicle are shown in FIG. 1C. A rear cargo box 66 is provided rearward of the seats 14, 16. Rear fenders 68 extend on either side of the cargo box 66. The rear fenders 68 extend forward from the box to the side panels 52, 54. Fenders 68 extend downwardly partially along the rearward edges of the side panels 52, 54. Taillights 70 are secured to a rear grill that is in turn attached to the cargo box 66. Taillights 70 preferably include running lights and braking lights. They may alternatively include backup lights and/or turn signals.

A head panel 72 bridges the space between the cargo box 66 and the occupant cabin. The head panel includes an upper engine access door 74. This door preferably provides access to the top of the cylinder head (the valve cover and spark plugs) of the engine 26. Thus, minor maintenance tasks can be performed on the engine without removal of the head panel 72 and cargo box 66. The access door 74 is preferably secured closed with fasteners on its lower corners.

Within the occupant cabin a dashboard 76 is positioned forward of the seats 14, 16 and steering wheel 18. The dashboard 76 extends rearwardly from hood 56 and front fenders 50. The dashboard 76 includes openings for the steering column and the instrument gauge. In standard fashion it allows room beneath for the occupant's legs. A floorboard 78 is also seen in FIG. 1C beneath the dashboard. A passenger area front panel 80 extends between the floorboard 78 and the dashboard 76. Completing the occupant envelope is a passenger area rear panel 82 shown in FIG. 1B. The rear panel 82 extends behind the seats between the floorboard 78 and the head panel 72. These panels are preferably constructed of molded plastic. They are secured to the chassis 12 with fasteners.

Portions of the drive system of vehicle 10 are shown in FIG. 1C. A transaxle 84 is positioned rearward of engine 26. The transaxle 84 includes the transmission gears and rear gearcase to drive the rear axles. A continuously variable transmission (CVT 86) is positioned on the left side of the engine 26 and transaxle 84 and spans between the two to provide power from the engine 26 to the transaxle 84. The airbox 88 is also visible on the rear of the vehicle 10. The airbox 88 being positioned at the rear end of the vehicle, it is easily accessible for maintenance.

The left side of the vehicle 10 includes an air intake opening 90 within the left side panel 52. An engine air intake duct 92 and a CVT air intake duct 94 both extend from this opening 90, to the airbox 88 and the CVT 86, respectively.

Figure 1D:
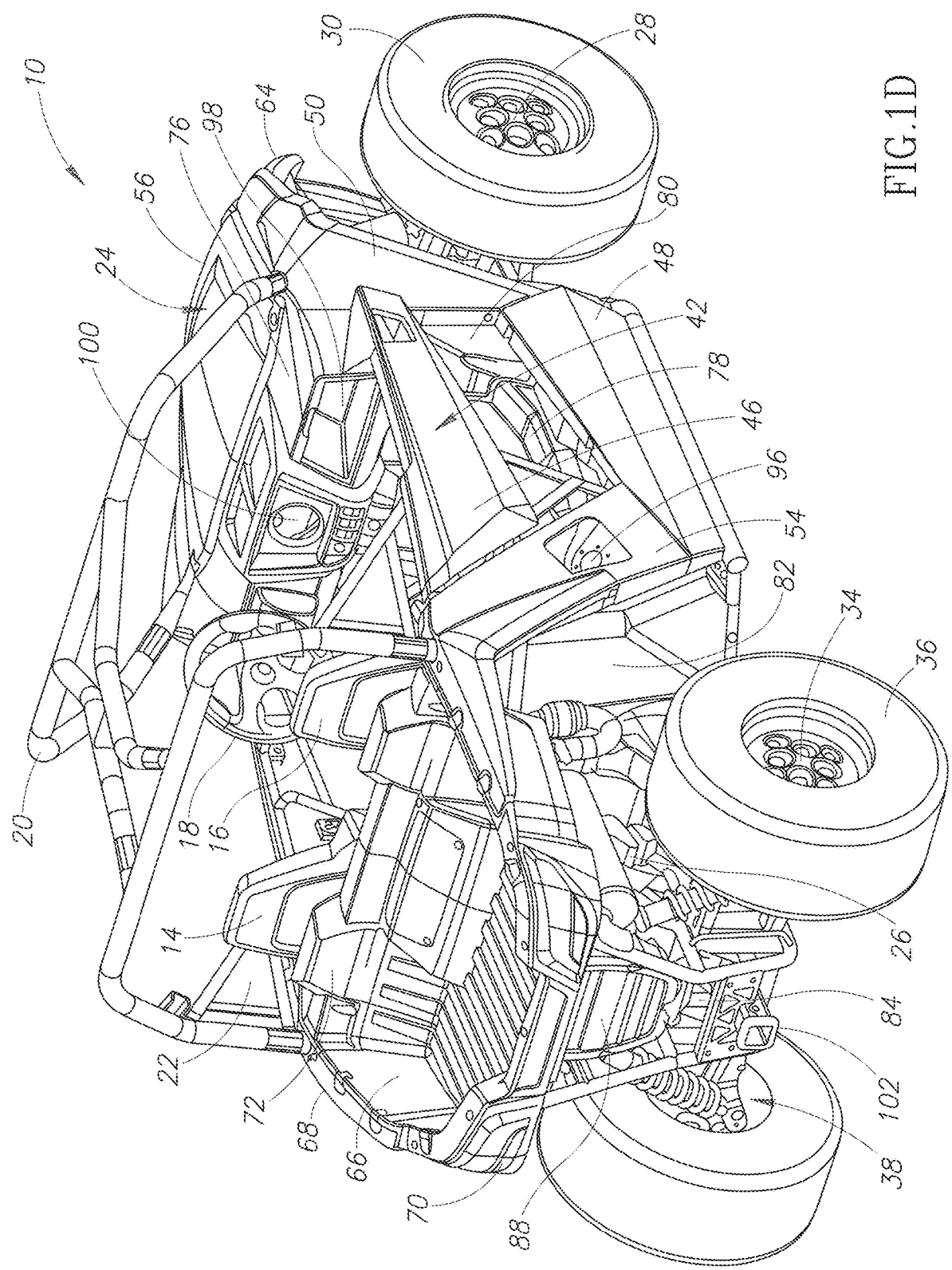

FIG. 1D illustrates some of the components from the rear right side of the vehicle 10. A fuel fill opening 96 is provided with the right side panel 54. A glove box 98 is recessed into the dashboard 76. An instrument gauge 100 is secured in the dashboard 76 preferably between the glove box 98 and the steering wheel 18. A receiver hitch 102 is provided extending from the rearward-most portion of the chassis 12, rearward of the transaxle 84.

Figure 2A:
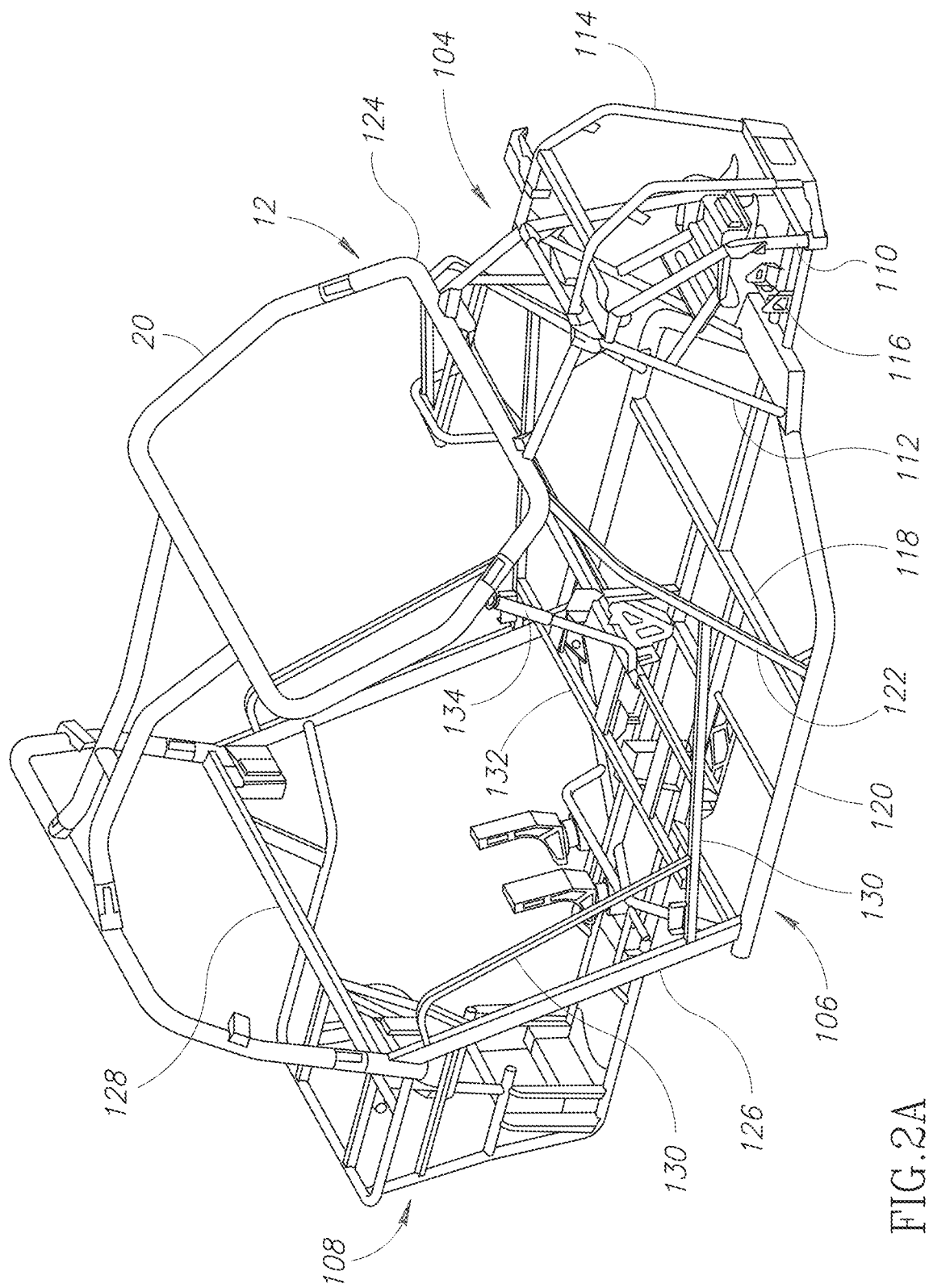
FIGS. 2A-B are isometric views of the chassis of the vehicle shown in FIGS. 1A-D.
Figure 2B:
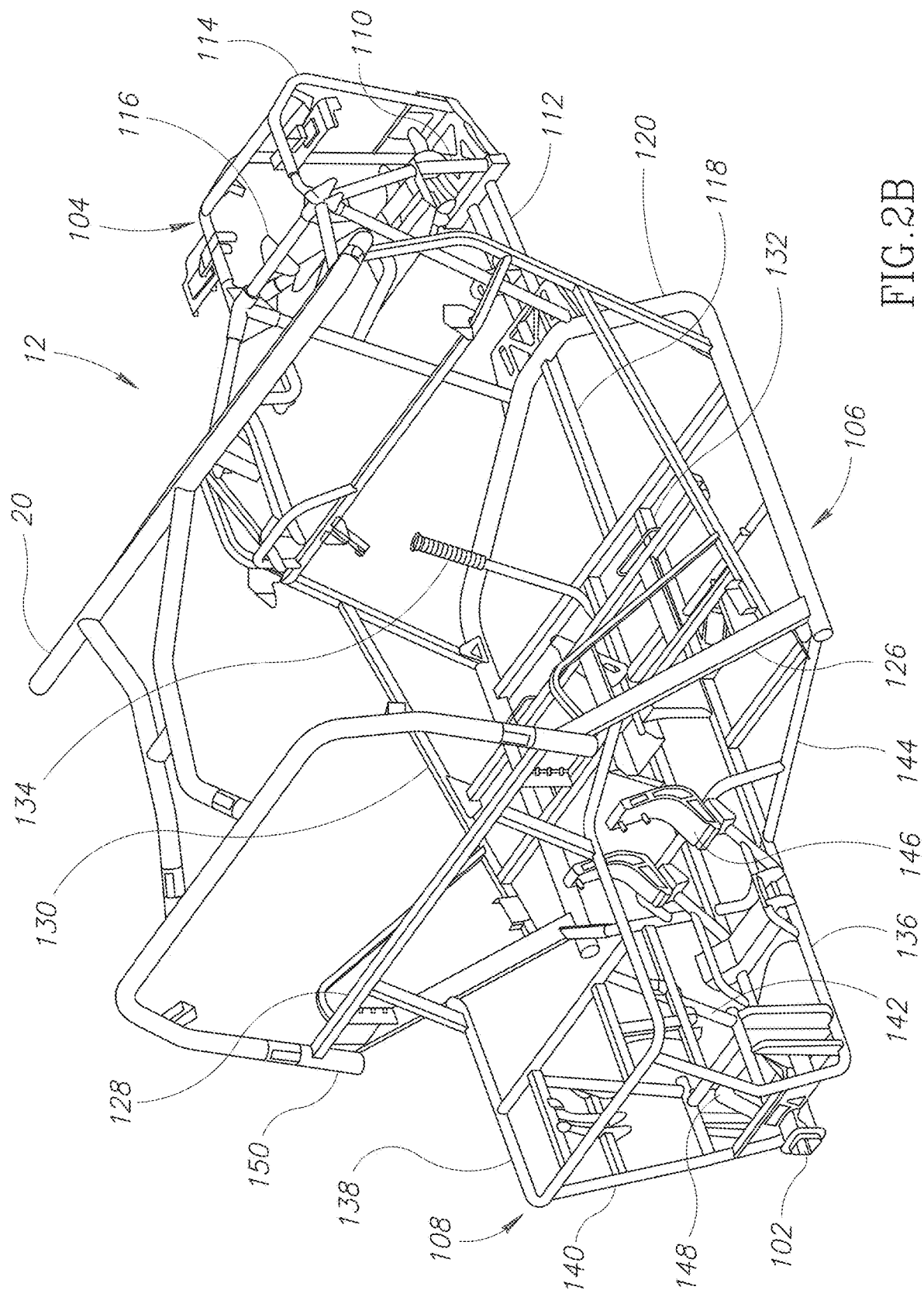

Details of the chassis 12 are seen in FIGS. 2A and 2B. The chassis 12 includes a chassis front portion 104, a chassis mid portion 106, and a chassis rear portion 108. The front portion 104 secures the front suspension 32, the steering mechanism (not shown), and the winch 62. It also supports other components, such as headlights, a radiator, electrical lines, and hoses discussed in more detail below. The mid portion 106 secures the occupant area and related components of the vehicle 10. The rear portion 108 secures the rear suspension 38, the engine 26, and the transaxle 84.

More specifically the chassis front portion 104 includes front bars 110, front support frame 112, bumper bars 114, and various brackets 116. Front bars 110 are round tubular frame pieces welded together and extending along the front of the chassis 12, curving slightly outwardly from top to bottom. The front bars 110 are bolstered behind by the front support frame 112. Bumper bars 114 are fastened to front bars 110 forward of front bars 110. As discussed below, bumper bars 114 provide securement and protection for the radiator and help secure the lights and winch 62.

The chassis mid portion 106 includes undercarriage frame members 118 that are secured at their forward end to the chassis front portion 104. Preferably the undercarriage frame members are tubes with rectangular cross sections welded together, except for an outer lower rail 120 that has a larger, round cross section. Lower rail 120 extends along the lower sides of the chassis mid portion 106 to protect the chassis from impacts. As seen in FIGS. 1A-D, the lower rail 120 is visible below the body panels 24 (including foot panels 48), whereas the remainder of the undercarriage frame is generally hidden from view. Lower rail 120 extends on each side of vehicle 10 from the rear of chassis mid portion 106 then bending medially to connect to the narrower chassis front portion 104. Impact with dirt, rocks, logs, or other terrain may be more common along the portion of the chassis 12 formed by the lower rail 120. It's larger, round cross section is well suited to protect the remainder of the vehicle. The remainder of undercarriage frame 118 is preferably welded directly to the inner sides of lower rail 120.

Rising up from undercarriage frame 118 near the bend in lower rail 120 is a front frame member 122 on each side of chassis 12. Front frame members 122 rise upwardly and forwardly to meet a dash bar 124. Dash bar 124 extends across the front of chassis mid portion 106 and is also connected to the tops of front bars 110 inboard of the connections to front frame members 122. Dash bar 124 is also preferably of larger, round cross-sectional shape. After connecting with front frame members 122, the dash bar 124 bends upwardly and rearwardly to connect to the roll cage 20.

At the rear ends of lower rails 120, rear frame members 126 extend upwardly, defining the rear corners of chassis mid portion 106. These frame members, rectangular in cross section, extend upwardly and slightly rearwardly to a connection with a head bar 128 and the rearward end of the roll cage 20. Head bar 128 extends from one side of the rear of the chassis mid portion 106 to the other. Head bar 128 and the rear frame members 126 frame the upper and sides of a chassis opening into which the engine and transaxle are preferably inserted. These chassis members form the rear structural support for the vehicle.

Additional support frame members are provided in the chassis mid portion 106. Side support members 130 extend between rear frame members 126 and front frame members 122 on each side of the chassis mid portion 106. Side support members 130 also secure a seat support frame 132 in place. Seat support frame 132 extends across chassis mid portion 106 from one side to the other and includes securement brackets for seats 14, 16. Seat support frame 132 is preferably constructed of two separate weldments—a front weldment and a rear weldment. The front weldment is secured to the rear weldment with longitudinally extending channels between the two. A passenger grip 134 is also fastened to the seat support frame 132. The passenger grip 134 extends upwardly and forwardly from a front mid portion of the seat support frame 132. As will be discussed below, the passenger grip 134 extends upwardly on the medial side of the passenger seating area.

FIG. 2B better illustrates the rear frame members of chassis rear portion 108. Chassis rear portion 108 includes rear lower frame members 136 along the bottom of the chassis rear portion 108 and rear upper frame members 138 along the top of the chassis rear portion 108. Rear tubes 140 extend from the upper frame members 138 to the lower frame members 136 at the rearward end of the chassis 12. In the preferred embodiment, rear tubes 140 extend continuously into lower frame members 136. Rear tubes 140 preferably are constructed of round cross-sectional tubing. Further rear framing is provided with rear support members 142 extending between lower frame members 136 and upper frame members 138. These members provide additional structural support and mounting locations for vehicle components, such as the engine 26, the transaxle 84, the rear suspension 38, and the cargo box 66.

The chassis rear portion 108 also includes lower rearward supports 144 that triangulate the connection between the chassis mid portion 106 and the chassis rear portion 108. Rearward supports 144 extend from the rearward ends of lower rails 120 to the rear lower frame members 136. These supports also provide securement for engine front mounts 146 in the forward end of the chassis rear portion 108. Transaxle rear mounts are also provided; they are secured to the rear support members at the rearward end of the chassis rear portion 108. The engine and transaxle mounts will be shown in more detail in connection with the engine and transaxle discussed below.

Also shown in FIG. 2B are tube couplers 150 welded between the rear frame members 126 and the head tube 128. These couplers also provide securement to the roll cage 120.

Figure 3A:
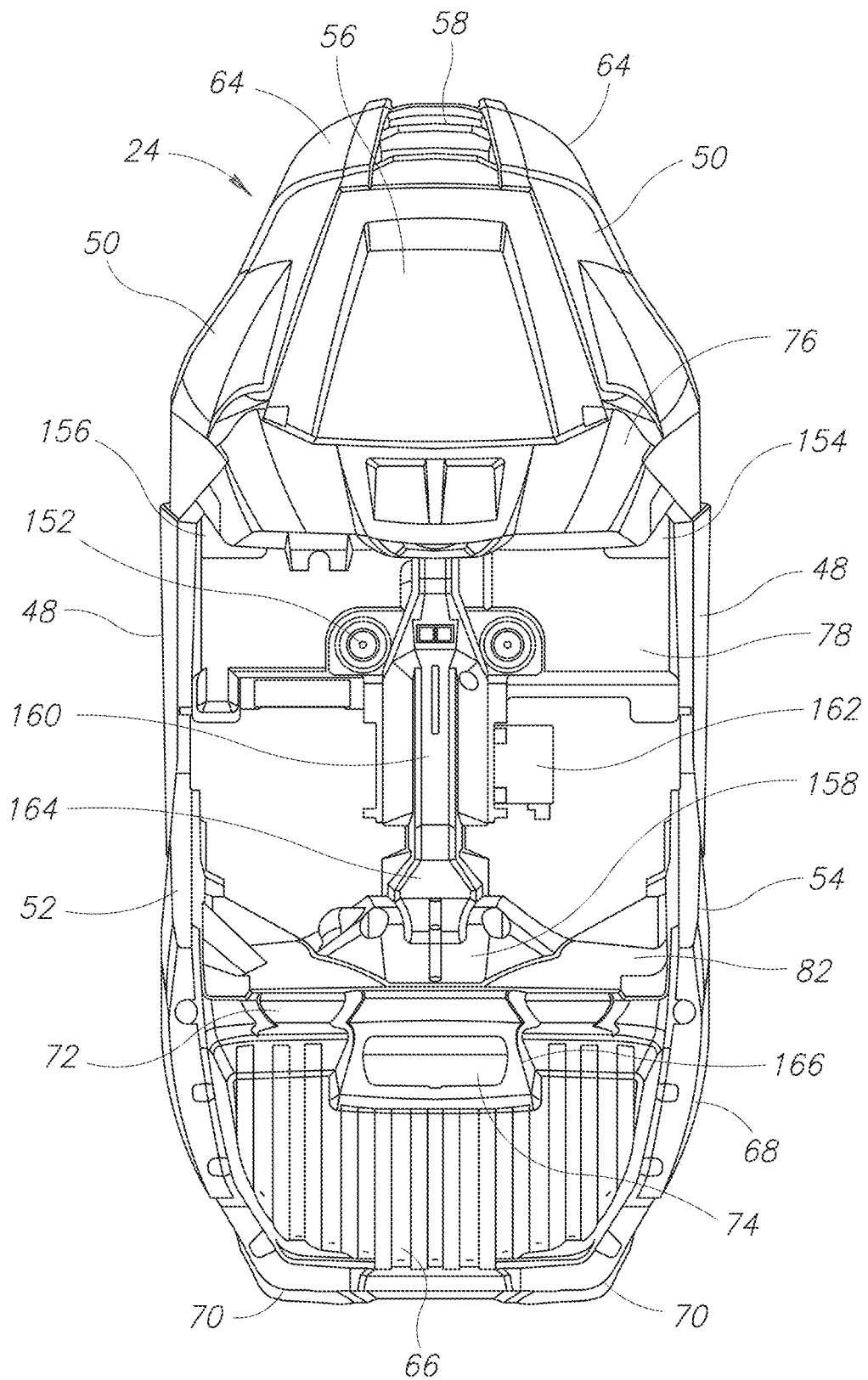
FIGS. 3A-C are top and side views of the body panels of the vehicle shown in FIGS. 1A-D.
Figure 3B:
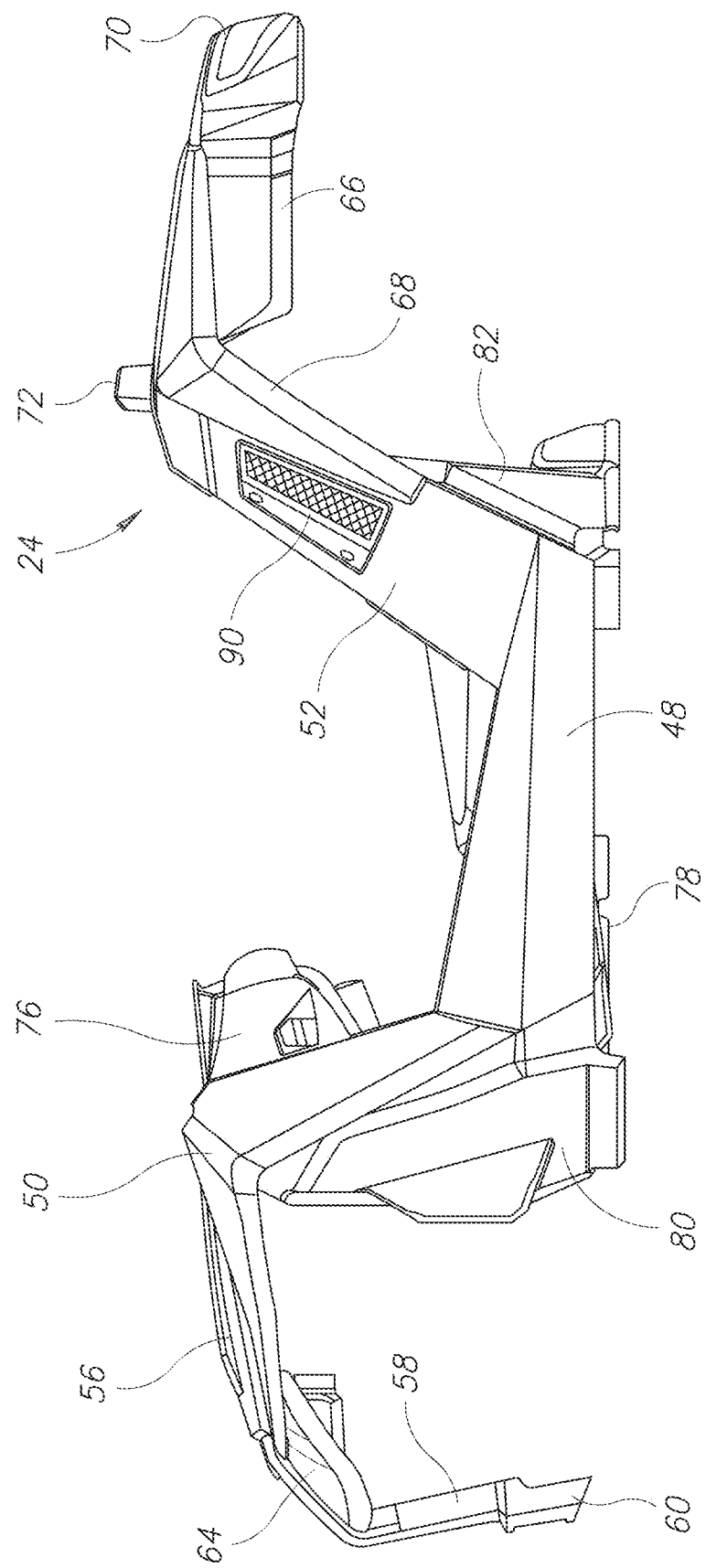

FIGS. 3A through 3D illustrate the body panels 24 that are secured to the chassis 12. Several of the panels have already been mentioned. FIGS. 3A and 3B show in more detail several features of the vehicle occupant cabin. Floorboard 78 includes cup holders 152 molded integrally therewith. Floorboard 78 is preferably molded in a single piece. However, it may alternatively be molded in two parts—a driver side and a passenger side, each with cup holders 152, as well as a driver footrest 156 and a passenger footrest 154. The footrests are "dead pedals" that the occupants can use for resting a foot or bracing themselves within the vehicle 10. The footrests 154, 156 are also preferably integrally molded with the floor panels.

Additional body panels 24 are within the vehicle cabin including an engine cover 158, a center console 160, a battery cover 162, and a lower engine access panel 164. Rear panel 82 is formed in two parts—a right side and a left side. The engine cover 158 is formed of a right and a left part, fastened down the middle. The two outer sides extend from the two sides of passenger area rear panels 82 and are attached thereto. The center console 160 is a raised hump between the seats that accommodates the driveline, the shift cable, cooling hoses, and the electrical harness. An opening in the top of the center console 160 allows for movement of the shift lever. The lower engine access panel 164 is held on the forward end of the engine cover and allows access to the oil filter and dipstick, as will be shown in more detail below.

An upper engine cover 166 is also provided at the rear of the head panel 72 within the cargo box 66. Upper engine cover 166 extends integrally from head panel 72. It includes the upper engine access door 74, mentioned above.

Figure 3C:
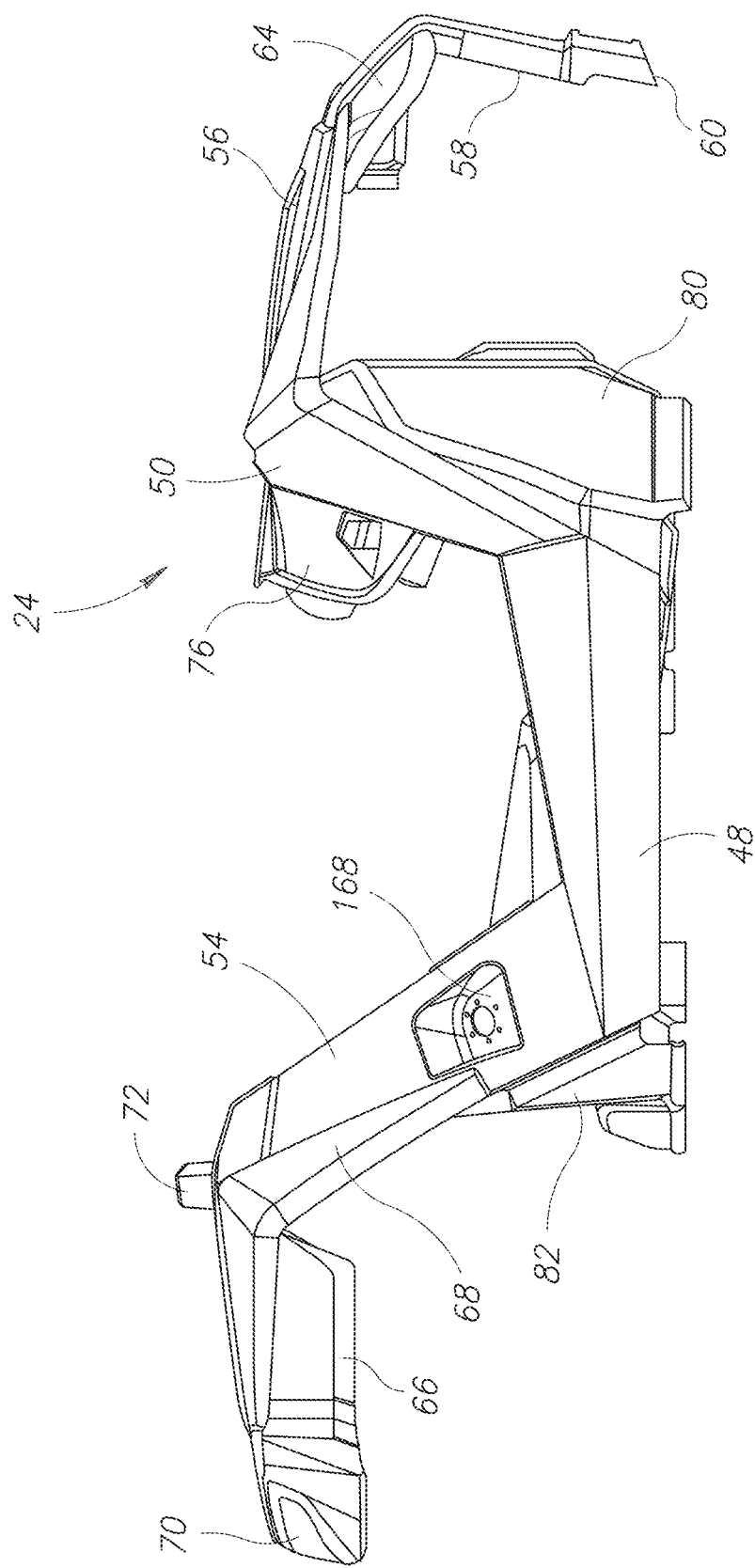

FIG. 3C illustrates the right side of the body panels. A fuel fill recess 168 is shown in the right-side panel 54. The forward extent of the passenger area front panel 80 is also well shown here, as well as the rearward extent of the passenger area rear panel 82.

Figure 3D:
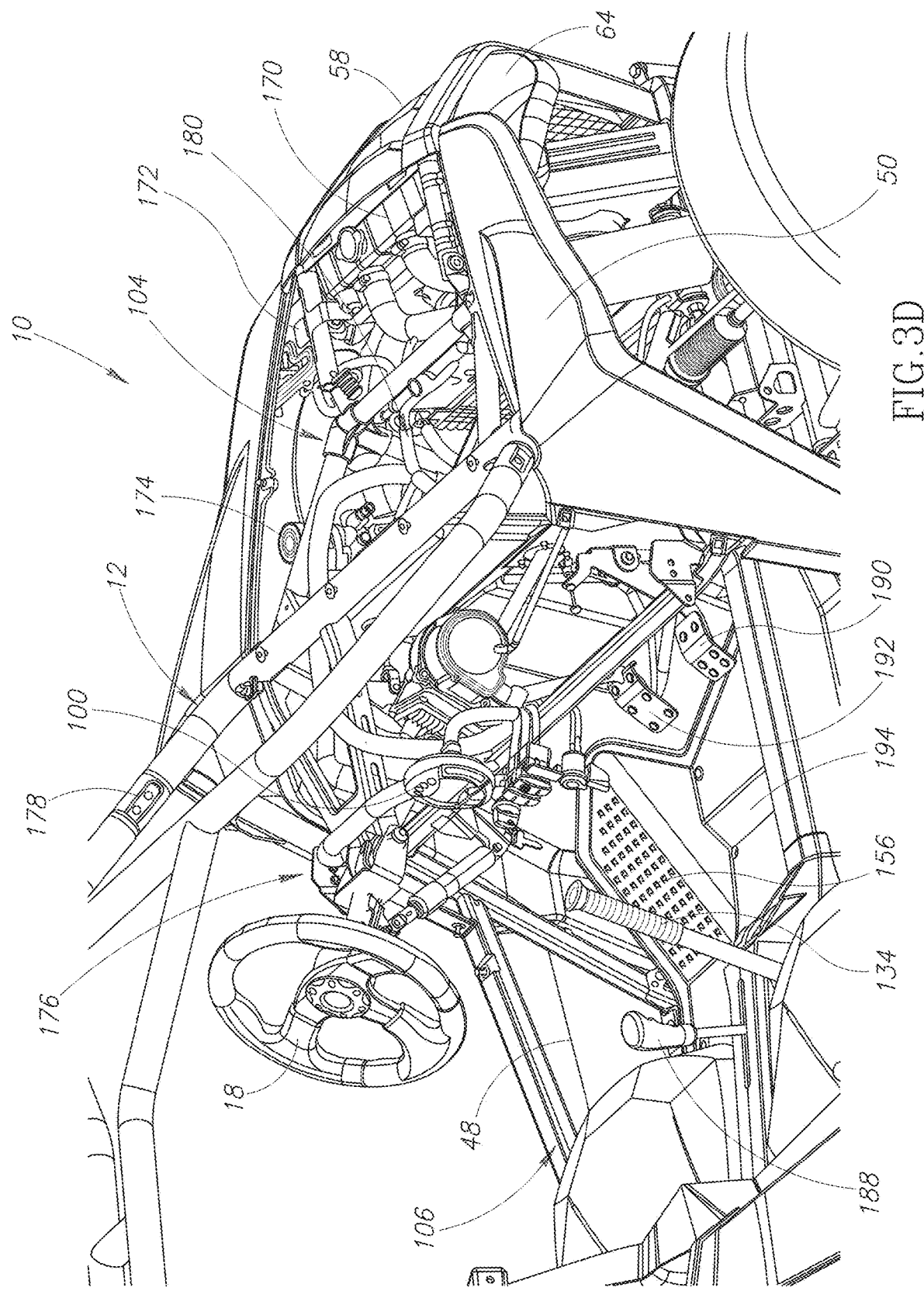
FIG. 3D is an isometric view of a portion of the vehicle of the present invention with the hood and dash removed.

FIG. 3D provides a close-up view of the body panels 24 secured on the chassis over numerous vehicle components. A radiator 170 is positioned rearward of the grill panel and between headlight assemblies 64 on the right and left sides of the radiator 170. The headlight assemblies extend between the front fenders 50 and the grill panel on either side of the upper end of the radiator 170. With regard to the chassis 12, the radiator is situated between the bumper bars 114 and the front support frame 112 (see FIG. 2A).

Also shown among other components is a brake reservoir 174, which is accessible under the hood panel 56. Several components are accessible under the hood panel 56, including the radiator 170, the headlight assemblies 172, a steering assembly 176, and portions of the front suspension 32. Above the hood and other body panels, roll cage couplers are provided at the upper ends of the dash bar 124. Note that storage space 180 is also provided under the hood panel 56. A bin or other member may be advantageously provided under the hood for this purpose. As several components along with storage space 180 may be accessed under the hood panel 56, hand fasteners are preferably provided to secure hood panel 56 in place.

FIGS. 4A-D illustrate various ergonomic aspects of the vehicle 10. The vehicle occupant cabin is shown with the seats 14, 16, floorboard 78, doors 40, 42, and controls including the steering wheel 18. The doors include door latches 182 that may be opened from the outside of front of the rearwardly opening doors. The doors 40, 42 are hinged at a slight angle such that they swing outwardly and downwardly. Thus, they stay open due to gravity until closed. Nets 22 or other structure may be secured to the top and bottoms of the rearward ends of the doors 40, 42 to provide additional protection to the occupants. In place of nets, additional structure may be provided to provide impact protection and securement within the cabin.

The door frames 44 include upper and lower bars over which the door panels 46 are secured. An interior passenger door hand hold 184 extends from the upper bar to the lower bar on the passenger door frame 44 above and to the right of the front of the passenger seat 16. Door hand hold 184 is angled forwardly as it extends upwardly so as to provide a comfortable grip to the occupants.

In the case of the passenger door handle, it provides a convenient place for the passenger to grasp when riding to steady himself or herself as the vehicle 10 moves. The passenger may comfortably grasp the door handle 184 with the right hand and the passenger grab bar or grip 134 with the left hand. The handle 184 and bar 134 are located at the forward end of the seating area at nearly the same longitudinal location along the vehicle 10. The grab bar 134 also helps to separate the passenger from interfering with the operation of the vehicle. For example, the bar 134 separates the passenger from a shift lever 188. Thus, the passenger's leg will not bump the shift lever 188 that extends up through the center console 100. The grab bar is preferably a bar of round cross section with a rubber grip on the upper end thereof. The door handles 184, 186 may also have rubber grips.

A throttle pedal 190 and a brake pedal 192 are also accessible to the driver seated in the driver seat 14. As the preferred embodiment of the vehicle utilizes a CVT, a clutch pedal is not shown, although can be provided in alternate embodiments. The pedals 190, 192 are forward of and slightly above a heel rest 194. Heel rest 194 is provided in the floorboard 78 as an angled face providing a step for locating the heel of the driver by feel. This allows the driver to easily place his or her foot at the proper location to operate the vehicle 10 even while traversing rough terrain. Undercarriage frame 118 may extend behind the floorboard 78 adjacent the underside of heel rest 194 to provide additional support. The floorboard rearward of heel rest 194 may be sloped to provide for the step of heel rest 194. Heel rest 194 extends between driver footrest 156 and a floorboard hump. It also extends on the passenger side of floorboard 78 between the passenger footrest 154 and floorboard hump 196. Floorboard hump 196 houses a portion of the driveline, hoses, and electrical wires.

Figure 4A:
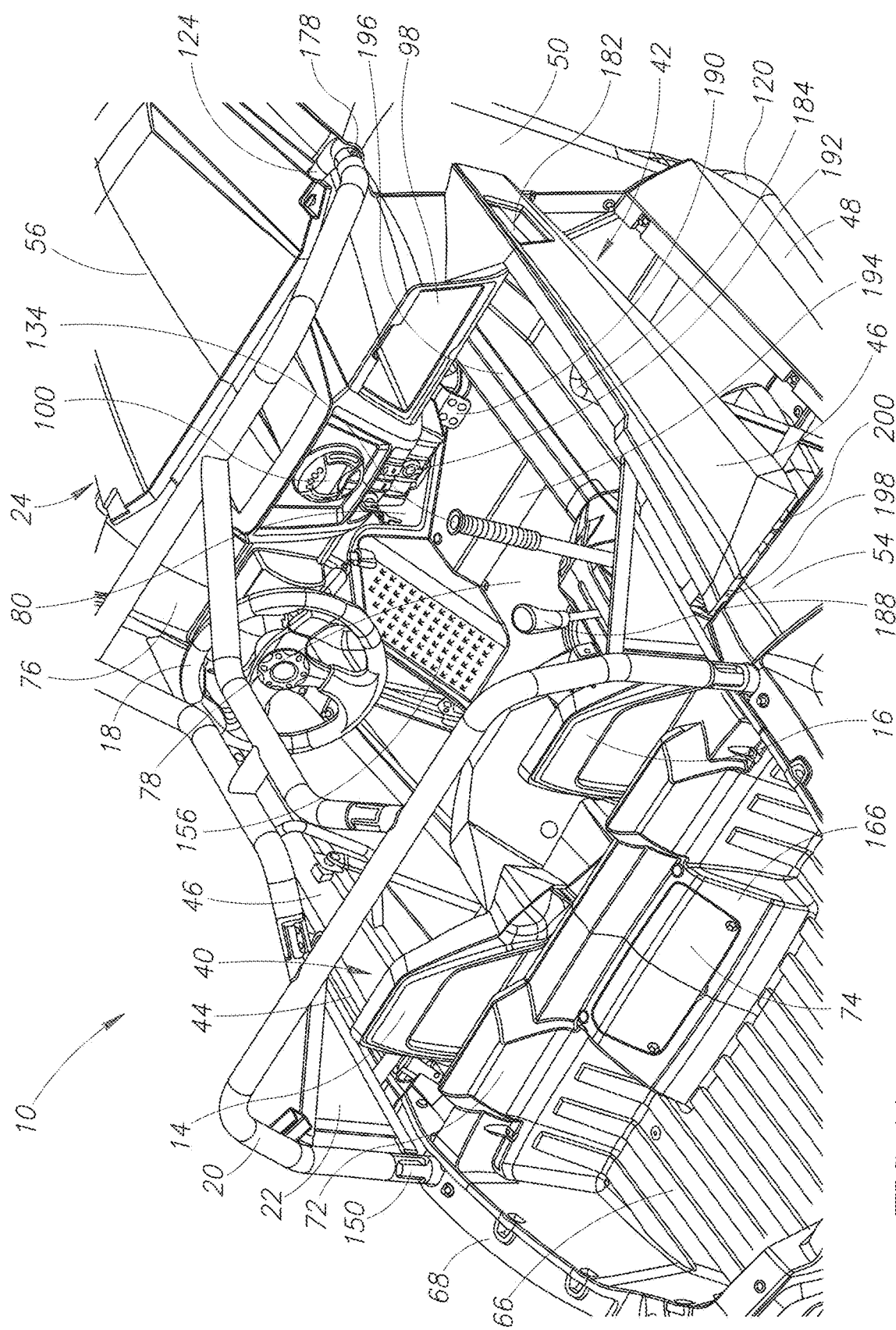
FIGS. 4A-D are isometric views into the occupant cabin of the vehicle.
Figure 4B:
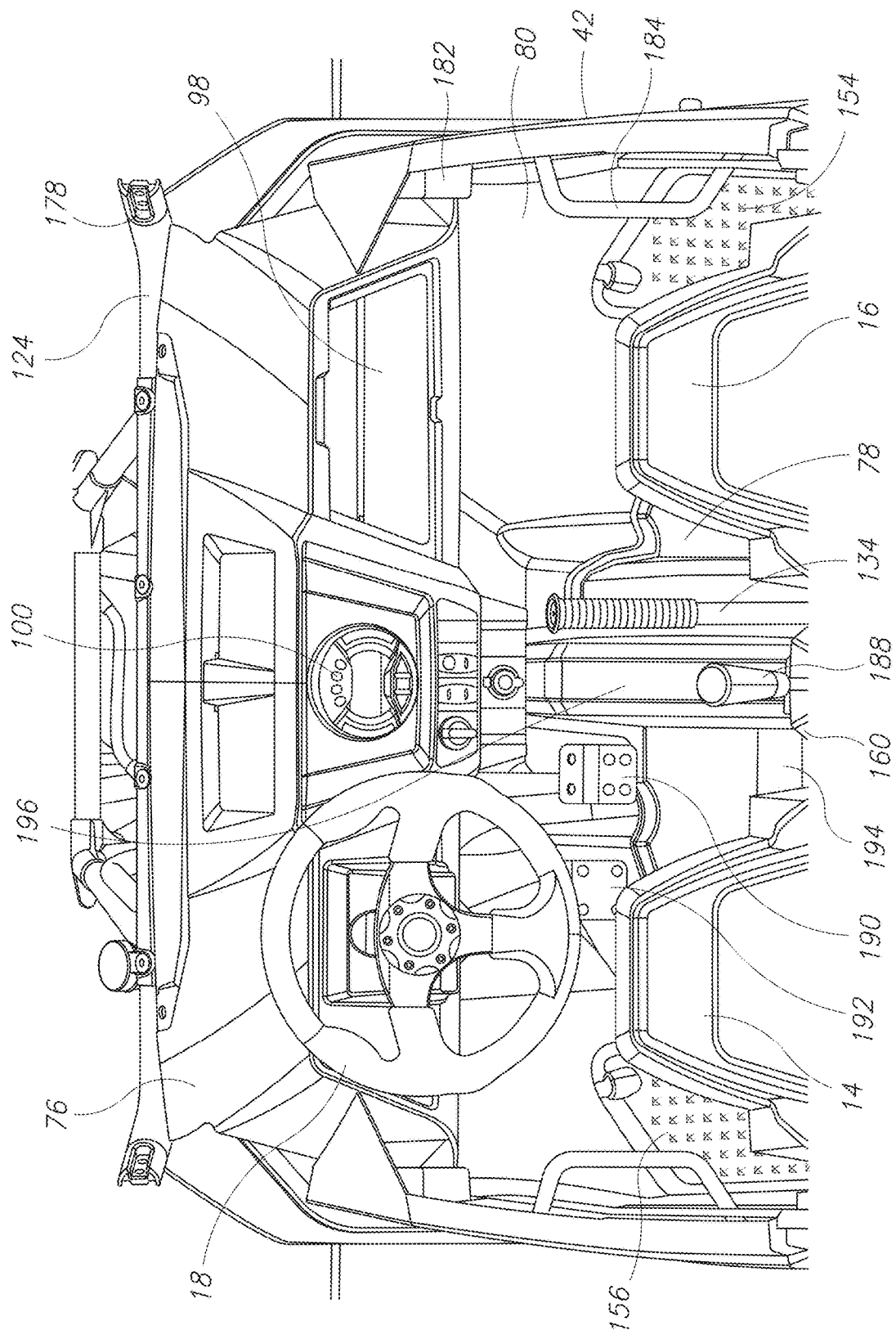
Figure 4C:
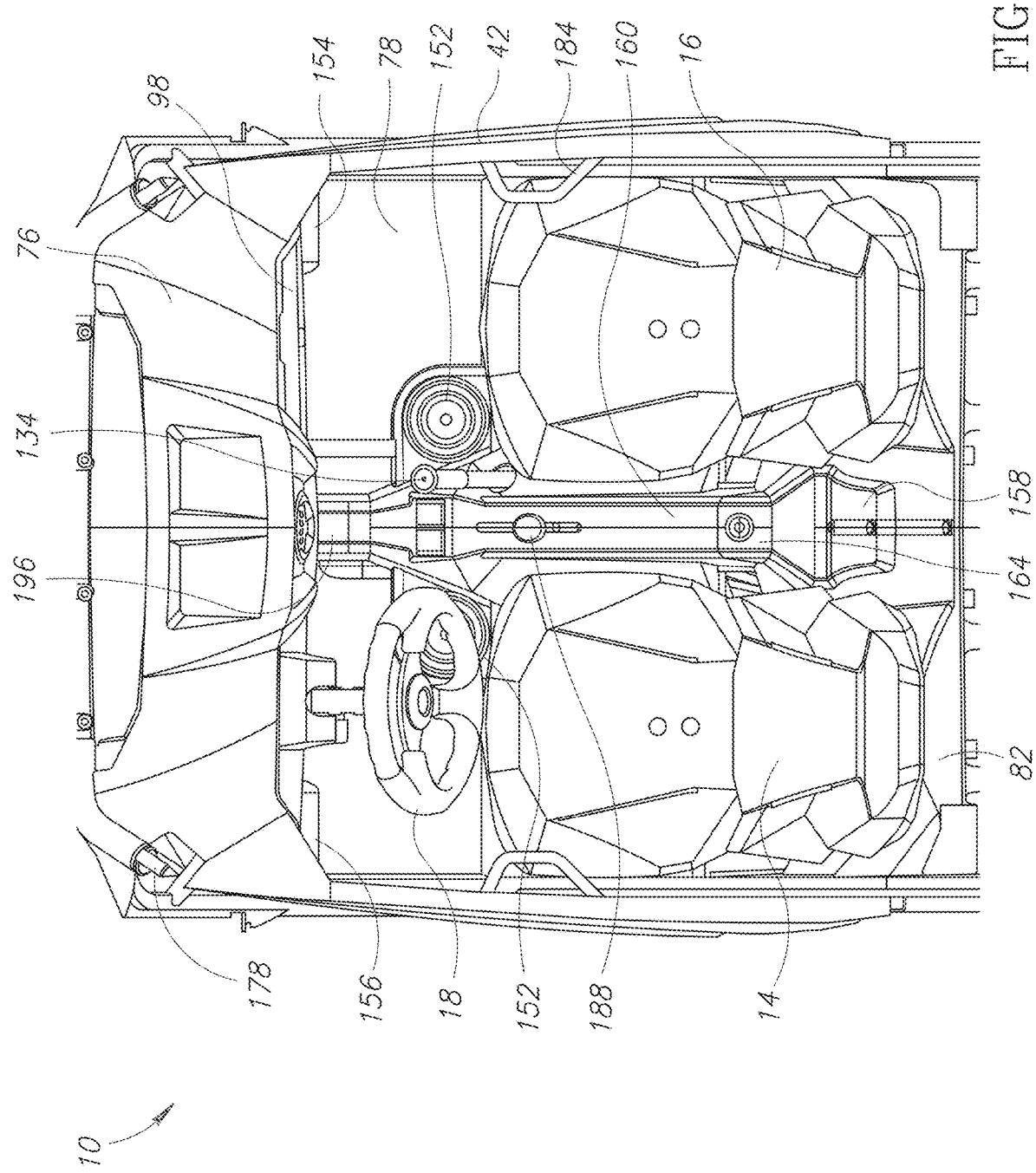
Figure 4D:
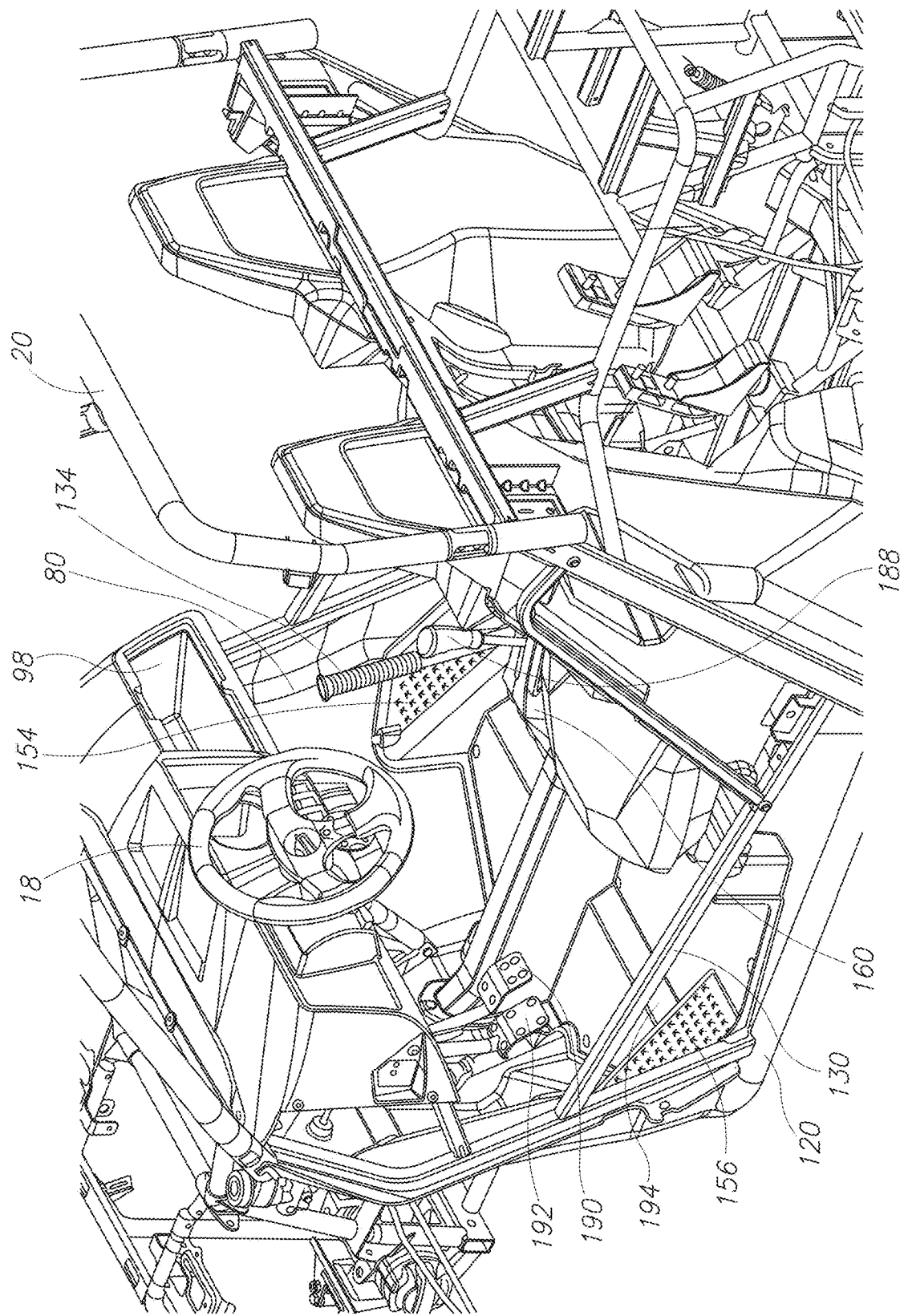
Figure 4E:
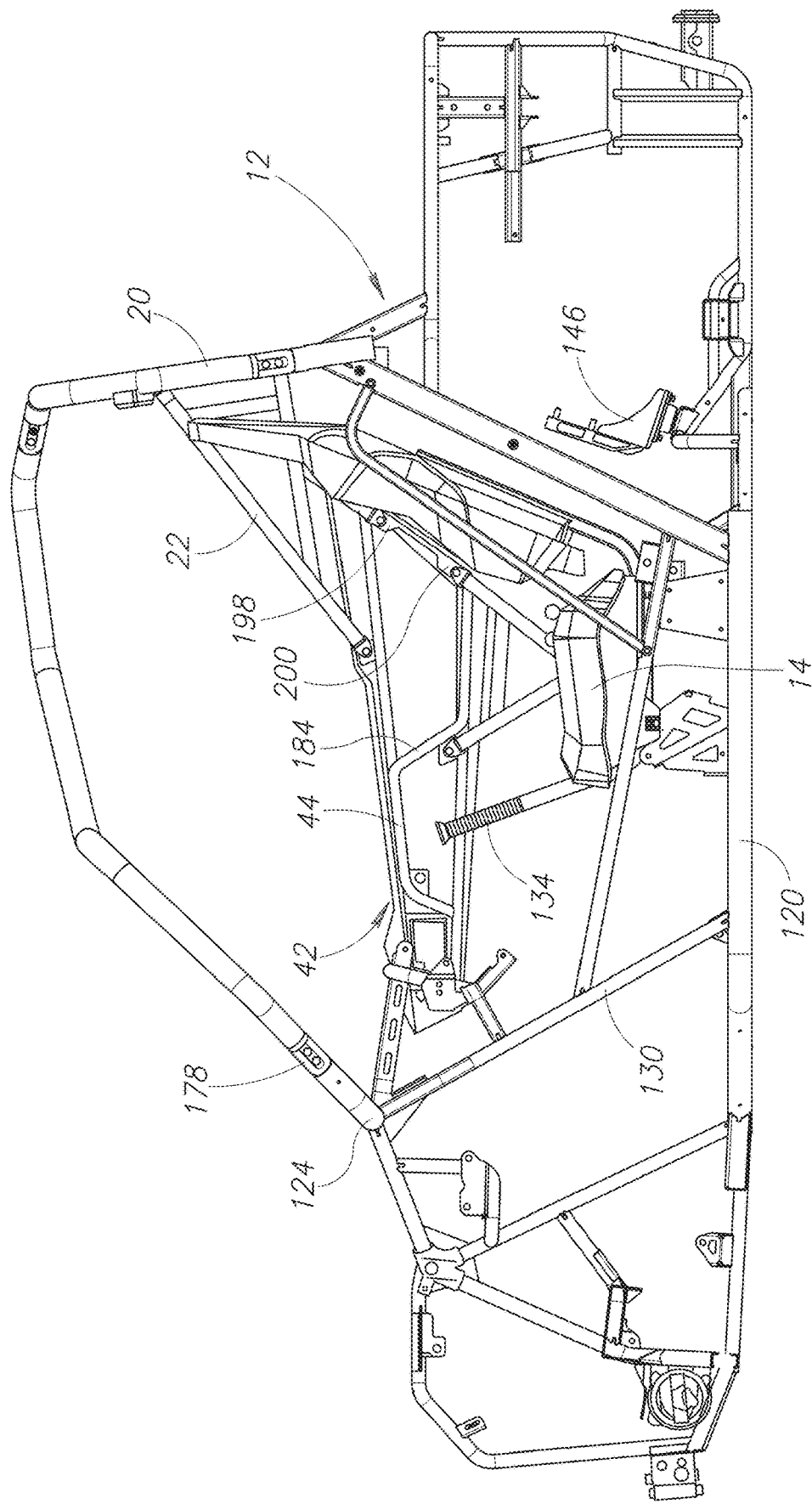
FIG. 4E is a side-elevational view of a portion of the vehicle illustrating passenger seating.

FIGS. 4A and 4E show the position of the upper and lower door hinges 198, 200. The hinges are secured between the side support members 130 and the door frame 44 on each door. The hinges may be any member allowing pivotal movement between the door 40 and the chassis 12. As discussed above, the hinge axis is tilted rearwardly in the preferred embodiment illustrated, such that the door swings rearwardly and downwardly when opening.

FIG. 4A also shows some detail of the head panel 72 that extends over the head bar 128 rearward of the seats 14, 16.

Head panel 72 bridges the space between the cargo box 66 and the passenger area rear panel 82. Head panel 72 includes raised portions rearward of the tops of the seats 14, 16 with a recess between the raised portions for rearward visibility.

The arrangement of the vehicle 10 provides a low center of gravity and places the driver and passenger low in the vehicle near the center of gravity of the vehicle. This helps improve the stability and ride quality of the occupants over rough terrain. Extending the wheelbase to over 80 inches, preferably about 83 inches also aids in the stability of the vehicle and allows the positioning of the seats 14, 16 lower in the chassis 12.

Figure 5B:
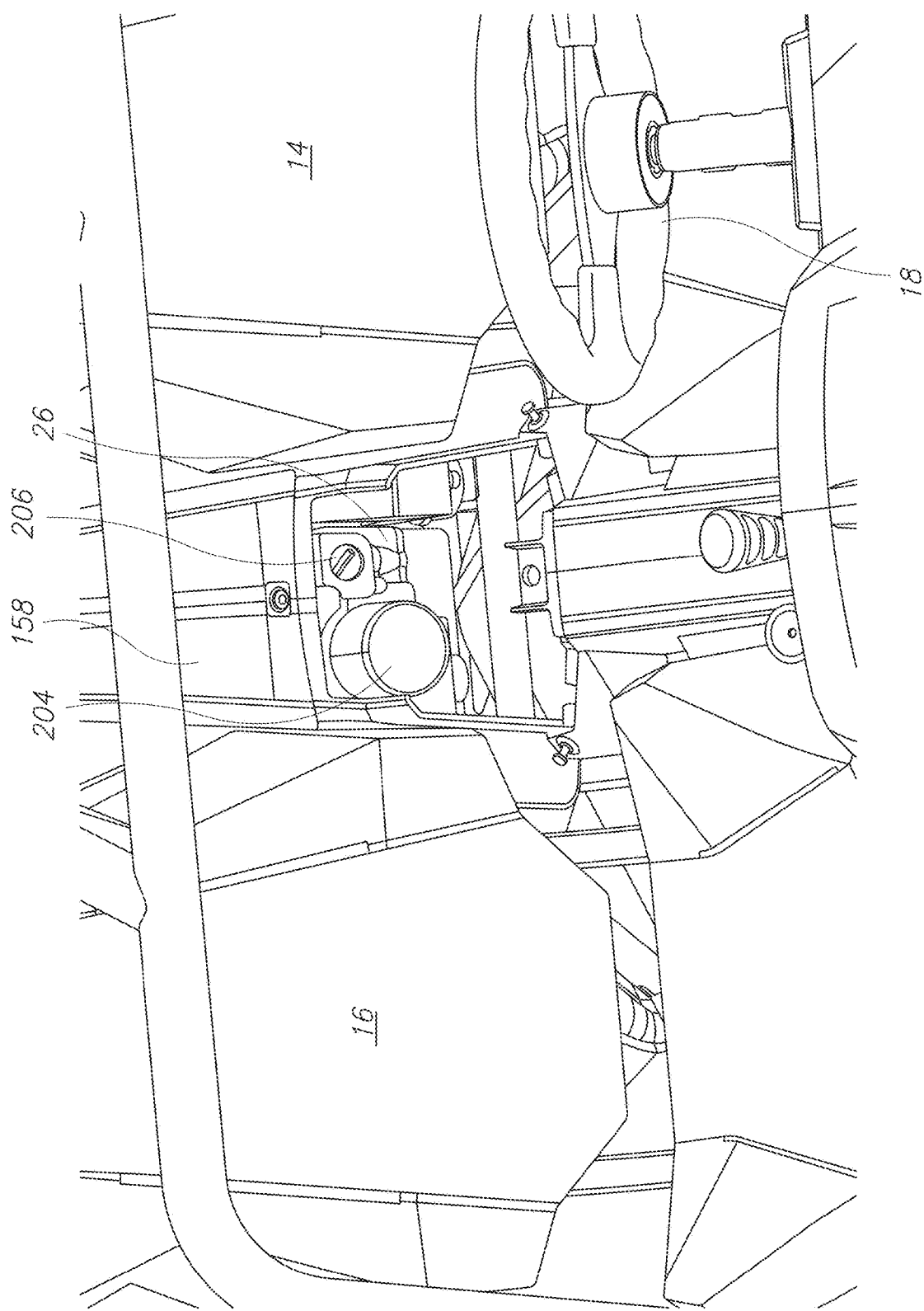
FIG. 5B is a view with the panel of FIG. 5A removed.
Figure 5C:
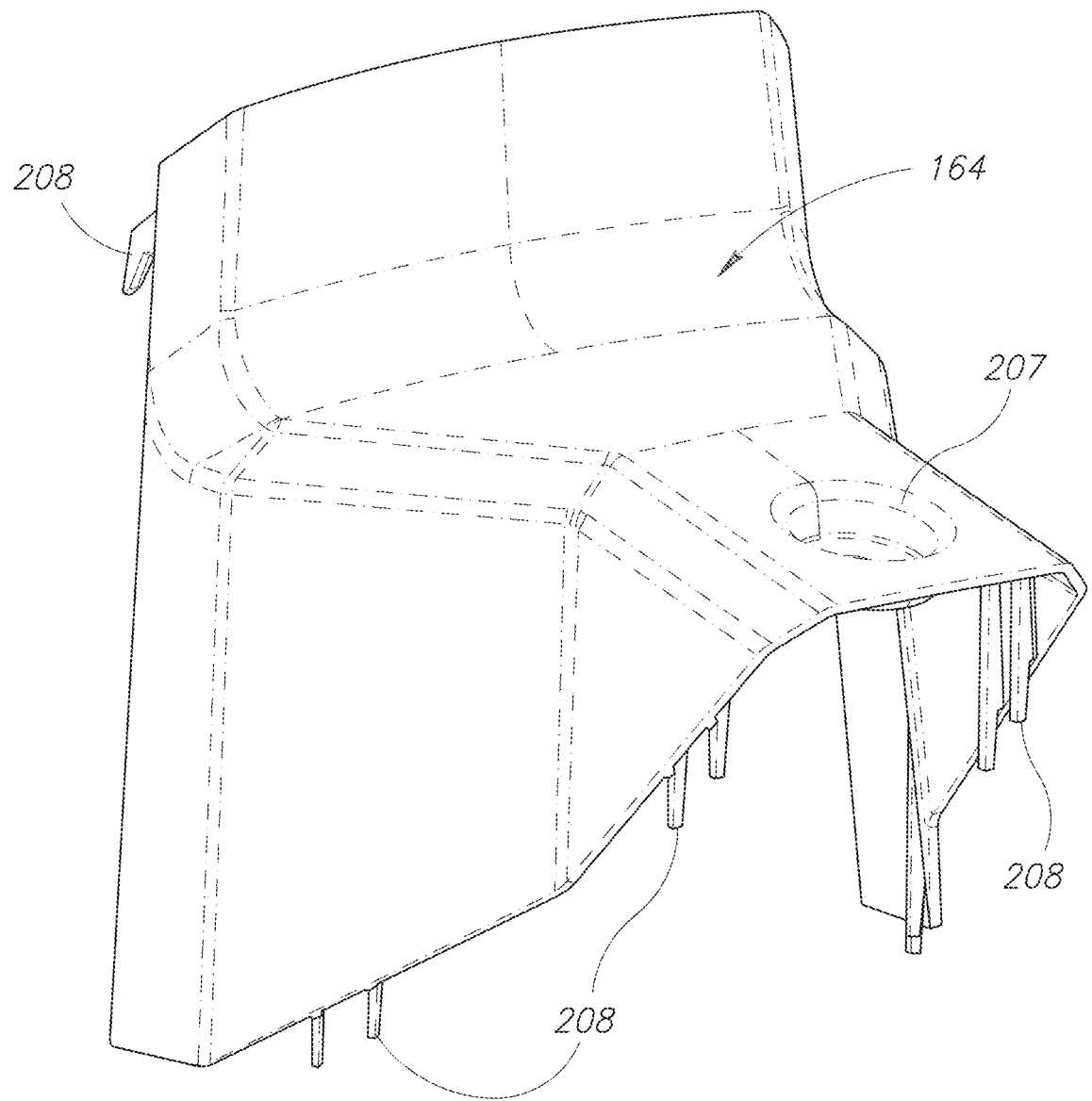
FIG. 5C is an isometric view of the panel of FIG. 5A.

FIGS. 5A-C illustrate the lower engine access panel 164 that is rearward of and laterally between the seats 14, 16 in the vehicle cabin. A panel fastener 202 secures the access panel to the rearward end of the center console 160. The fastener 202 employs a tab that may be turned by hand to remove the panel. The shape of the access panel 164 continues the shape of the center console 160 and transitions to the shape of the engine cover 158 as the access panel 164 extends rearwardly.

With the lower engine access panel 164 removed, an oil filter 204 and dipstick 206 may be accessed as shown in FIG. 5B. As shown in FIG. 5C, the access panel 164 includes a fastener recess 207 in which the panel fastener is placed. Securement tabs 208 extend from the sides of the panel to engage the surrounding engine cover 158. Once the fastener 202 is secure the tabs also secure the access panel 164 in place. This allows access to engine parts without difficult and timely disassembly of vehicle components.

Figure 6:
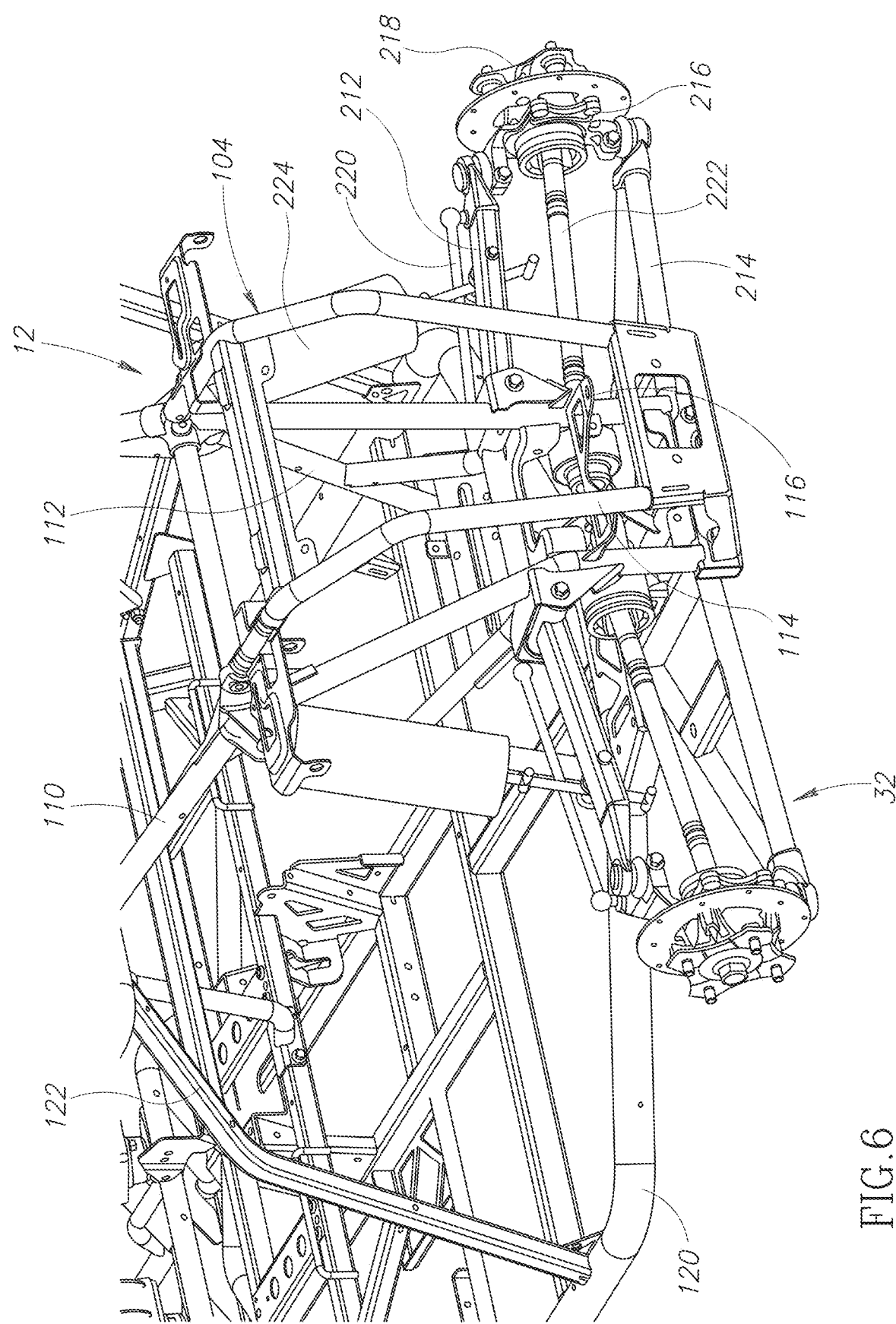
FIG. 6 is an isometric view of the front suspension of the vehicle of the present invention.

FIG. 6 illustrates the front suspension 32 of vehicle 10. It also shows in some detail the chassis front portion 104. The front suspension is constructed of right and left four-bar linkages each side including the chassis, the upper arm 212, the lower front A-arm 214, and the knuckle assembly 216. The exact angles, lengths, and spacing of the connections between the links is selected to determine the travel of the wheel connected to a hub 218 attached to the knuckle assembly 216.

Steering rods 220 are coupled between the steering assembly (not shown) and the knuckle assembly 216. Right and left "half shaft" front axles also move with the suspension, connected between the front gear box (not shown) and the hub 218. Shock absorbers 224 with springs are coupled between the chassis, specifically brackets on the front bars 110, and the upper arms 212. Loads are transferred through the front bars 110 to the dash bar 124, the roll cage 20, and the front frame members 122 and so forth to bridge to the rear of the vehicle 10.

Figure 7A:
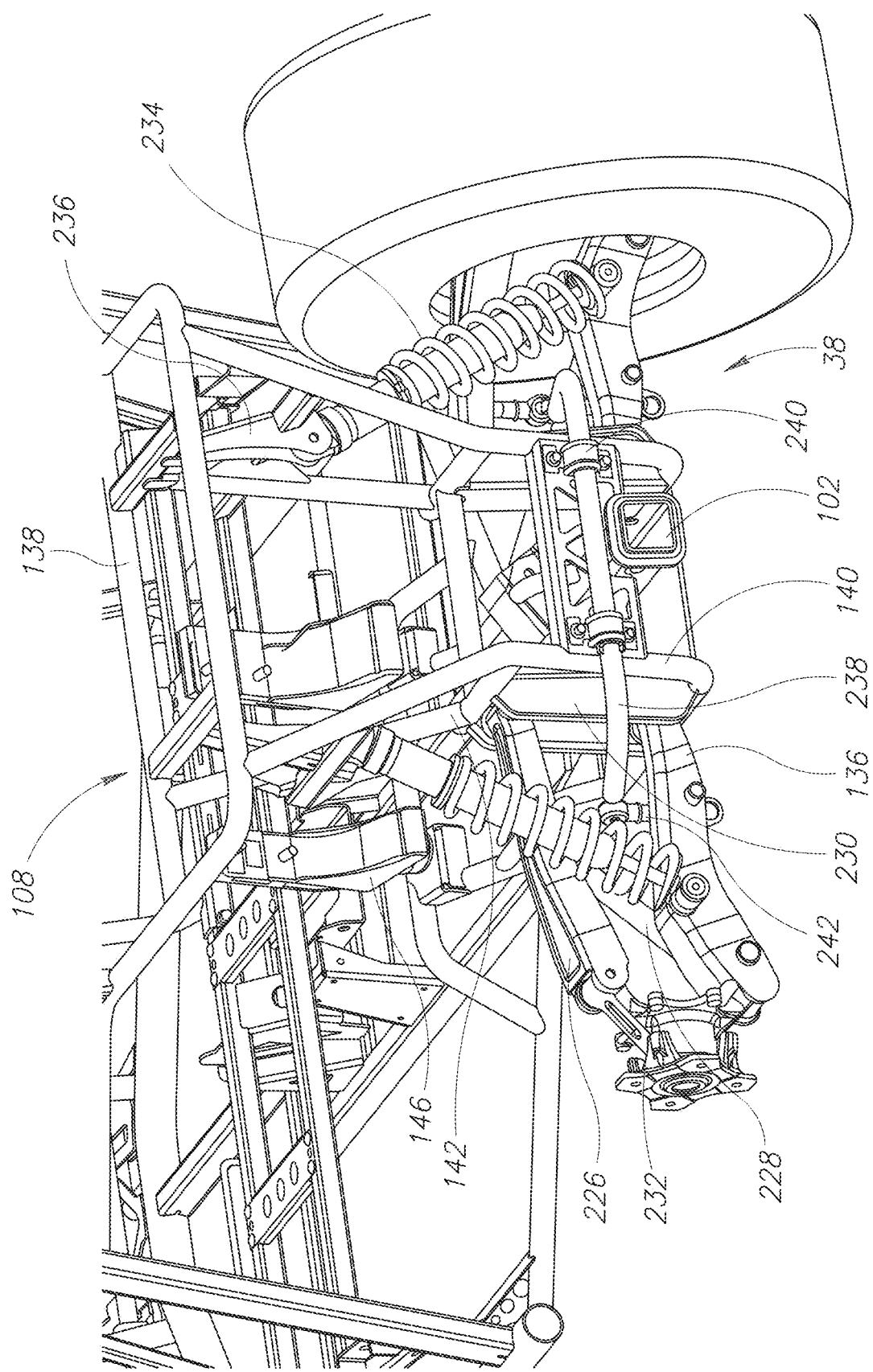
Figure 7B:
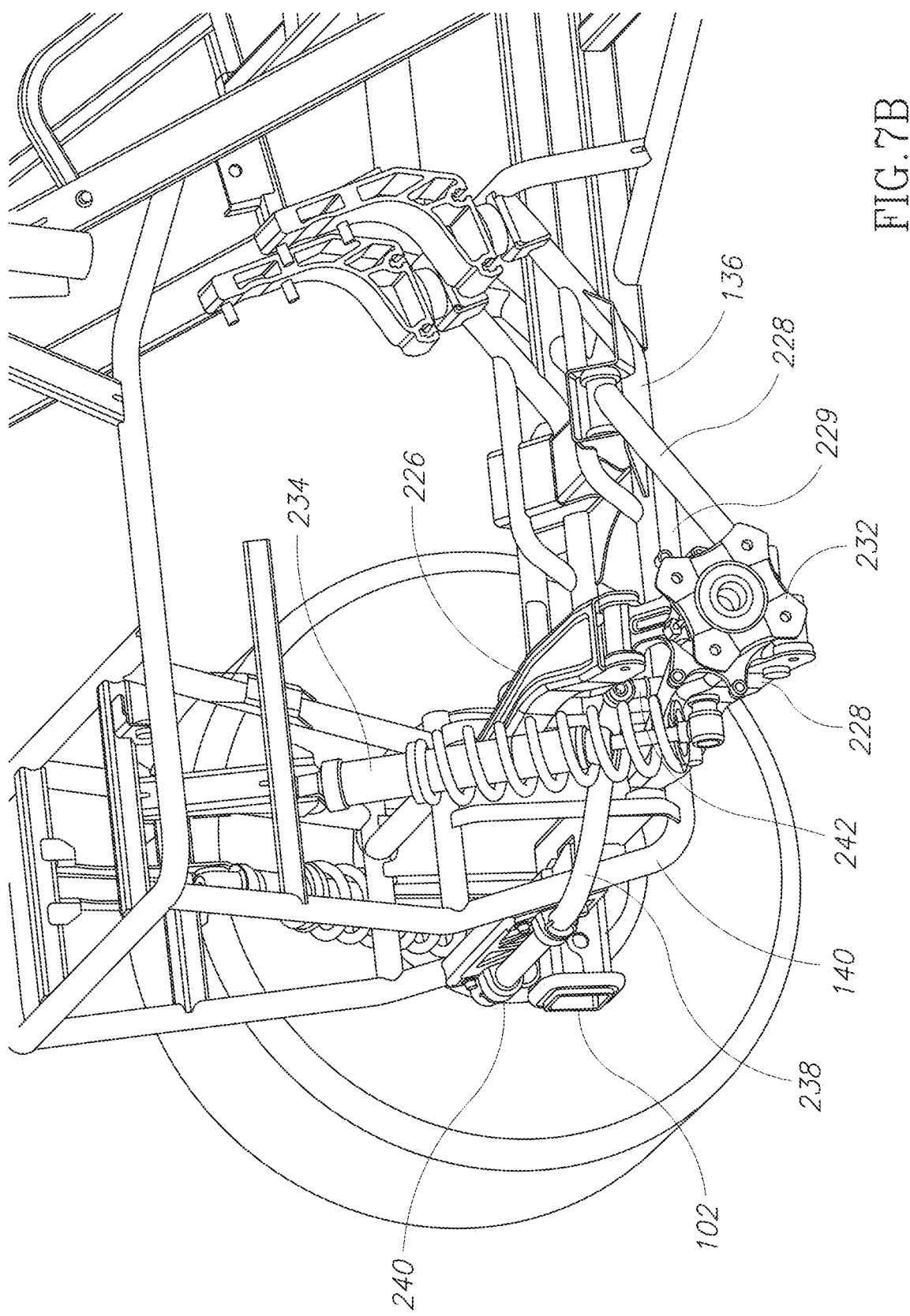

Turning to the rear suspension, FIGS. 7A through 7C are illustrative. Somewhat similar to the front suspension 32, rear suspension 38 is preferably constructed with a four-bar linkage arrangement. Each side of the suspension includes an upper arm 226, a lower A-arm 228, and a rear knuckle 232. The upper and lower arms 226, 228 are secured to the chassis rear portion 108 through suspension brackets 230 secured between rear support members 142 and rear lower frame members 136. A rear shock and spring assembly 234 is secured between the lower A-arm 228 and a shock absorber bracket 236 on each side. The shock absorber brackets 236 are secured to the rear support members 142 and rear upper frame members 138.

The rear sway bar assembly interacts with the rear suspension 38. A sway bar 238 links the right and left lower A-arms 228. Sway bar 238 extends rearward of the rear tubes 140 and is mounted to the rear tubes 140 with sway bar mounts 240 secured to a rear bracket 241 that extends between rear tubes 140. Sway bar mounts 240 hold sway bar 238 from translational movement while allowing rotational movement. After extending beyond rear tubes 140, the sway bar 238 bends forward to the outboard sides of the suspension brackets 230 and inboard of the shock absorber and spring assemblies 234. The forward ends of sway bar 238 are coupled to sway bar links 242 that extend downwardly to couplings with lower A-arms 228. Lower A-arms 228 include cross members 229 extending from forward to rearward portions of lower A-arms 228. The lower ends of links 242 are secured to the cross members 229. See FIGS. 7B and 7C.

As shown in FIGS. 8A-D, the engine 26, transaxle 84, and CVT 86 are also positioned within chassis rear portion 108. The engine 26 is positioned forwardly of the transaxle 84. The CVT 86 is driven by the engine 26 and drives the transaxle 84, preferably on the left side of the engine and transaxle. As discussed above, engine front mounts 146 are fastened to the front of the engine crankcase. Engine front mounts 146 are "L" shaped to fasten to the crankcase at various locations and provide a lower mounting location to the chassis rear portion 108. A frame bracket 244 is held above rear lower frame members 136. The frame bracket 244 secures isolation members 246 on the top thereof. Isolation members 246 are preferably typical engine mounts that include metal fasteners isolated with rubber to allow vibrational movements of the engine without translating all such engine vibrations to the chassis.

The rearward end of the transaxle 84 is secured to the rearward end of the chassis rear portion 108. As mentioned above, mount brackets 148 are secured to the rearward case of the transaxle 84. Frame brackets 248 are secured to the rear tubes 140 and the suspension bracket 230. Frame brackets 248 provide a mount for rear isolation members 250 that are placed between frame bracket 248 and mount bracket 148. Rear isolation members 250 are similar to isolation members 246. As will be discussed in more detail below, the engine 26 and transaxle are coupled together. Thus, with two isolation members used at the rear of transaxle 84 and two used at the front of engine 26, the engine-transaxle assembly is secured to the chassis 12 with four isolation members for a secure arrangement that isolates vibrations from the transmitting to the chassis and vehicle occupants. As the CVT is also coupled to the engine and transaxle, and not directly to the frame members, it too is isolated from the chassis with the isolation members 246, 250. Other components, including the engine air intake tract also benefit from this isolation mounting, as will be described below.

The engine 26 and transaxle 84 are coupled with an engine plate 252 and a transaxle plate 254 that are fastened together. A single coupling plate or simply fasteners from the engine to the transaxle are employed in alternate embodiments. The engine plate 252 is fastened to the engine crankcase and includes a portion facing the transaxle plate 254, which is fastened to the transaxle 84. The two plates are secured together with fasteners. Providing two plates fastened together provides for the construction of the plates with accurate tolerances for securement to the engine and transaxle mounting locations.

The transaxle transfers power to the front axles through a forwardly extending transaxle shaft 256 drivingly coupled to a driveshaft 258. The driveshaft 258 extends under engine 26 and center console 160 toward the front of the vehicle 10. The driveshaft 258 extends beneath (and between in plan view) the engine front mounts 146 and isolation members 246. A spline connection 260 couples the transaxle shaft 156 and driveshaft 258 while allowing some small movement between them as the chassis slightly flexes while the vehicle 10 is in operation. A front driveshaft 262 is coupled to driveshaft 258 to extend the driveline to the front gearbox. The driveshaft 258 and front driveshaft 262 are secured together with another spline connection. A frame coupler 264 is preferably placed near the connection to secure the front driveshaft in place while allowing for rotational movement.

The transaxle transfers power to the rear axle through the transaxle rear drive 267 with splined couplings that open to the right and left of the rear portion of the transaxle 84. The rear half shafts are secured to the transaxle rear drive 267.

Figure 8A:
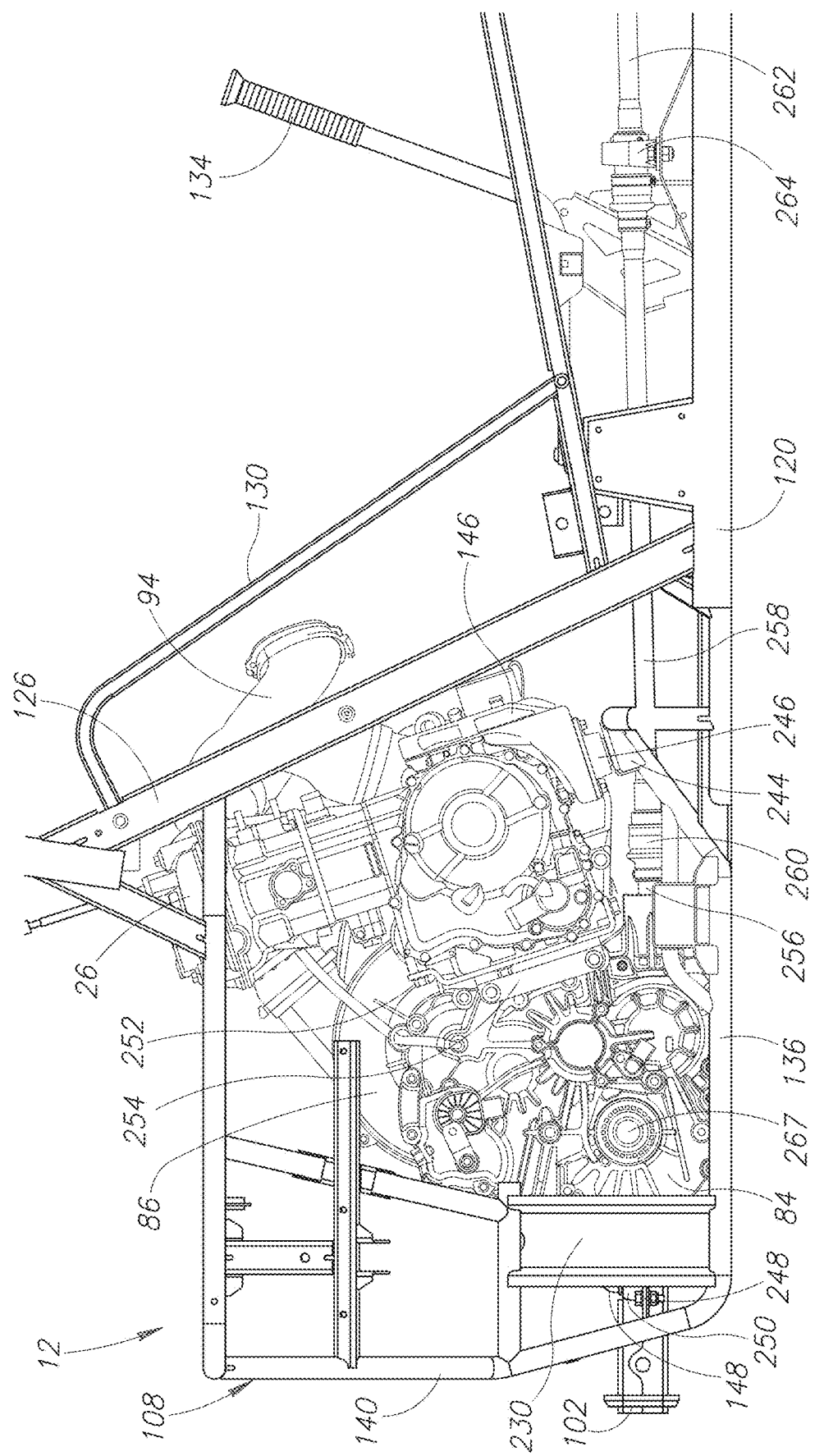
FIG. 8A is a side-elevational view of the engine and transaxle in place in the chassis of the vehicle.
Figure 8B:
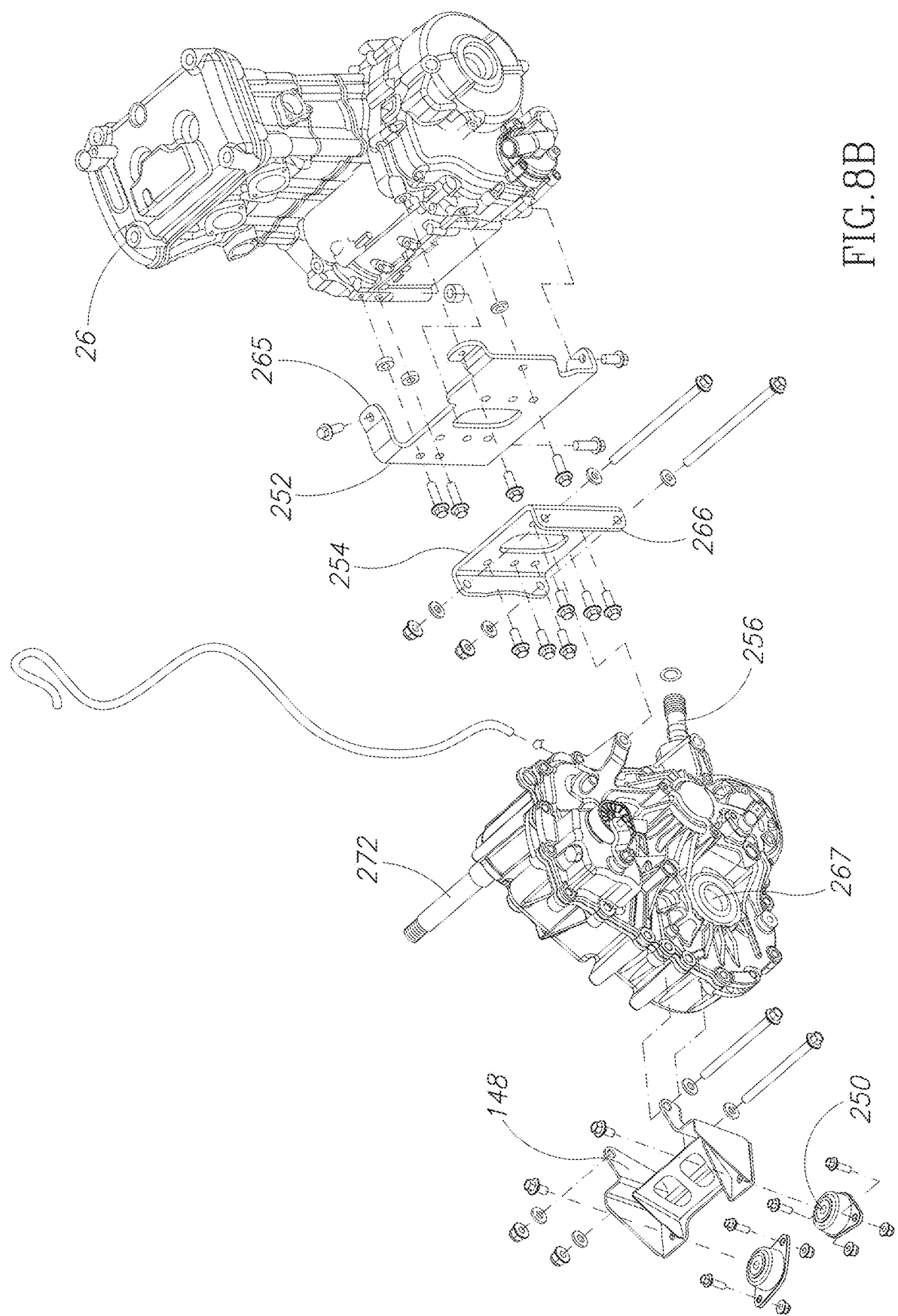
FIG. 8B is an isometric partially exploded view of the engine and transaxle assembly.
Figure 8C:
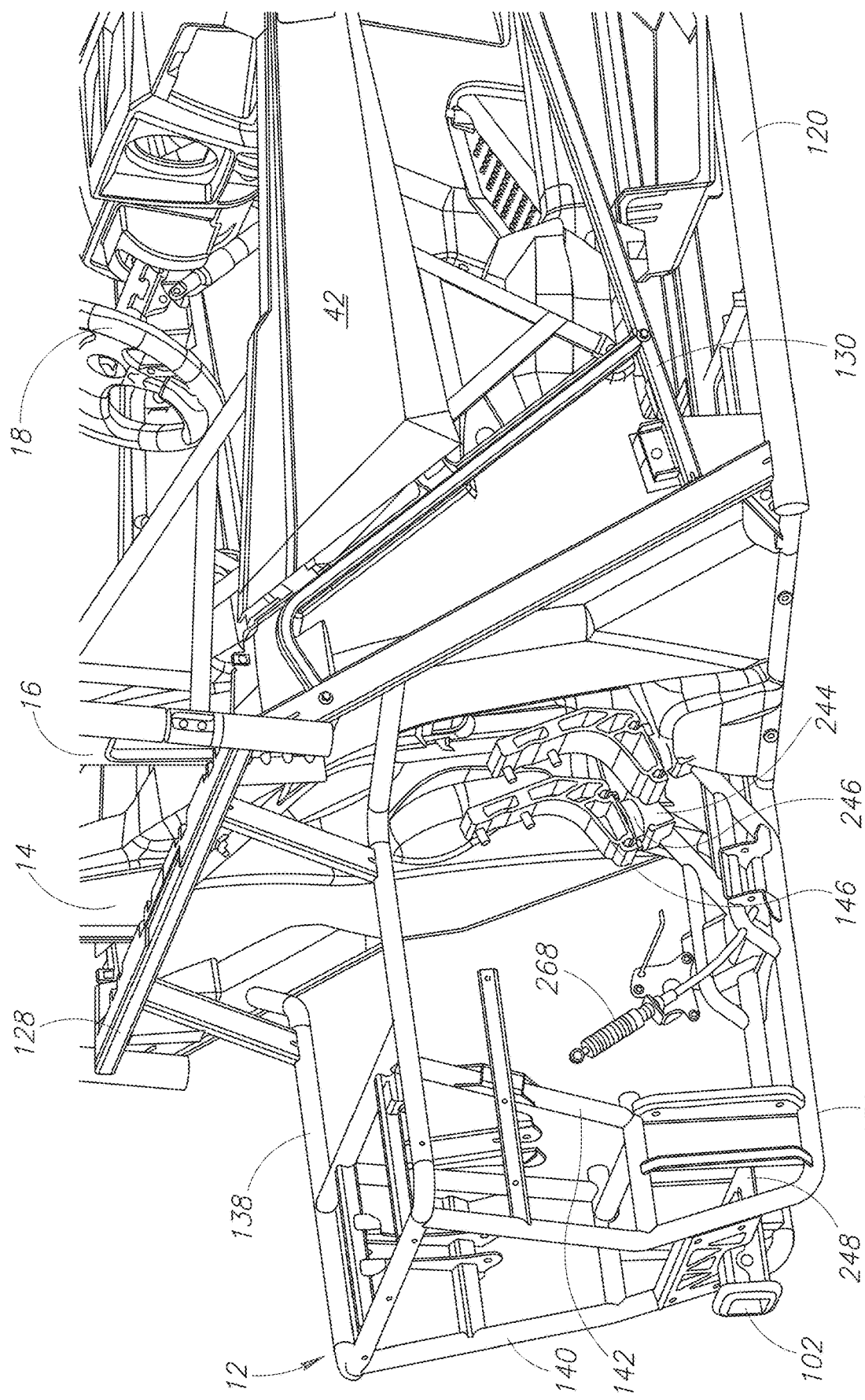
FIG. 8C is an isometric view of the engine mounting location in the chassis.

FIG. 8B further illustrates the interconnection of the engine 26 and the transaxle 84. The engine plate 252 is secured to the engine 26 with appropriately situated engine plate mount tabs 265 extending therefrom. The plate is preferably fastened to the engine case. The engine plate is manufactured by being cut then stamped to position the tabs 265 correctly for alignment with the engine mount locations.

Likewise, the transaxle plate 254 is preferably cut and stamped into shape. Alternatively, it may be forged or cast or made by other methods. Transaxle plate mount tabs 266 are formed to securement to the front of the transaxle case above the transaxle shaft 256. Six fasteners secure the engine plate 252 to the transaxle plate 254.

In placing the engine into the chassis, the engine 26 and transaxle 84 are fastened together first with mount plates 254, 252, then the assembly is placed within the chassis rear portion 108. The engine front mounts 146 and transaxle rear mount 148 are preferably secured to the engine 26 and transaxle 84 prior to inserting the assembly as well. In one embodiment, the CVT secured to the engine and transaxle prior to insertion of the assembly.

FIG. 8C again shows the rear chassis portion 108 without the engine 26 and transaxle 84. A shift cable 268 is shown held by a bracket. This cable extends from the lower end of the shift lever 188. It is connected to the shift arm 270 of the transaxle 84 (shown in FIG. 8D).

Figure 8D:
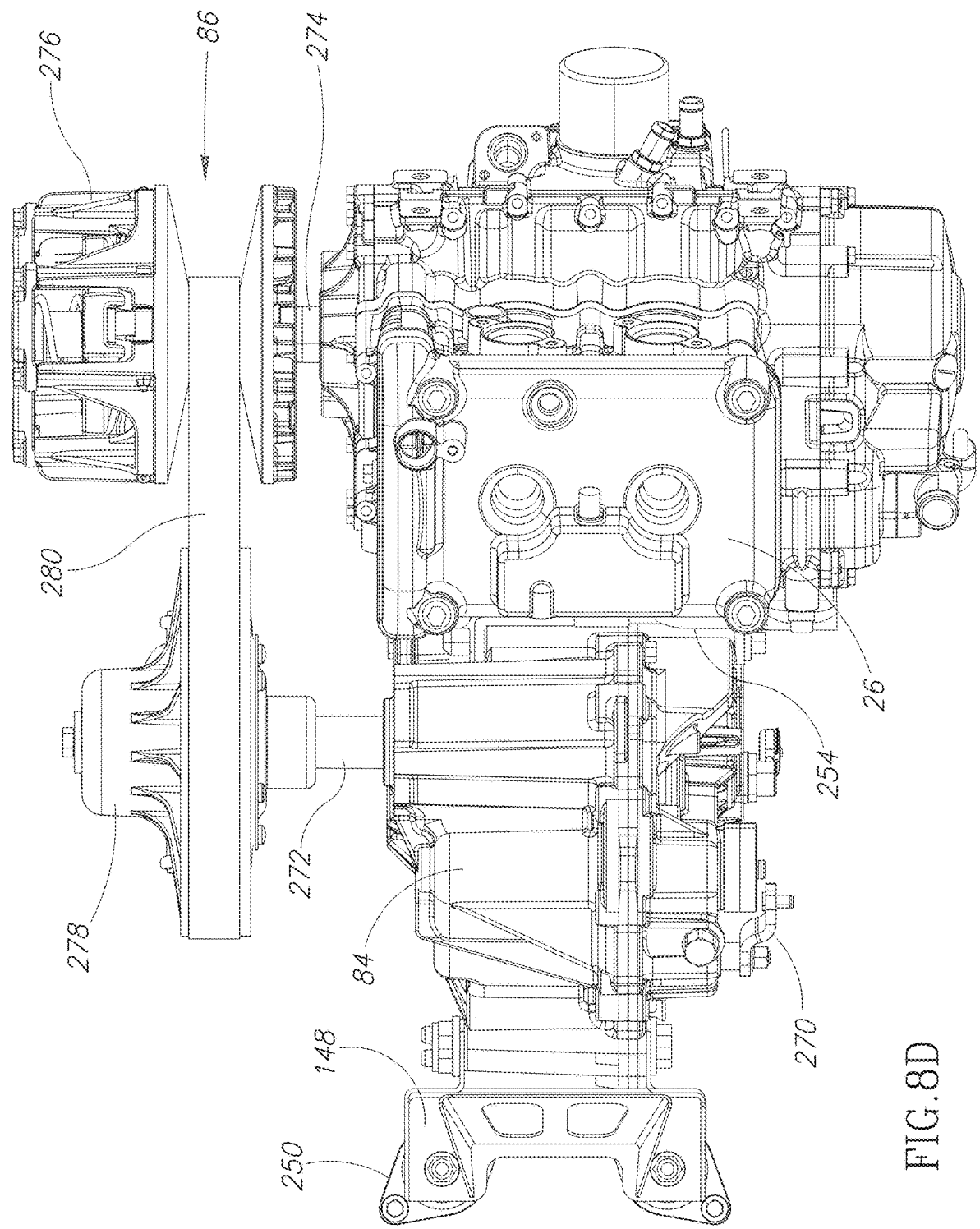
FIG. 8D is a top view of the engine and transaxle assembly of the present invention.

FIG. 8D also illustrates the connection of the CVT 86 to the engine 26 and transaxle 84. The CVT 86 is connected to an input shaft 272 of the transaxle 84 and to a crankshaft 274 of the engine 26. The CVT 86 includes a drive clutch 276 driven by the crankshaft 274 and a driven clutch 278 mounted on the input shaft 272. A belt 280 is coupled between the sheaves of the drive and driven clutches 276, 278 for achieving continuously variable gear ratios as the crankshaft changes speed. The fixed connection between the engine and transaxle along with the combined isolation mounting of the engine and transaxle to the chassis also aids in the operation of the CVT, as the distance between the axis of rotation of the drive clutch 276 and that of the driven clutch is maintained substantially constant. This helps reduce power losses and increase belt life.

FIGS. 9A-G illustrate the air intake tract for the engine as well as the CVT cooling air intake and exhaust. The airbox 88 includes an airbox body 282 that is formed of sufficient shape and volume to be tuned to the engine for optimum performance. Note that the airbox 88 is also close to the engine 26 such that the pulsing air needs of the combustion chambers are met with the large volume of the airbox 88. The airbox body 282 is closed with an airbox cover 284 secured with clips 286 spaced around the periphery thereof. The cover 284 faces rearwardly to be readily accessible for access to the interior of the airbox 88 for maintenance. An airbox lower mount 288 secures the airbox to the transaxle mount bracket 148, such that the airbox is isolated with the engine 26 and transaxle 84 to move therewith relative to the chassis 12.

Figure 9A:
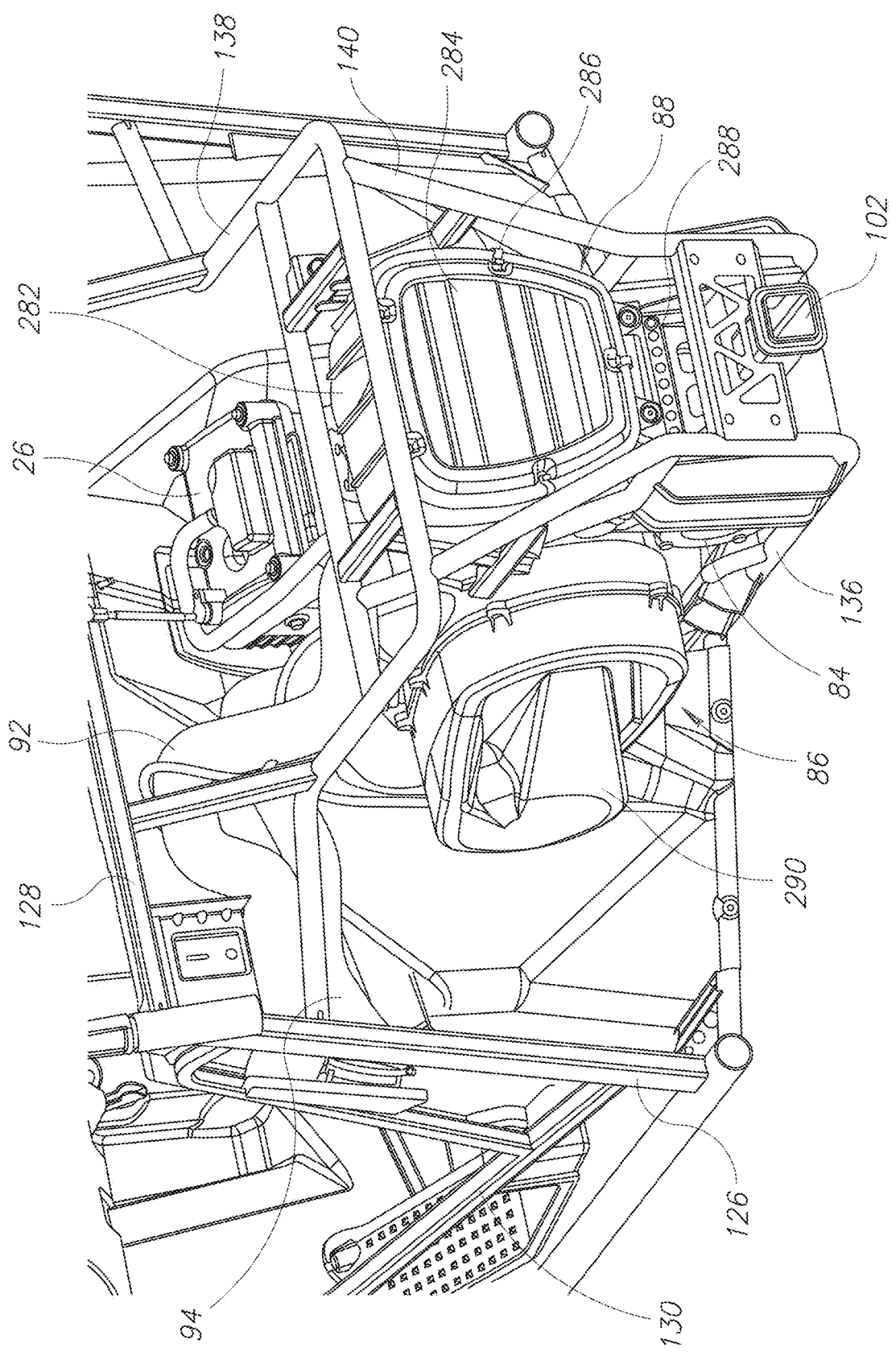
FIG. 9A is a rear isometric view of the air intake assembly installed with the engine.

FIG. 9A also shows the CVT cover 290 positioned over the clutches 276, 278. Removal of the cover allows access to the clutches and belt 280.

Figure 9B:
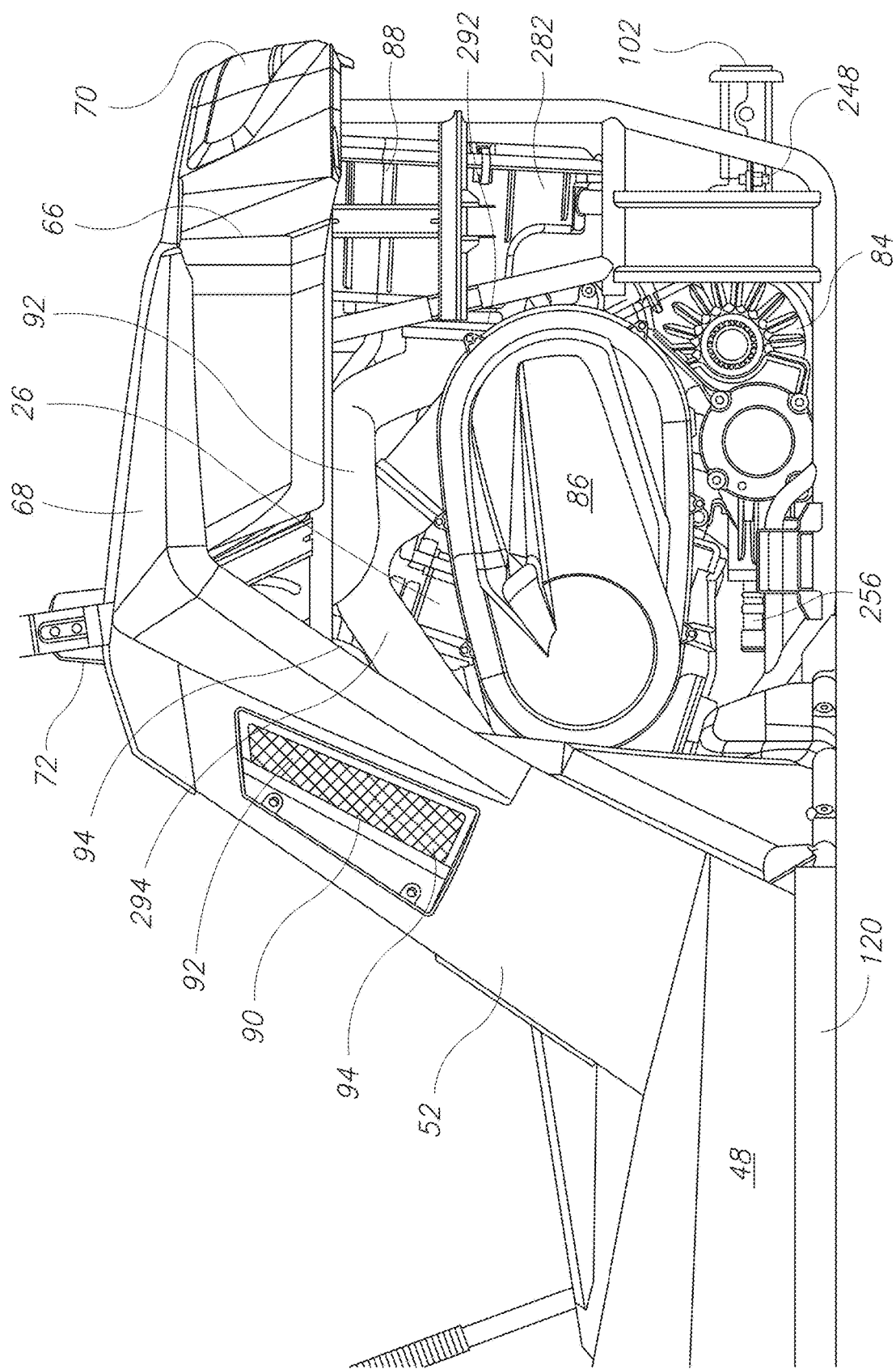
FIG. 9B is a side-elevational view of the engine, transaxle, and air intake tract of the present invention.

FIG. 9B further illustrates routing of the engine air intake duct 92 to the airbox from the air intake opening 90 to an airbox flex coupling 292 on the forward portion of the airbox body 282. The flex coupling allows the airbox 88 to move relative to the intake duct 92, which is mounted to the chassis 12.

A CVT exhaust duct 294 is also shown in FIG. 9B. This duct extends from the rearward end of the CVT 86, above the driven clutch to an air dump location forward of the CVT 86.

Figure 9C:
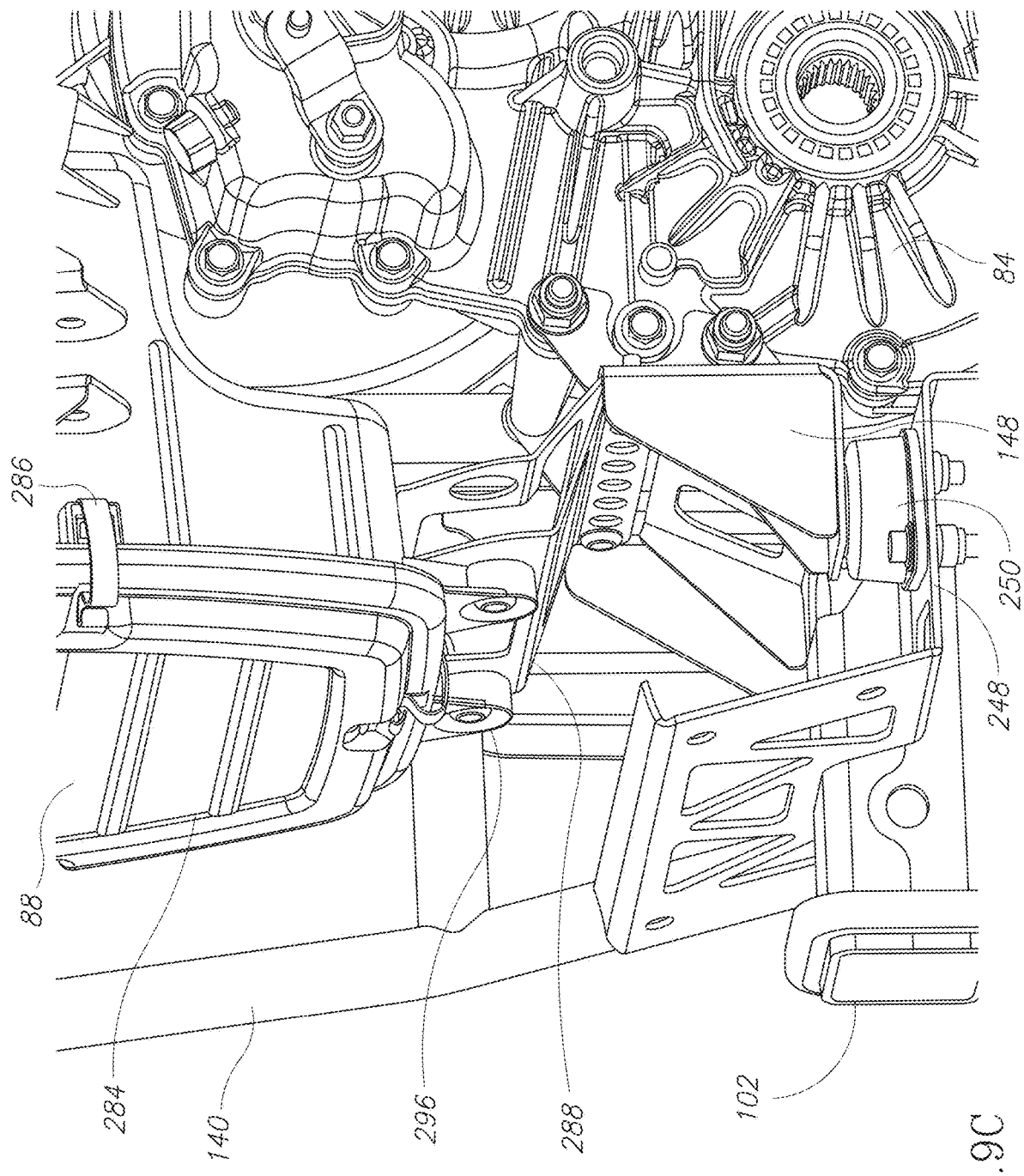
FIG. 9C is a close-up isometric view of the airbox mounting.

FIG. 9C illustrates the lower mounting arrangement of the airbox 88. The airbox body 282 includes lower mount tabs 296 extending downwardly from the bottom thereof. The tabs 296 are secured with fasteners to the airbox lower mount 288. As mentioned above, lower mount 288 is in turn secured to the transaxle rear mount 148 that is attached to the isolation members 250. Thus, the airbox 88 is not directly fixed to the chassis 12.

Figure 9D:
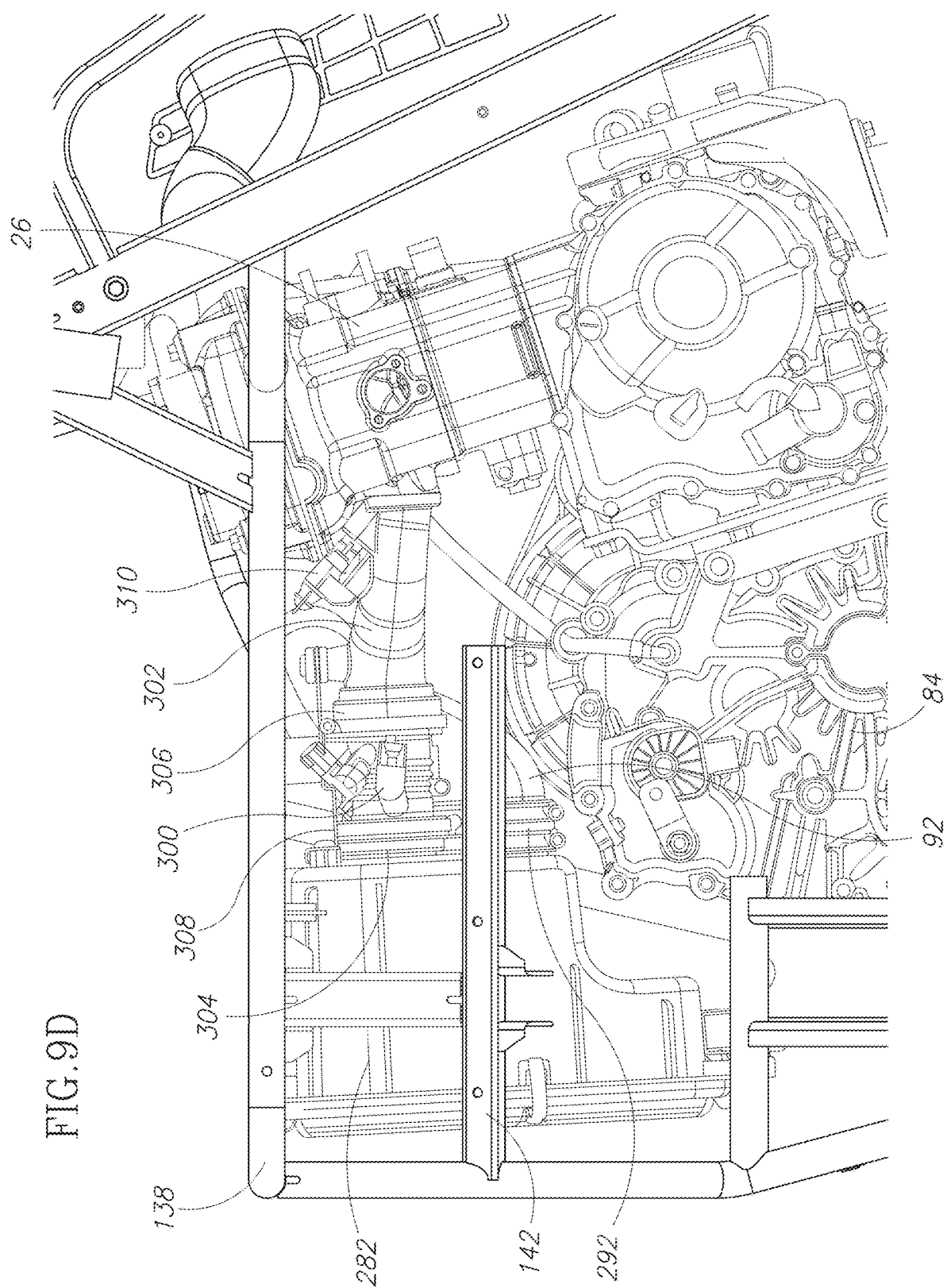
FIG. 9D is a right side-elevational view of the airbox to engine path.
Figure 9E:
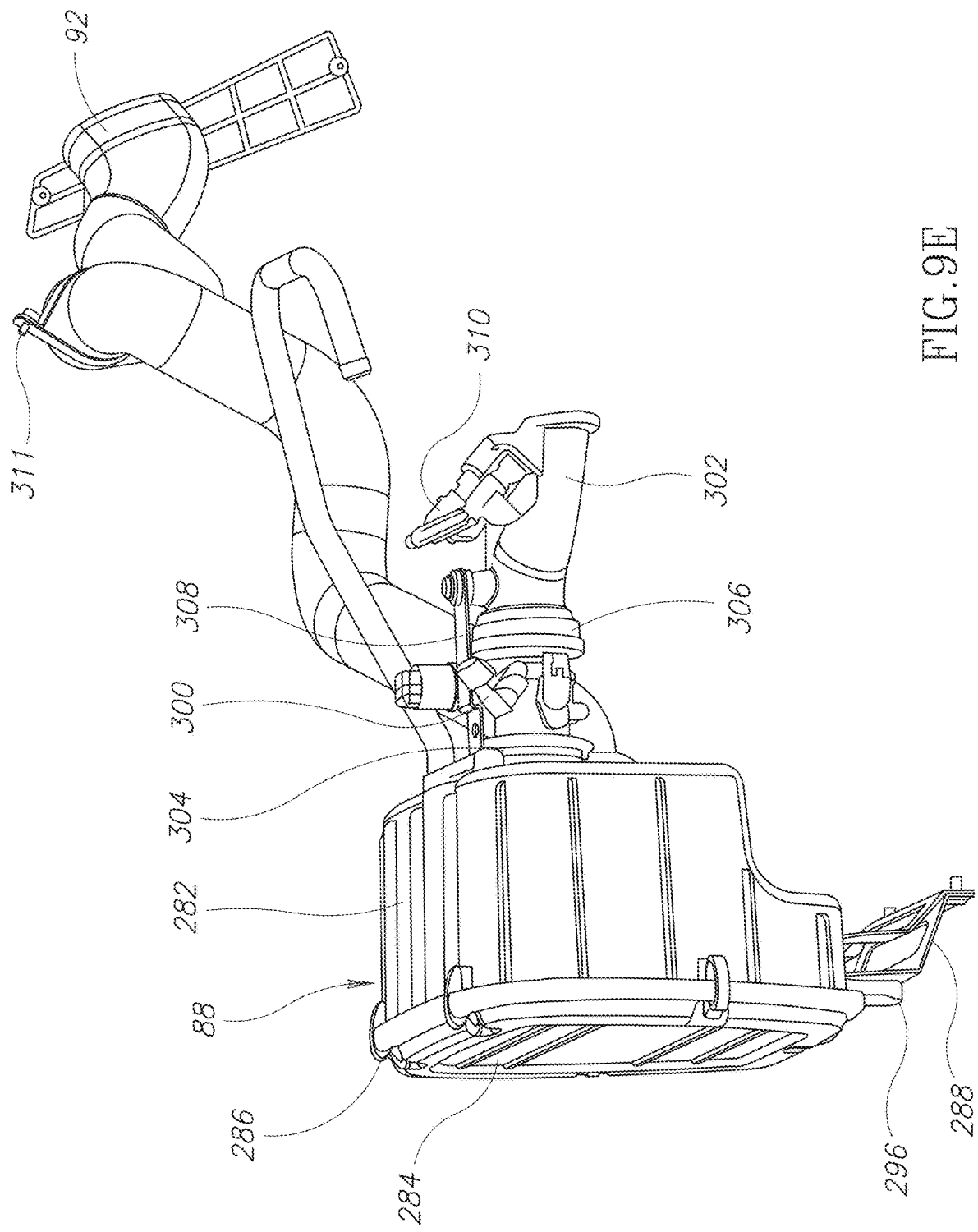
FIG. 9E is an isometric view of the air intake assembly of the present invention.

FIGS. 9D and 9E show the preferred arrangement of intake components between the airbox 88 and the engine 26. A throttle body 300 and an intake manifold 302 are secured in line with the airbox 88 and engine 26 across a short distance. The length of the throttle body 300 and intake manifold 302 essentially define the distance. Thus, the air from the airbox 88 is readily available to the combustion chamber of the engine 26. A throttle body coupling 304 is over-molded onto a flange on the forward end of the airbox body 282. This coupling 304 is clamped to the rearward end of the throttle body 300. Likewise, a manifold coupling 306 is over-molded onto the rearward end of the intake manifold 302. The rearward end of the manifold coupling is clamped to the forward end of the throttle body 300. The couplings 304, 306 are somewhat elastic, but are of sufficient rigidity to support the components with the assistance of an airbox upper bracket 308. Bracket 308 extends between the airbox body 282, the throttle body 300, and the intake manifold 302. Note that fuel injectors 310 are operatively connected to the forward ends of intake manifold 302.

FIG. 9E also shows a duct hanger secured to an upper portion of the intake duct 92 to secure the duct to the rear chassis portion 108. The intake duct 92 is channeled up from the entrance opening to avoid water and debris from proceeding to the airbox 88. A drain 322 shown in FIG. 9F also aids in removing any moisture that does enter the airbox 88. A shield 320 forms a wall between an airbox intake opening 318 and an air filter 312. Thus any moisture is channeled away from the filter 312 to exit drain 322.

Figure 9F:
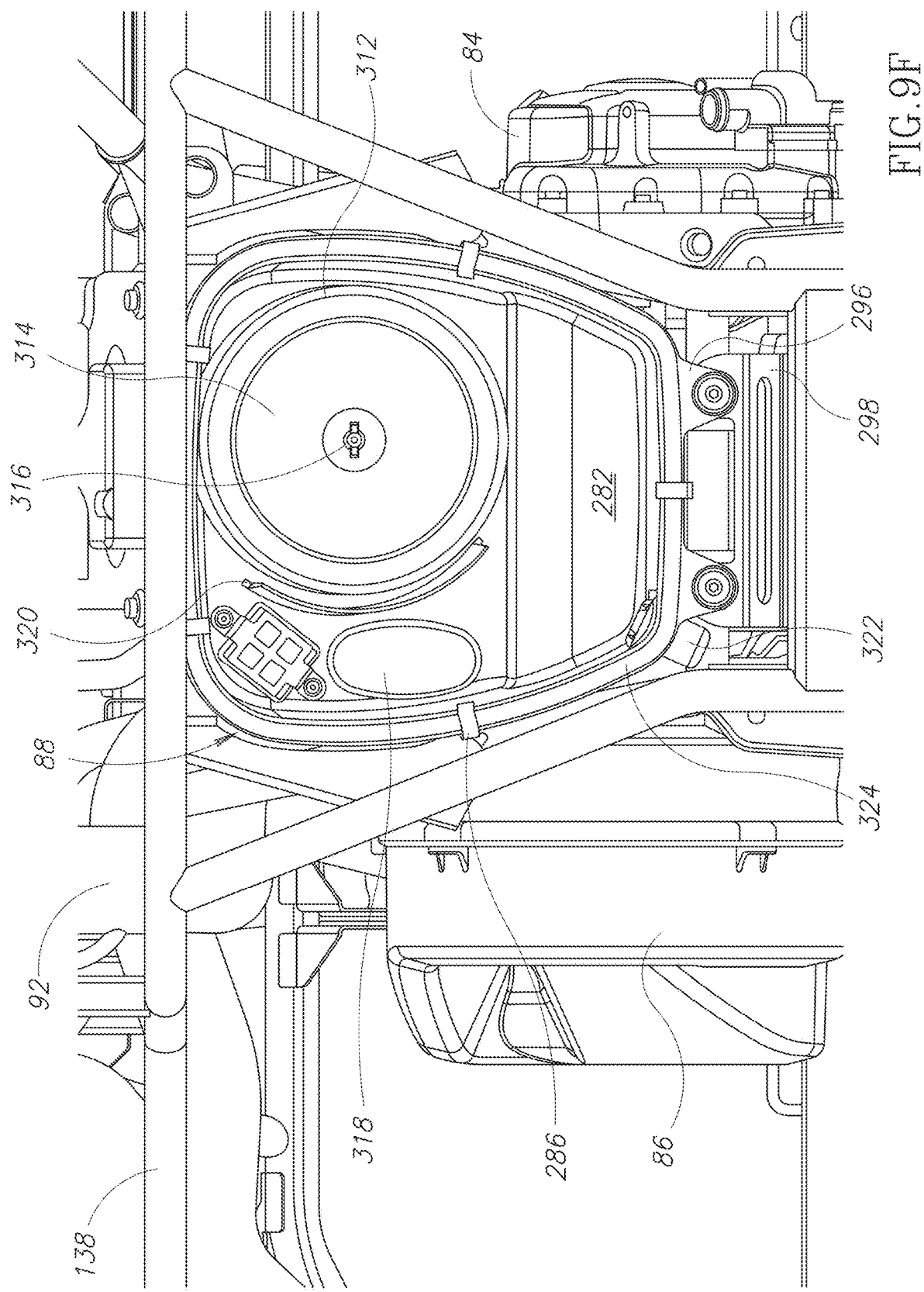
FIGS. 9F-G are rear views inside the airbox.
Figure 9G:
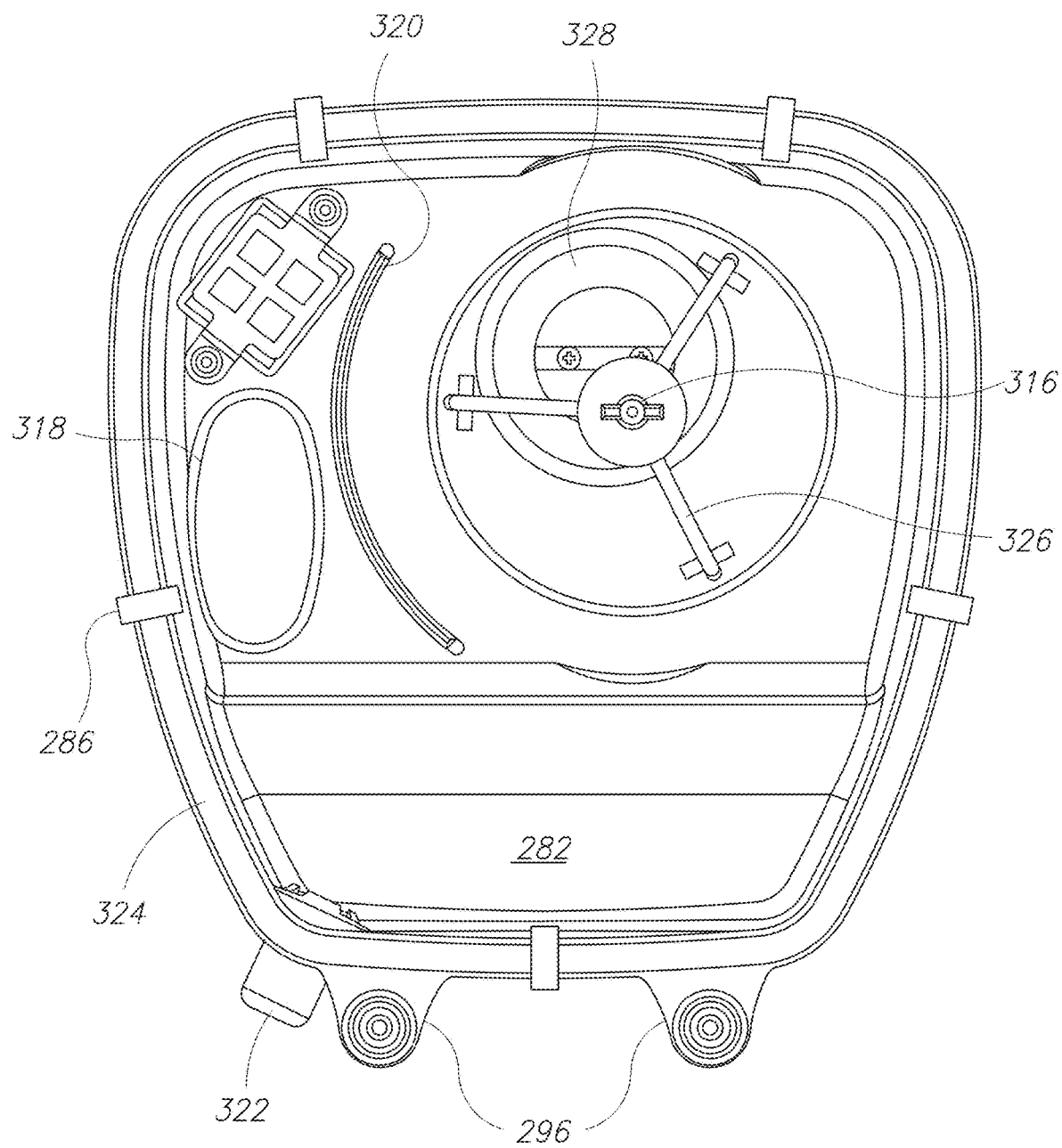

A filter mount 314 and a mount fastener 316 secure the air filter in place over a filter frame 326 (seen in FIG. 9G). FIG. 9F also shows an airbox gasket 324 received between airbox body 282 and airbox cover 284. A recess in the edge of cover 284 helps to hold the gasket 324 in place.

Besides the filter frame 326, FIG. 9G also shows the airbox exit flange 328. The flange 328 is in-line with the throttle body 300 and intake manifold 302, as discussed above.

Figure 10A:
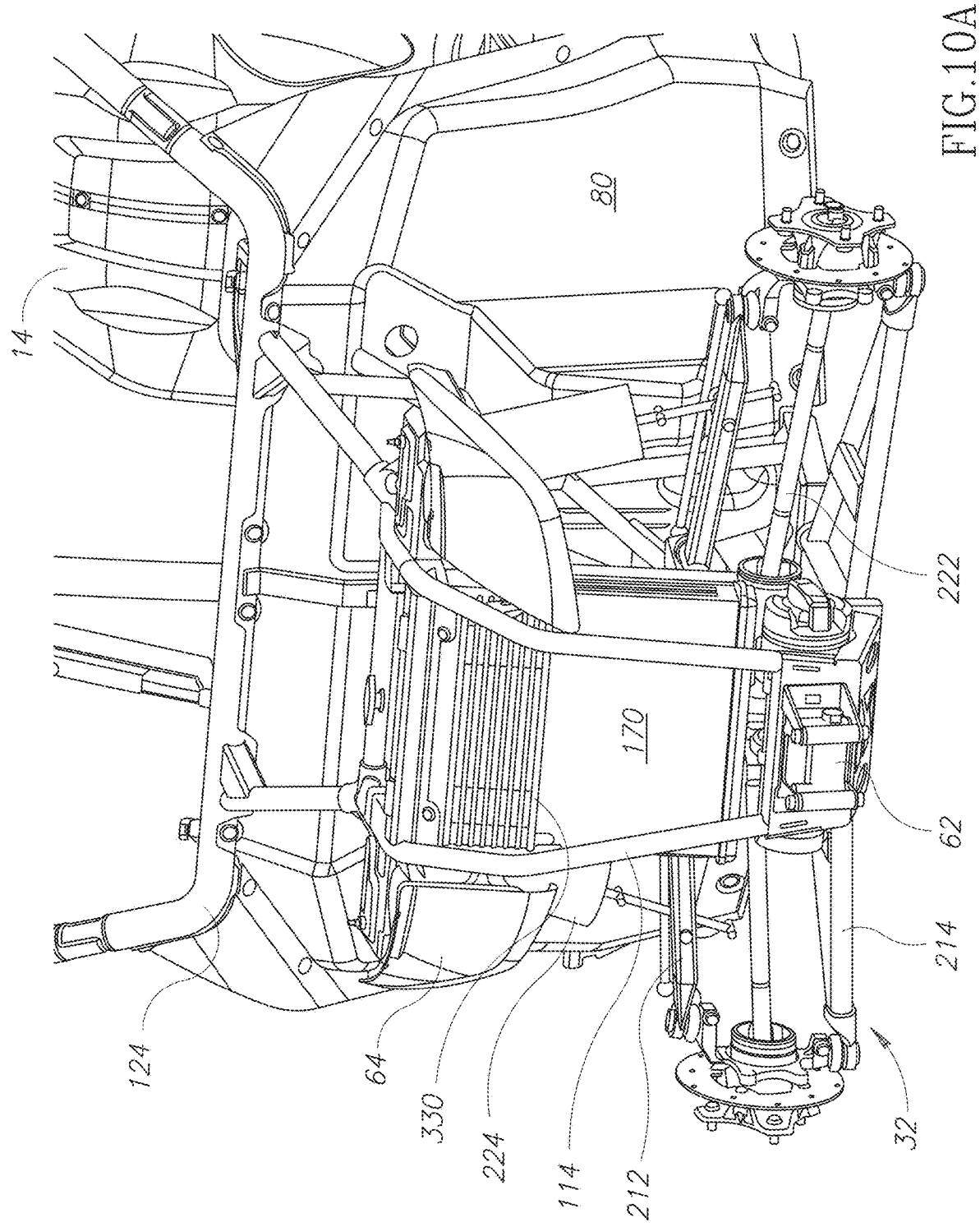
FIG. 10A is a front isometric view of the front of the vehicle with the body panels removed.
Figure 10B:
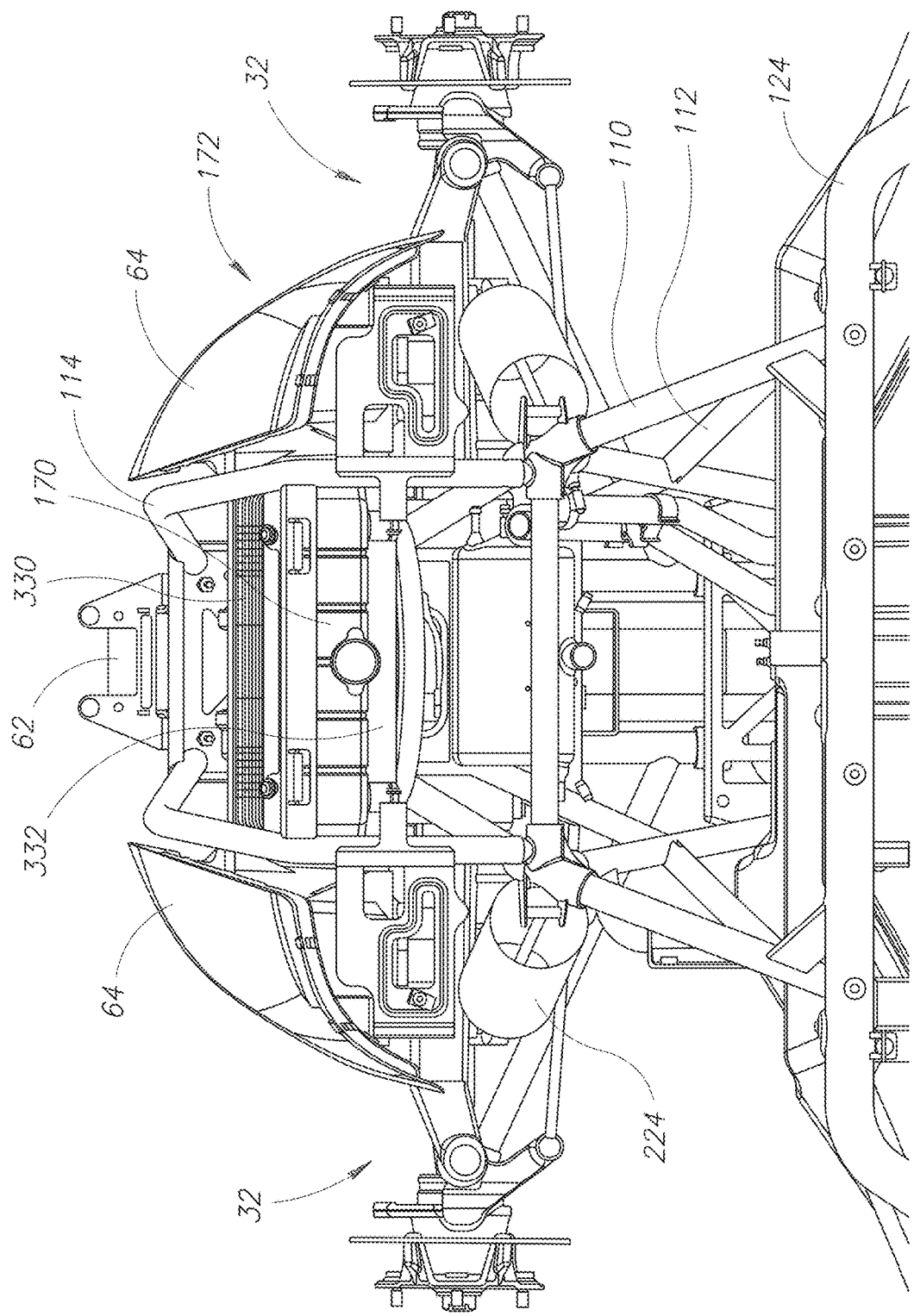
FIG. 10B is a top view of the front of the vehicle with the body panels removed.
Figure 10C:
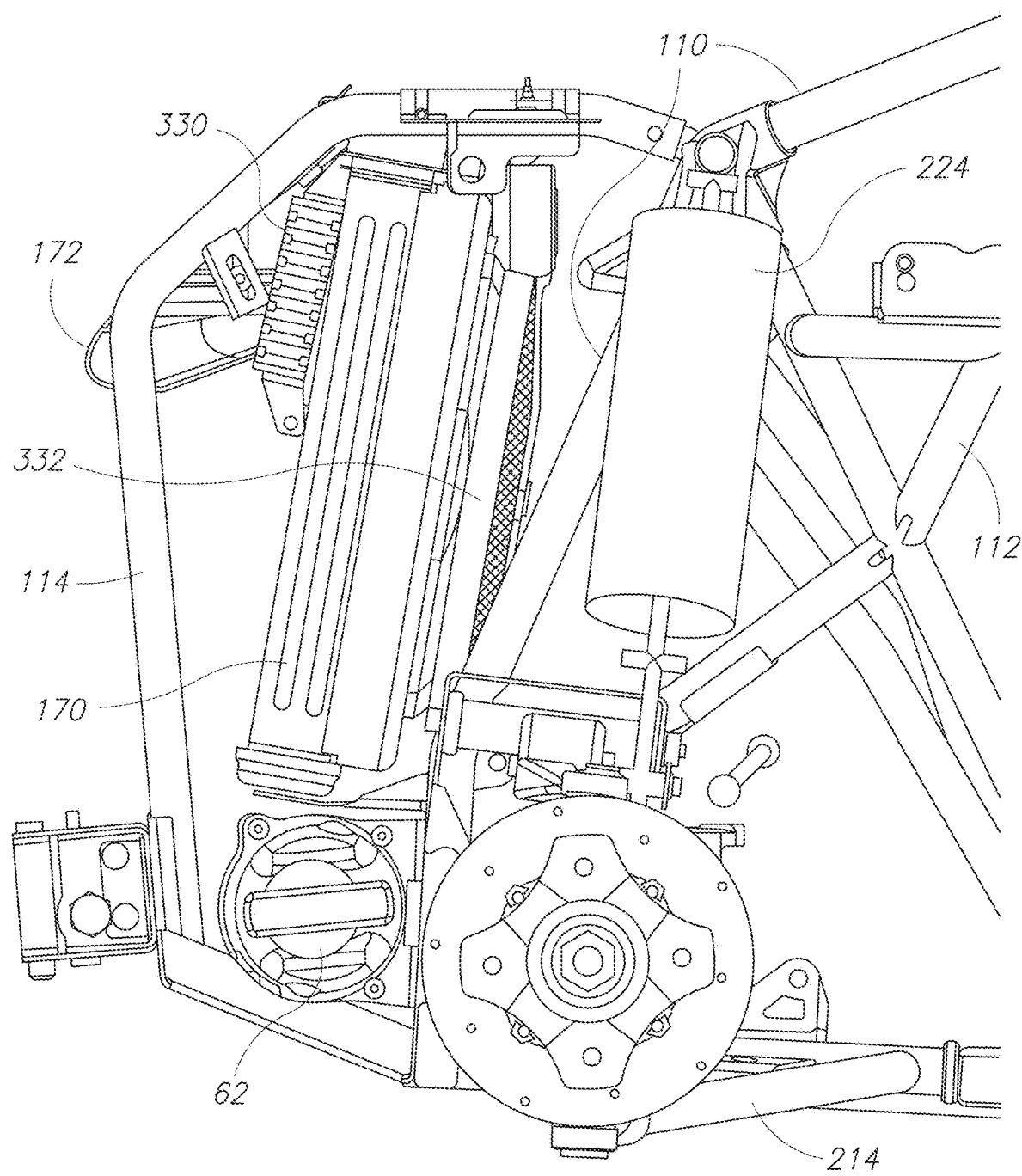
FIG. 10C is a side-elevational view of the front of the vehicle with the body panels and headlights removed.

Some aspects of the positioning of radiator 170 were shown and discussed above. FIGS. 10A-C further clarify the arrangement at the front of the vehicle 10. As noted above, the radiator 170 is positioned laterally between the right and left headlights 64. Longitudinally, the radiator 170 is positioned between the bumper bars 114 and the front bars 110. Vertically, the radiator 170 is positioned between the winch 62 and the tops of the bumper bars 114 about even with the tops of the headlights 64. An oil cooler 330 is positioned adjacent an upper front face of the radiator 170. A fan 332 is positioned adjacent the rear face of the radiator 170 to pull air through the radiator when needed for additional cooling.

Figure 11A:
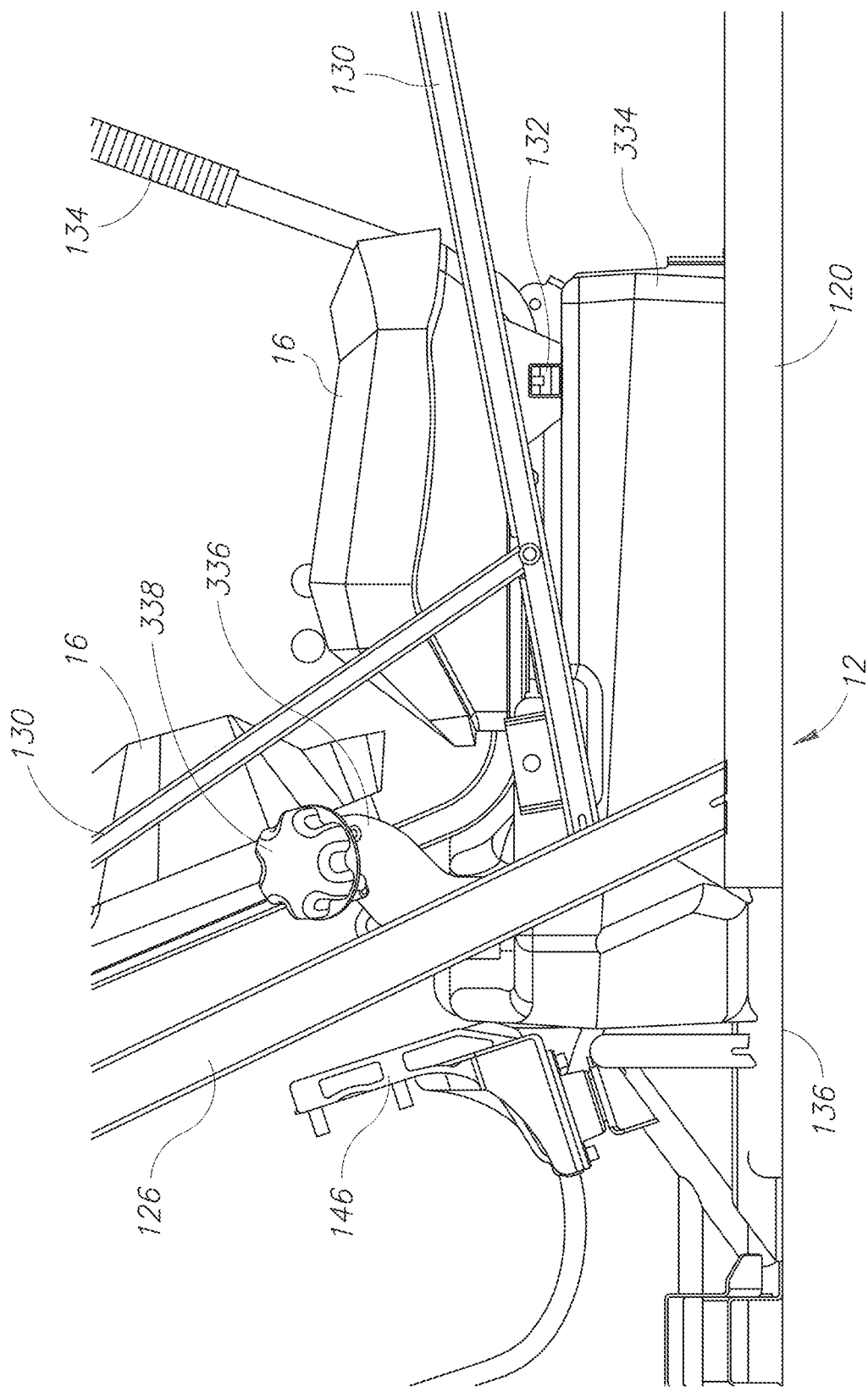
FIG. 11A is a side-elevational view of the fuel tank within the chassis of the vehicle.

Details of a fuel tank 334 will now be described in connection with FIGS. 11A through 11C. The fuel tank 334 is positioned beneath and behind the passenger seat 16. It is nested into the undercarriage frame 118 of the chassis mid portion 106. The fuel tank 334 includes a fuel duct 336 and a fuel cap 338. The fuel duct 336 extends upwardly and outwardly from the rear portion of the tank 334 to a terminus at the fuel fill recess 168 of the right-side panel 54. The cap 338 is securable to the end of the duct 336. As shown in FIG. 11A, the fuel tank 334 is held down by seat support frame 132. Removal of seat support frame 132 is necessary to remove the fuel tank 334. The rearward end of fuel tank 334 extends upwardly to provide additional volume rearward of the lower portion of the passenger seat 16. As shown in FIG. 11C, recesses 339 along the lower edges of the fuel tank 334 allow the tank to nest within the undercarriage frame 118, including lower rail 120. Thus, the tank is securely held between undercarriage frame 118 and seat support frame 132.

Figure 11B:
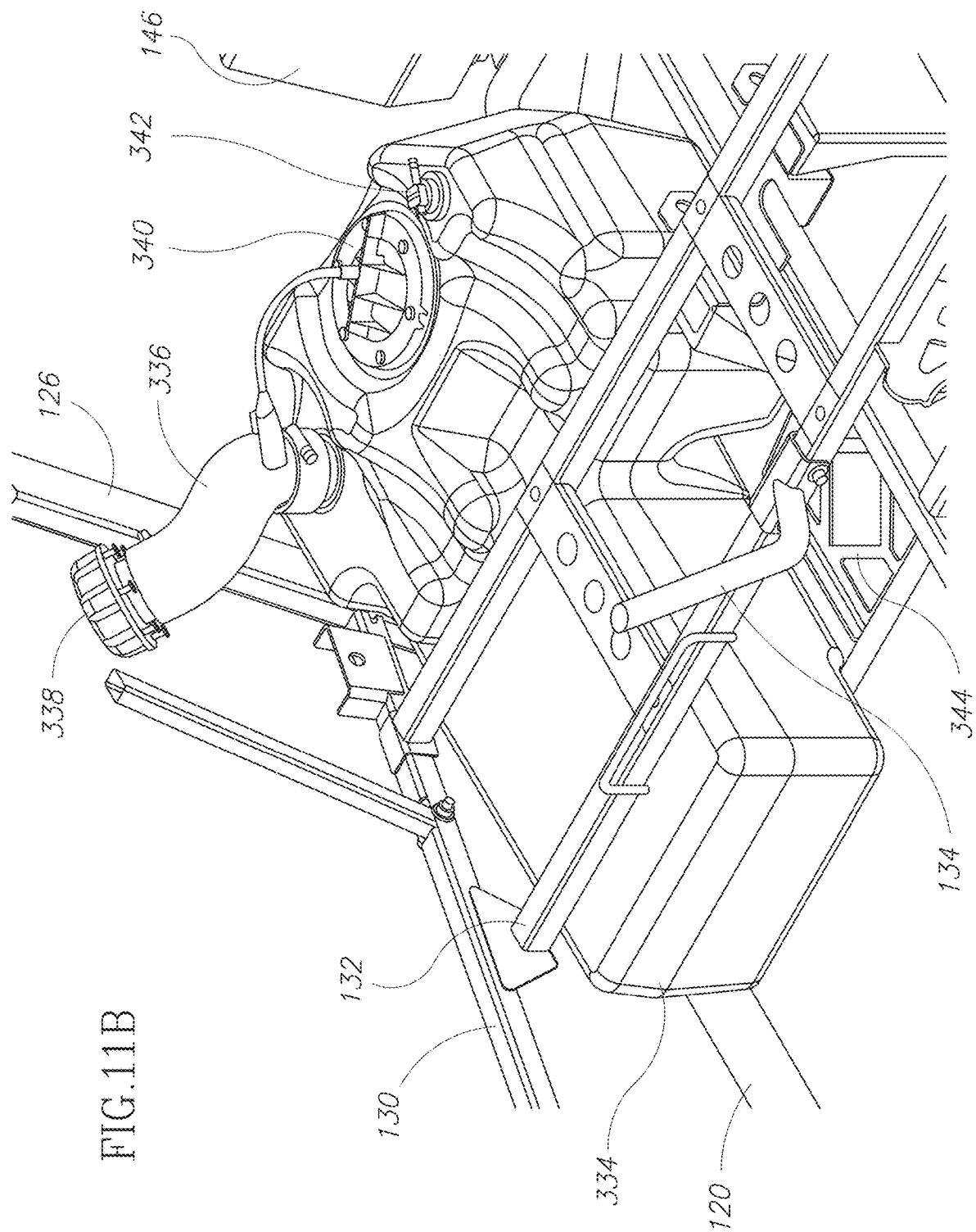
FIGS. 11B-C are isometric views of the fuel tank of FIG. 11A.
Figure 11C:
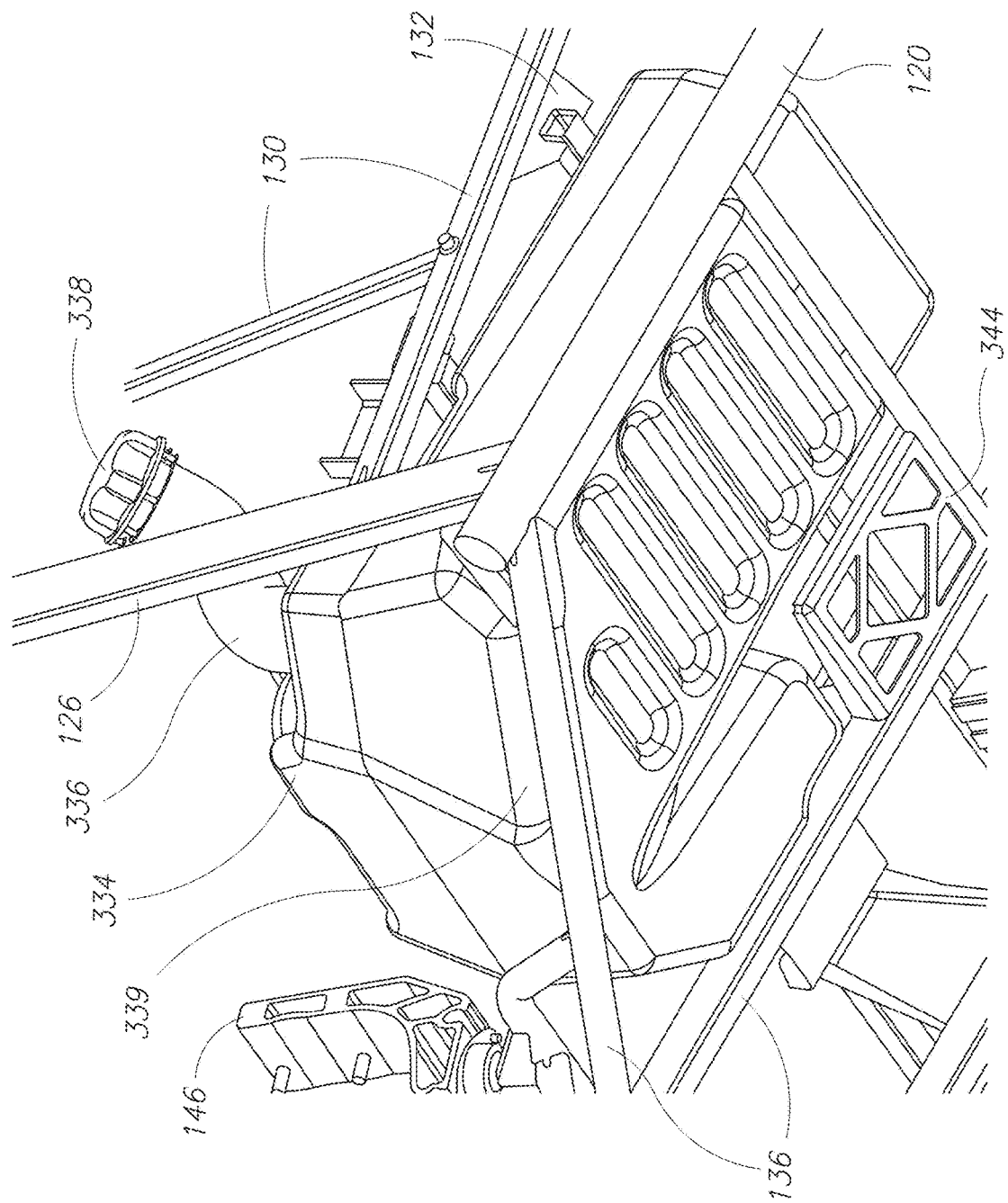

FIG. 11B illustrates the positioning of a fuel pump 340 in an upper-most portion of the rear of the tank 334. A fuel coupling 342 is also positioned adjacent the pump 340.

The front left corner of fuel tank 334 is includes a large recess to receive the vehicle battery. A battery tray 344 is secured to the undercarriage frame 118 to hold the bottom of the battery.

The positioning of the fuel tank and the battery under the passenger seat 16 of the vehicle 10 somewhat balances the right to left weight of the vehicle, especially if a passenger is not riding along. This positioning also maintains a low center of gravity with these relatively heavy components-fuel and battery-being at the bottom of the vehicle.

Overall, the center of gravity of the vehicle is kept longitudinally and vertically near the hip or lower spine of the driver. The center of mass of the driver is preferably longitudinally between the center of the wheelbase and the center of mass of the vehicle 10. Vertically, the preferred clearance of the center of the vehicle is approximately 10 inches above the ground. The seat index point ("SIP") of the driver is approximately 14 inches above the underside of the chassis mid portion 106. Thus, the occupants feel like they are riding "down in" the vehicle in a low, stabile location. This positioning aids in controlling the vehicle as the occupants are not jostled about as the vehicle 10 is driven over rough terrain. Yet the visibility of the occupants is still adequate.

The present disclosure is also generally directed to a vehicle configured such that the center of gravity of the vehicle is very near the center of gravity of the passenger. In one preferred embodiment, the longitudinal center of gravity of the passenger is between the midpoint between the axles and the center of gravity of the vehicle. In some embodiments, the passenger's center of gravity is assumed to be generally at a certain point relative to the passenger. For example, the center of gravity can be assumed to be at the passenger's hip, or at a point near the navel as the passenger sits in the vehicle. The center of gravity can be positioned outside of the passenger's physical body. The center of gravity may change depending on the configuration of the seats and the passenger's posture within the vehicle. The vehicle's center of gravity can be at the same vertical, longitudinal, and lateral position as the passenger's center of gravity. For vehicles having side-by-side seating, the center of gravity of the vehicle is generally aligned with the centerline of the vehicle, and accordingly is placed between the driver and passenger seats. In some embodiments, the vehicle's center of gravity is higher than the passenger's center of gravity. In other embodiments, the vehicle's center of gravity is slightly lower than the passenger's center of gravity. Further details of the present disclosure are given in more detail with reference to FIG. 12 below.

The vehicle's center of gravity (or "center of mass") can be aligned with the passenger's spine at a low position of the spine, such as near the passenger's tailbone. The forces imparted to the passenger by the vehicle will therefore be perceptibly minimized. In some embodiments, the wheel vehicle's center of gravity is rearward of the midpoint of the wheelbase. For example, the center of the wheelbase can be generally near the longitudinal midpoint of the vehicle (equidistant between the front and rear extremes of the vehicle), and the vehicle center of mass is preferably at a longitudinal position 60% from the effective front axle of the vehicle and 40% from the effective rear axle of the vehicle (i.e. 60/40 weight distribution). The seats can be positioned with the passenger's center of mass somewhere longitudinally between these two points. As the vehicle moves over varied terrain, bumps in the road cause the vehicle to move about these two points as a function of the suspension. In an example, if the vehicle had a perfectly rigid suspension, movement over varied terrain would cause the vehicle to move about the midpoint of the wheelbase. Conversely, if a vehicle with a perfectly elastic suspension traveled over the same varied terrain, the vehicle would move about the center of mass. Since neither of these theoretical extremes can be achieved, the realistic vehicle with some suspension will move about a point somewhere between these two points. Positioning the passenger's center of mass within this envelope causes the perceived motion of the vehicle to be less. Positioning the passenger within this longitudinal envelope provides the smoothest ride to the passenger for a given suspension configuration. The smoothest ride allows the passenger to maintain the best control of the vehicle under speed and uneven terrain. Thus, ideally, if the longitudinal weight distribution of the vehicle places the center of gravity of the vehicle 40% from the effective rear axle, the longitudinal center of gravity of the passenger is placed between 40% and 50% distant from the rear axle.

Figure 12:
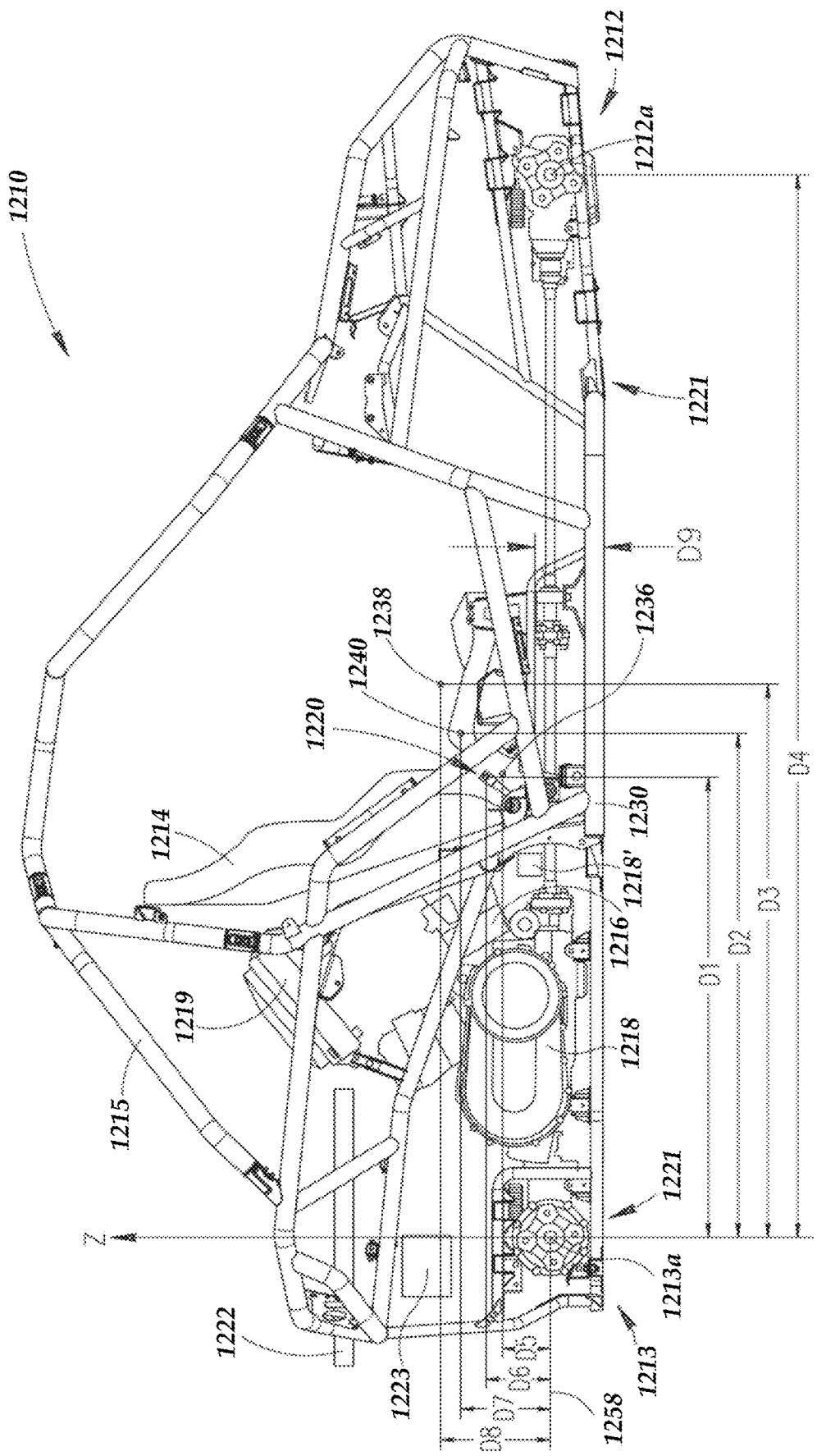
FIG. 12 is a schematic side view of a vehicle having a center of mass at least approximately superimposed in at least the longitudinal and vertical directions with the center of mass of the passenger according to embodiments of the present invention.

FIG. 12 is a schematic illustration of a vehicle 1210 configured according to embodiments of the present disclosure. The vehicle 1210 can be a four-wheeled vehicle having two front vehicle 1212 on a front axle 1212a, two rear wheels 1213 on a rear axle 1213a, two seats 1214: a driver's seat and a passenger's seat. The vehicle 1210 can be an all-terrain vehicle ("ATV") or a recreational off-highway vehicle ("ROV"), a two- or three-wheeled vehicle, or any other suitable type of wheeled vehicle.

The vehicle can have any suitable drive train, such as 4×4, 2×4, etc. The vehicle 1210 can be made of a frame and a roll cage 1215 that generally encloses the passenger area and protects the passengers in case of a roll-over or other circumstance. The vehicle 1210 can have a spider frame construction. In some embodiments, the vehicle 1210 has doors (not shown) to the passenger area that extend downward to the lower portion of the seat 1214 or lower such as below the seat 1214. The vehicle 1210 preferably includes a radiator 1219 positioned rearward of the seats 1214 and above the engine. The vehicle 1210 can have a suspension system 1221 that can be a trailing-arm suspension, an A-link suspension, or any other suitable type of suspension system 1221. The vehicle 1210 can include a cargo bed 1222 at a rear position or at another position such as near the front of the vehicle 1210 or laterally outside the passenger area or above the passenger area. The vehicle 1210 can include a fuel tank 1223 which can be positioned rearward of the engine 1216, above or rearward of the transmission 1218 and engine 1216, or elsewhere. The vehicle 1210 can also include other common vehicle components, such as a battery, a spare tire, tire changing equipment such as a jack, and other such vehicle components.

The vehicle 1210 has an engine 1216, a transmission 1218, and other standard vehicle equipment positioned variously throughout the vehicle 1210. The transmission 1218 can be positioned rearward of the engine 1216, or forward of the engine as shown by 1218'. In other embodiments, the engine 1216 and transmission 1218 can be at a same lateral or longitudinal position. The transmission 1218 can be a continuously variable transmission (CVT), or another suitable type of transmission. The transmission 1218 can have a drive clutch and a driven clutch. In some embodiments, the drive clutch is forward of the driven clutch; in others, the driven clutch is forward of the drive clutch.

Any of these vehicle components can be positioned to achieve a desired weight distribution for the vehicle 1210. The vehicle 1210 therefore has a center of gravity or center of mass ("COM") 1230 at a certain point in the vehicle 1210. A COM is generally defined as the mean location of all the mass in a system. In certain embodiments, the seats 1214 are positioned within the vehicle 1210 such that the passenger's COM 1220 is superimposed on the COM 1230 of the vehicle 1210 in at least the longitudinal and vertical directions. In some embodiments, the vehicle's COM 1230 and the passenger's COM 1220 are exactly superimposed in one or more of the longitudinal and vertical directions. The vehicle's COM 1230 can also be superimposed with the passenger's COM 1220 in the lateral direction. In other embodiments, there is some distance between the vehicle's COM 1230 and the passenger's COM 1220. This distance is referred to herein as the center-center distance. In some embodiments, the passenger's COM 1220 is assumed to be near an appropriate portion of the passenger's body, such as the hip area or the navel. In some embodiments, the vehicle 1210 can be configured such that the vehicle's COM 1230 is aligned or nearly aligned with the passenger's spine. Minimizing the distance between the vehicle COM 1230 and the passenger's spine can improve the passenger ride in the vehicle 1210. Of course, passengers have different body types with different center of mass positions; however, there are several approximations for passenger COM that are used in the industry. For example, a Seat Index Point ("SIP") 1240 is generally used by seatbelt manufacturers to approximate the position of the passenger when seated in the seat 1214. The SIP can be measured according to SAE Standard No. J1163 200612, published Dec. 4, 2006. Another point is the ANSI point 1238 that is defined by the ANSI/ROHVA 1-201X standard as approximately 152 mm above the lowest point 1236 of the occupant-supporting surface, and 254 mm forward of the seat back. In other literature, the ANSI point can be defined as being in line with a vertical transverse plane of the vehicle approximately equidistant between the front and rear axle. In some particular embodiments, the vertical transverse plane can be 0.05% closer to one axle than to another. In other words, the ratio between the distance between the vertical transverse plane and an axle (either the front or the rear) and the wheelbase is approximately 49.55%. In several embodiments of the invention, the passenger COM 1220 can be approximated by any one of these reference points alone, or any two or more in combination. For example, the passenger COM 1220 can be approximated by an arithmetic average of the SIP 1240 and the ANSI point 1238, or any other suitable combination.

The vehicle 1210 can have an equal weight distribution between the front axle 1212a and the rear axle 1213a. In other embodiments, the vehicle weight distribution can be uneven, favoring the front or rear axles 1212a, 1213a. In one particular preferred embodiment, the weight distribution is a 40/60 front/rear distribution, with approximately 40% of the vehicle weight bearing on the front vehicle 1212, and 60% of the vehicle weight bearing on the rear wheels 1213. In other words, a distance D1 between the vehicle COM 1230 and the rear axle 1213a is approximately 40% of a distance D4 between the front axle 1212a and the rear axle 1213a.

The distance D1, between the vehicle COM 1230 and the rear axle 1213a is approximately 982.9 mm in the longitudinal direction, and the distance D4 between the front axle 1212a and the rear axle 1213a is approximately 2413.6 mm in the longitudinal direction. For purposes of description, a generally horizontal plane 1258 parallel with and running through the front axle 1212a and the rear axle 1213a is used for reference. The vehicle COM 1230 can be spaced apart from the plane 1258 by a distance D6, which can be approximately 274.4 mm in the vertical direction. In some embodiments, the SIP 1240 can be spaced apart from the rear axle 1213a by a distance D2 in the longitudinal direction, and from the plane 1258 by a distance D7 in the vertical direction. Distances D2 and D7 can be 1091.5 mm and 332.3 mm, respectively. In several embodiments, the ANSI point 1238 can be spaced apart from the rear axle 1213a by a distance D3 in the longitudinal direction, and from the plane 1258 by a distance D8 in the vertical direction. Distances D3 and D8 can be 1196 mm and 373.9 mm, respectively.

The position of the engine 1216 and transmission 1218, and any other vehicle components, can be varied in any suitable manner to achieve the desired relationship between the vehicle COM 1230 and the passenger COM 1220. The engine 1216 and transmission 1218 can be positioned behind the seat 1214, and more specifically, with the transmission 1218 positioned behind the engine 1216. In certain embodiments, the engine 1216 and transmission are at approximately the same vertical level relative to the vehicle 1210. The vehicle 1210 can include a radiator 1219 which can be positioned above the engine and/or transmission as shown. The radiator 1219 can be angled rearwardly to intake air from above and rearward of the radiator 1219 and direct it toward the engine 1216 and other internal components. The position of the radiator 1219 can be varied to achieve a desired vehicle COM 1230. To keep the COM biased somewhat rearwardly as desired for off-road vehicles, the radiator is placed behind the longitudinal center of the vehicle. Various other configurations are possible to achieve the desired weight distribution.

The front axle 1212a and the rear axle 1213a can be positioned relative to the vehicle 1210 such that the midpoint between them is spaced apart longitudinally from the vehicle COM 1230 by a certain distance. For example, assuming D3 is the distance between the rear axle 1213a and the midpoint of the wheelbase and D1 is the distance between the rear axle 1213a and the vehicle COM 1230, the distance D2 defines a longitudinal envelope between these two points. In other embodiments the midpoint of the wheelbase can be rearward of the vehicle COM 1230. In preferred embodiments, the passenger's COM 1220 is positioned somewhere between these two points D1 and D3. As the vehicle moves over varied terrain, bumps in the road cause the vehicle 1210 to move about these two points as a function of the suspension. In an example, if the vehicle 1210 had a perfectly rigid suspension, movement over varied terrain would cause the vehicle 1210 to tend to move about the midpoint of the wheelbase. Conversely, if a vehicle with a perfectly elastic suspension traveled over the same varied terrain, the vehicle 1210 would tend to move about the center of mass. Since neither of these theoretical extremes can be achieved, the realistic vehicle with some suspension will effectively move about a point somewhere between these two points. Positioning the passenger's center of mass within this envelope causes the perceived motion of the vehicle to be less and therefore passenger comfort is improved.

Figure 13:
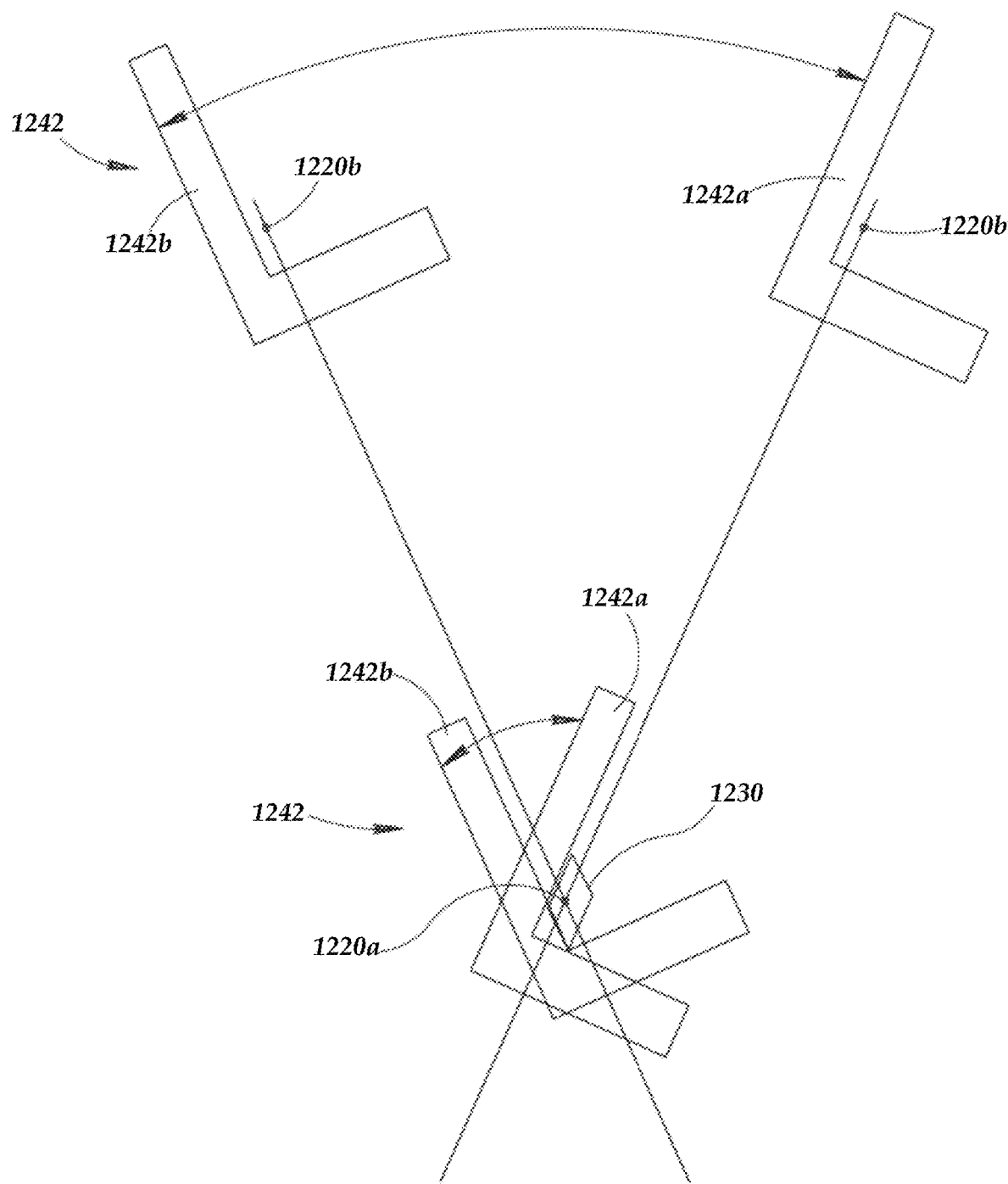
FIG. 13 is a schematic view of a seat of the vehicle of FIG. 12 according to embodiments of the present invention.

FIG. 13 is a schematic illustration of a vehicle and seat configuration according to embodiments of the present disclosure that shows the effects of a small or large center-center distance on the ride of the vehicle 1210. The center-center distance can have a lateral component, a vertical component, and a longitudinal component. When the vehicle's COM 1230 and the passenger's COM 1220 are at the exact same position, the center-center distance is zero. The larger the center-center distance is, the more an uneven terrain impacts the passenger's ride. For example, if the center-center distance has a large vertical component (because the vehicle's COM is higher or lower than the passenger's COM—the typical case) or a large longitudinal component (because the vehicle's COM is farther forward or back than the passenger's COM), movement of the vehicle about the lateral axis (pitch) moves the passenger as a function of center-center distance. FIG. 13 shows a first seat 1242 with a COM 1220 aligned with a vehicle's COM 1230. In this example, at least the vertical and longitudinal components of the center-center distance are zero. As the seat 1242 rocks back and forth about the lateral axis, or pitch axis, such as when the vehicle 1210 goes over a bump, the passenger in the seat 1242 moves between a first position 1242a and a second position 1242b. The movement of the passenger in the seat 1242 is minimal. The second seat 1242 is shown with an exaggerated vertical center-center distance. With the same vehicle movement, the passenger in the second seat 1242 moves a great deal more between a first position 1242a and a second position 1242b. The perceived movement of the passenger is approximately linearly related to the center-center distance about any given axis. If the center-center distance has a large longitudinal or lateral component, the passenger will feel the movement more when the vehicle 1210 rotates about the vertical axis, or yaw axis; if the center-center distance has a large lateral or vertical component, the passenger will feel the movement more when the vehicle rotates about the longitudinal axis. The vehicle configuration of the present disclosure minimizes the center-center distance and thereby improves the ride of the vehicle 1210. Thus, positioning the passenger vertically close to the COM and between D1 and D3 of the vehicle improves the ride quality perceived by the passenger.

It should be noted that when the passenger sits in the vehicle the suspension is becomes slightly more compressed, thus lowering the vehicle slightly and, depending on the suspension arms, widening the vehicle track. Because of this configuration, the stability of the vehicle improves when there are passengers seated in the vehicle 1210.

In some embodiments, the center-center distance in the longitudinal and vertical direction is zero or nearly zero. In other words, the vehicle's COM 1230 is at the same longitudinal position and vertical position as the passenger's COM 1220. The vehicle's COM 1230 can be at a lateral midpoint of the vehicle 1210, and the seats 1214 can be equally spaced from the midline of the vehicle. Assuming two side-by-side passengers have equal weight, in this configuration the vehicle's COM 1230 and the passenger's collective COM 1220 are at the same point longitudinally, vertically, and laterally. In some embodiments, the vehicle 1210 can have a single, center-mounted seat in which case the driver's COM 1220 can be exactly or nearly exactly superimposed upon the vehicle's COM 1230. In many other configurations, however, there is some center-center distance in at least one dimension. In some embodiments, the passenger's COM 1220 is less than approximately 100 cm from the vehicle's COM 1230 in the longitudinal or vertical direction. In other embodiments, the center-center distance can be greater, such as between 100-400. In some embodiments the passenger's COM 1220 is above or below the vehicle's COM 1230 or in front of or behind the vehicle's COM 1230 or any workable combination thereof (e.g. above and behind, below and in front of, etc.). As previously noted the passenger COM is preferably slightly forward of the vehicle COM 1230 in a vehicle with a heavier weight distribution on the rear axle.

In some embodiments, the seats 1214 of the vehicle 1210 are constructed and positioned so that the passenger's COM 1220 is closer vertically to the vehicle's COM 1230 the than conventional ROVs or other vehicles. Conventional side-by-side off-road recreational vehicles have seats that are positioned so that the passenger's COM is over 20 cm higher than the vehicle's COM, causing the passenger to undesirably move forward and backward as the vehicle rocks about a lateral axis.

In contrast to some conventional vehicles, the center-center distance of the present disclosure can be small even though the bottom of the seat 1214 is spaced apart from the bottom of the vehicle 1210 by a distance D9. Some vehicles, such as some sandrails, are configured with the bottom of the seat very near to the bottom (or floor) of the vehicle. Conventional recreational off-road vehicles have a seating area more than 10 cm (typically 12.5 cm) higher than D9 above the bottom of the vehicle chassis.

While the preferred embodiments of the invention have been illustrated and described, as noted above, many changes can be made without departing from the spirit and scope of the invention. For example, a second row of seats can be provided. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A side-by-side recreational off-highway vehicle having two front wheels and at least two rear wheels, the vehicle comprising:
   a chassis having a front portion, a middle portion, and a rear portion; the front portion being coupled to the front wheels, the rear portion being coupled to the rear wheels, and the middle portion surrounding an occupant compartment having at least two side-by-side seats for a driver and at least one passenger;
   an engine secured to the rear portion of the chassis, the engine having a crankcase;
   a transmission secured to the engine;

a drive unit operably coupled to the transmission, the drive unit drivingly coupled to the rear wheels;

a cover between the engine and the occupant compartment to separate the engine from the occupant compartment; and at least one access panel secured within the cover, the at least one access panel being movable to access engine components.

2. The vehicle of claim 1, wherein the engine includes at least one cylinder having a central axis tilted rearwardly away from the occupant compartment, and wherein the chassis includes frame lower members extending generally horizontally along a base of the chassis, the chassis further including a cross member above the base of the chassis, the cross member being secured to the base and extending transverse to a longitudinal axis of the vehicle above the base of the chassis.

3. The vehicle of claim 2, further comprising a transaxle including a transaxle shaft, wherein the transaxle is secured to the engine crankcase with a plate that is positioned vertically higher than the transaxle shaft, and a driveshaft coupled to the transaxle shaft, wherein the driveshaft extends under the engine and under the cross-member.

4. The vehicle of claim 3, wherein the transaxle is mounted to the chassis with two isolation mounts secured to the cross member, wherein the isolation mounts are secured to the chassis vertically higher than the base of the chassis.

5. The vehicle of claim 4, wherein the transaxle shaft extends vertically below and laterally between the isolation mounts.

6. The vehicle of claim 4, further comprising a first upwardly extending frame member positioned longitudinally between the middle portion and the rear portion, wherein the upwardly extending frame member supports the cross member and extends between the base of the chassis and the cross member.

7. The vehicle of claim 6, wherein the base of the chassis includes an angled member extending rearwardly and inwardly from an outermost side portion of the base of the chassis rearward of the occupant compartment, and wherein the upwardly extending frame member that supports the cross member is secured at a lower end to the angled member.

8. The vehicle of claim 6, further comprising a fuel tank positioned underneath one of the side-by-side seats, the fuel tank extending rearward from one of the side-by-side seats to the cross member.

9. The vehicle of claim 8, further including an upwardly extending chassis member extending upwardly from the base of the chassis rearward and outward of the passenger seat at a rear corner of the occupant compartment, the upwardly extending chassis member partially defining an opening in the chassis; wherein the fuel tank includes a fuel duct positioned forward of the upwardly extending chassis member, the duct being configured to receive fuel through the opening partially defined by the upwardly extending chassis member to fill the fuel tank.

10. The vehicle of claim 9, wherein the fuel duct extends upwardly and outwardly from a rear portion of the fuel tank.

11. The vehicle of claim 8, wherein the rear portion of the fuel tank extends upwardly rearward of a lower portion of the passenger seat.

12. The vehicle of claim 11, wherein the rear portion of the fuel tank that is positioned rearward of the lower portion of the passenger seat houses a fuel pump.

13. A side-by-side recreational off-highway vehicle having two front wheels and at least two rear wheels, the vehicle comprising:

a chassis having a front portion, a middle portion, and a rear portion; the front portion being coupled to the front wheels, the rear portion being coupled to the rear wheels, and the middle portion surrounding an occupant compartment having at least two side-by-side seats for a driver and at least one passenger;

an engine secured to the rear portion of the chassis;

a transmission secured to the engine;

a drive unit operably coupled to the transmission, the drive unit drivingly coupled to the rear wheels;

a cover between the engine and the occupant compartment to separate the engine from the occupant compartment; and at least one access panel secured within the cover, the at least one access panel being movable to access engine components;

wherein the rear portion of the chassis includes a cross member for securing a front of the engine, the cross member extending transverse to a longitudinal axis of the chassis and being elevated above a lowest portion of the chassis, the at least one access panel opening forward of and above the cross member.

14. The vehicle of claim 13, further comprising:

a transmission secured to the engine; and a drive unit operably coupled to the transmission, the drive unit drivingly coupled to the rear wheels.

15. The vehicle of claim 13, wherein the engine includes a crankcase and wherein the cross member includes at least two engine isolation mounts secured to the crankcase.

16. The vehicle of claim 15, further comprising a transaxle secured to a rearward end of the engine, a rearward end of the transaxle secured with isolation mounts to a rear portion of the chassis above a lowest portion of the chassis, the transaxle and engine being isolated together from the chassis.

17. The vehicle of claim 13, wherein the at least panel is forward of and provides access to replaceable engine components.

18. The vehicle of claim 13, wherein at least a portion of the at least one access panel is longitudinally rearward of at least one of the seats.

19. The vehicle of claim 13, wherein the cross member is supported by legs extending upwardly from a lower chassis portion, the bottoms of the legs being secured to frame members that angle inwardly and rearwardly from outer portions of the lower chassis portion.

20. The vehicle of claim 19, further comprising a fuel tank forward of the cross member and at least partially under a passenger seat.

* * * * *